US010820041B2

(12) United States Patent
Kitahara et al.

(10) Patent No.: US 10,820,041 B2
(45) Date of Patent: Oct. 27, 2020

(54) RECEPTION APPARATUS, TRANSMISSION APPARATUS AND DATA PROCESSING METHOD

(71) Applicant: Saturn Licensing LLC, New York, NY (US)

(72) Inventors: Jun Kitahara, Shizuoka (JP); Naohisa Kitazato, Tokyo (JP); Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 15/573,549

(22) PCT Filed: Jul. 4, 2016

(86) PCT No.: PCT/JP2016/069752
§ 371 (c)(1),
(2) Date: Nov. 13, 2017

(87) PCT Pub. No.: WO2017/014034
PCT Pub. Date: Jan. 26, 2017

(65) Prior Publication Data
US 2018/0124454 A1 May 3, 2018

(30) Foreign Application Priority Data
Jul. 23, 2015 (JP) ................. 2015-145494

(51) Int. Cl.
*H04N 7/173* (2011.01)
*H04N 7/16* (2011.01)
(Continued)

(52) U.S. Cl.
CPC ..... *H04N 21/4331* (2013.01); *G06F 12/0813* (2013.01); *G06F 13/00* (2013.01);
(Continued)

(58) Field of Classification Search
CPC .......... H04N 21/4331; H04N 21/4345; H04N 21/435; H04N 21/44004; H04N 21/4622;
(Continued)

(56) References Cited

U.S. PATENT DOCUMENTS

2006/0080474 A1* 4/2006 Horii ................. H04N 5/44504
710/8
2007/0174356 A1* 7/2007 Horii ........................ G06F 8/62
(Continued)

FOREIGN PATENT DOCUMENTS

EP    2 897 369 A1    7/2015
JP    2011-87103 A    4/2011
(Continued)

OTHER PUBLICATIONS

English Translation of WO 2014/057833 A1, Apr. 14, 2014 (Year: 2014).*

(Continued)

*Primary Examiner* — Kyu Chae
(74) *Attorney, Agent, or Firm* — Oblon, McClelland, Maier & Neustadt, L.L.P.

(57) ABSTRACT

An apparatus and a method are provided which make it possible to allow a reception apparatus to execute a cache process in a unit of an application or in a unit of a presentation unit thereby to make it possible to achieve an application execution process of high completeness. The reception apparatus receives, from a transmission apparatus, signaling data in which an application size that is a data size of an application, application link information, and a data size of each of presentation units (PUs) that are application components are recorded. The reception apparatus compares a cache size and the data size of each of the applications and PUs with each other, determines cacheable applications or (Continued)

PUs as cache target data, and executes a cache process in a unit of an application or a PU.

21 Claims, 49 Drawing Sheets

(51) Int. Cl.
| | | |
|---|---|---|
| H04N 21/433 | (2011.01) | |
| H04N 21/435 | (2011.01) | |
| G06F 13/00 | (2006.01) | |
| H04N 21/643 | (2011.01) | |
| H04N 21/6408 | (2011.01) | |
| H04N 21/81 | (2011.01) | |
| H04N 21/478 | (2011.01) | |
| H04N 21/61 | (2011.01) | |
| H04N 21/6405 | (2011.01) | |
| H04N 21/462 | (2011.01) | |
| H04N 21/434 | (2011.01) | |
| G06F 12/0813 | (2016.01) | |
| H04N 21/44 | (2011.01) | |

(52) U.S. Cl.
CPC ....... *H04N 21/435* (2013.01); *H04N 21/4345* (2013.01); *H04N 21/44004* (2013.01); *H04N 21/4622* (2013.01); *H04N 21/478* (2013.01); *H04N 21/6125* (2013.01); *H04N 21/6405* (2013.01); *H04N 21/6408* (2013.01); *H04N 21/64322* (2013.01); *H04N 21/812* (2013.01); *H04N 21/8173* (2013.01); *G06F 2212/314* (2013.01)

(58) Field of Classification Search
CPC ............. H04N 21/478; H04N 21/6125; H04N 21/6405; H04N 21/6408; H04N 21/64322; H04N 21/812; H04N 21/8173; G06F 12/0813; G06F 13/00
See application file for complete search history.

(56) References Cited

U.S. PATENT DOCUMENTS

| | | |
|---|---|---|
| 2010/0162307 A1 | 6/2010 | Suh et al. |
| 2010/0162334 A1 | 6/2010 | Suh et al. |
| 2012/0317606 A1 | 12/2012 | Suh et al. |
| 2013/0097641 A1 | 4/2013 | Suh et al. |
| 2014/0075472 A1* | 3/2014 | Mitsuya ............... G06F 21/10 725/32 |
| 2014/0109160 A1 | 4/2014 | Suh et al. |
| 2014/0173665 A1* | 6/2014 | Kitazato ............... H04H 60/13 725/51 |
| 2014/0289784 A1 | 9/2014 | Suh et al. |
| 2015/0156546 A1 | 6/2015 | Moon et al. |
| 2015/0215369 A1 | 7/2015 | Yamagishi |
| 2016/0119693 A1 | 4/2016 | Suh et al. |
| 2016/0182977 A1* | 6/2016 | Mitra ............... H04N 21/251 725/14 |
| 2017/0332151 A1 | 11/2017 | Suh et al. |
| 2018/0041806 A1* | 2/2018 | Kitazato ............ H04N 21/462 |

FOREIGN PATENT DOCUMENTS

| | | | | |
|---|---|---|---|---|
| JP | 2013-9358 A | 1/2013 | | |
| JP | 2014-57227 A | 3/2014 | | |
| JP | WO 2014/057833 A1 * | 4/2014 | ......... | H04N 21/435 |
| JP | 5725235 B1 | 5/2015 | | |
| JP | 5725242 B1 | 5/2015 | | |
| JP | 2015-126466 A | 7/2015 | | |
| WO | 2015/104743 A1 | 7/2015 | | |

OTHER PUBLICATIONS

Extended European Search Report dated Nov. 7, 2018 in corresponding European Patent Application No. 16827596.4, 13 pages.
"ATSC Candidate Standard: Interactive Services Standard (A/105:2014)", S13-2-389r7, Advanced Television Systems Committee, XP017846696, Dec. 12, 2013, Rev. 7—Apr. 24, 2014, 139 pages.
"3rd Generation Partnership Project; Technical Specification Group Services and System Aspects; (MBMS and PSS), Interactivity Support for 3GPP-Based Streaming and Download, Services", (Release 13), 3GPP TR 26.953 V0.2.1 (Jul. 2015), Technical Report, XP050986268, 28 pages.
International Search Report dated Sep. 20, 2016 in PCT/JP2016/069752 filed Jul. 4, 2016.

\* cited by examiner

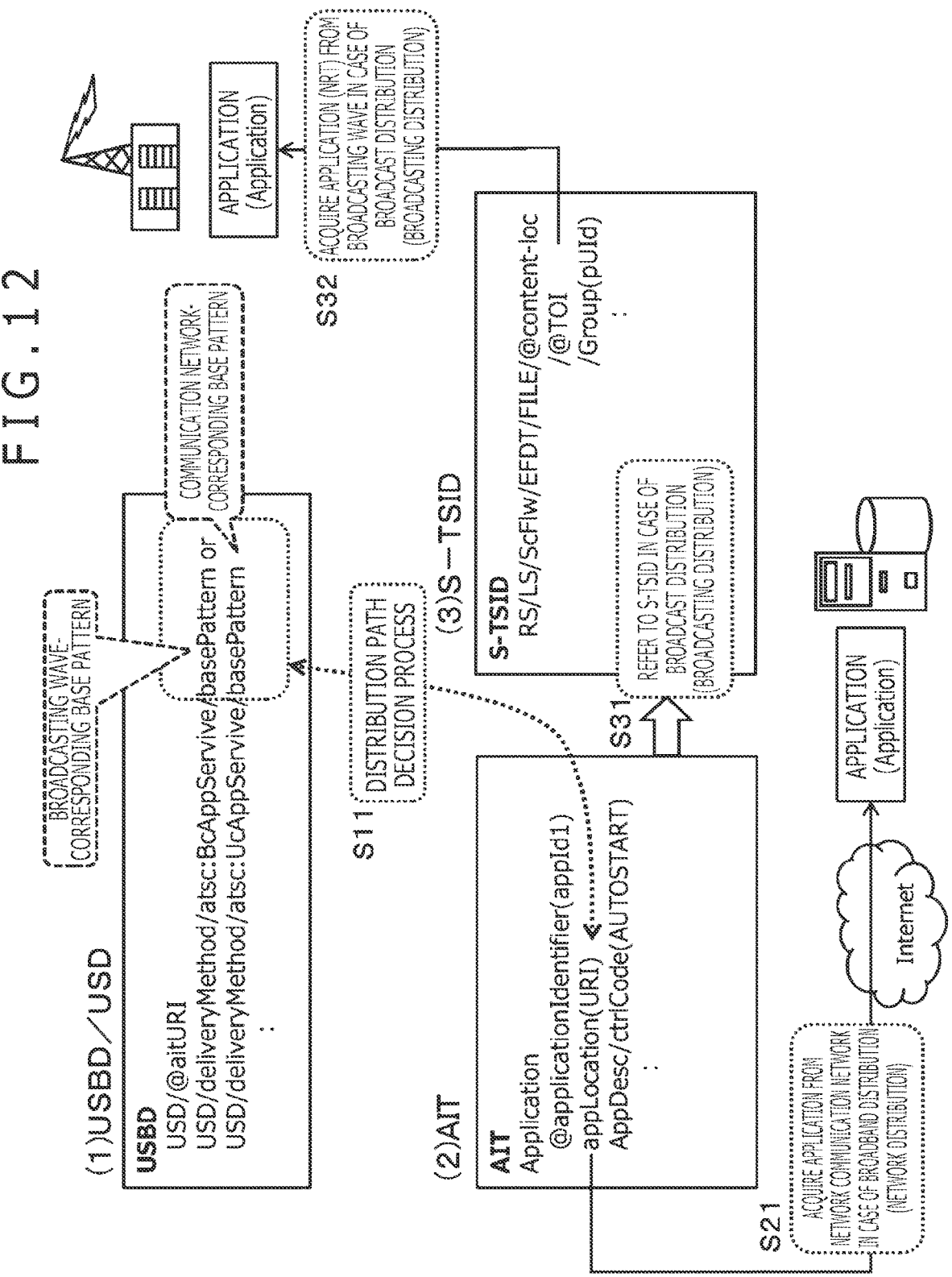

FIG. 13

(1) DEFINITION EXAMPLE OF FACTOR OF BROADCASTING NRT SERVICE

| deliveryMethod | | | |
|---|---|---|---|
| | atsc: broadcastAppService | 1..N | BROADCASTING LINEAR SERVICE |
| | basePattern | 1..N | BROADCASTING STREAM URI |
| | atsc: broadcastNRTAppService | 0..N | BROADCASTING NRT SERVICE |
| | basePattern | 1..N | NRT URI |
| | atsc: unicastAppService | 0..N | COMMUNICATION SERVICE |
| | basePattern | 1..N | COMMUNICATION SERVICE URI |

231

(2) EXAMPLE IN WHICH NRTbasePattern INDICATING BROADCASTING NRT SERVICE IS DEFINED IN broadcastAppService

| deliveryMethod | | | |
|---|---|---|---|
| | atsc: broadcastAppService | 1..N | BROADCASTING SERVICE |
| | basePattern | 1..N | BROADCASTING STREAM URI |
| | NRTbasePattern | 0..N | BROADCASTING NRT SERVICE URI |
| | atsc: unicastAppService | 0..N | COMMUNICATION SERVICE |
| | basePattern | 1..N | COMMUNICATION SERVICE URI |

(3) DEFINITION OF FACTOR OF BROADCASTING SERVICE TYPE

| deliveryMethod | | | |
|---|---|---|---|
| atsc: broadcastAppService | | 1..N | BROADCASTING SERVICE |
| | basePattern | 1..N | BROADCASTING STREAM URI |
| | @serviceType | 0..1 | SERVICE TYPE (E.G. LINEAR, NRT, ETC.) |
| atsc: unicastAppService | | 0..N | COMMUNICATION SERVICE |
| | basePattern | 1..N | COMMUNICATION SERVICE URI |

| FDT | | | | | | | | | | |
|---|---|---|---|---|---|---|---|---|---|---|
| | FILE | | | | | | | | | FILE element |
| | | @Content-Location | | | | | | | | content location URI |
| | | | @TOI | | | | | | | transport object identifier |
| | | | | @Content-Length | | | | | | content length |
| | | | | | @Content-Type | | | | | content type |
| | | | | | | Group | | | | |
| | | | | | | | @presentationUnitId | 0..1 | | presentation unit id |
| | | | | | | | @presentationUnitSize | 0..1 | | presentation unit size |
| | | | | | | | ... | | | |
| | | | | | | | | | @Expires | validity period of the FDT |
| | | | | | | | | | ... | |

| ContentInfo | | | | |
|---|---|---|---|---|
| | PULinkage | 0..N | | LINK INFORMATION OF Presentation Unit |
| | | | @srcPUId | 1 | LINK SOURCE PRESENTATION UNIT ID |
| | | | @dstPUId | 1..N | LINK DESTINATION PRESENTATION UNIT ID |

282

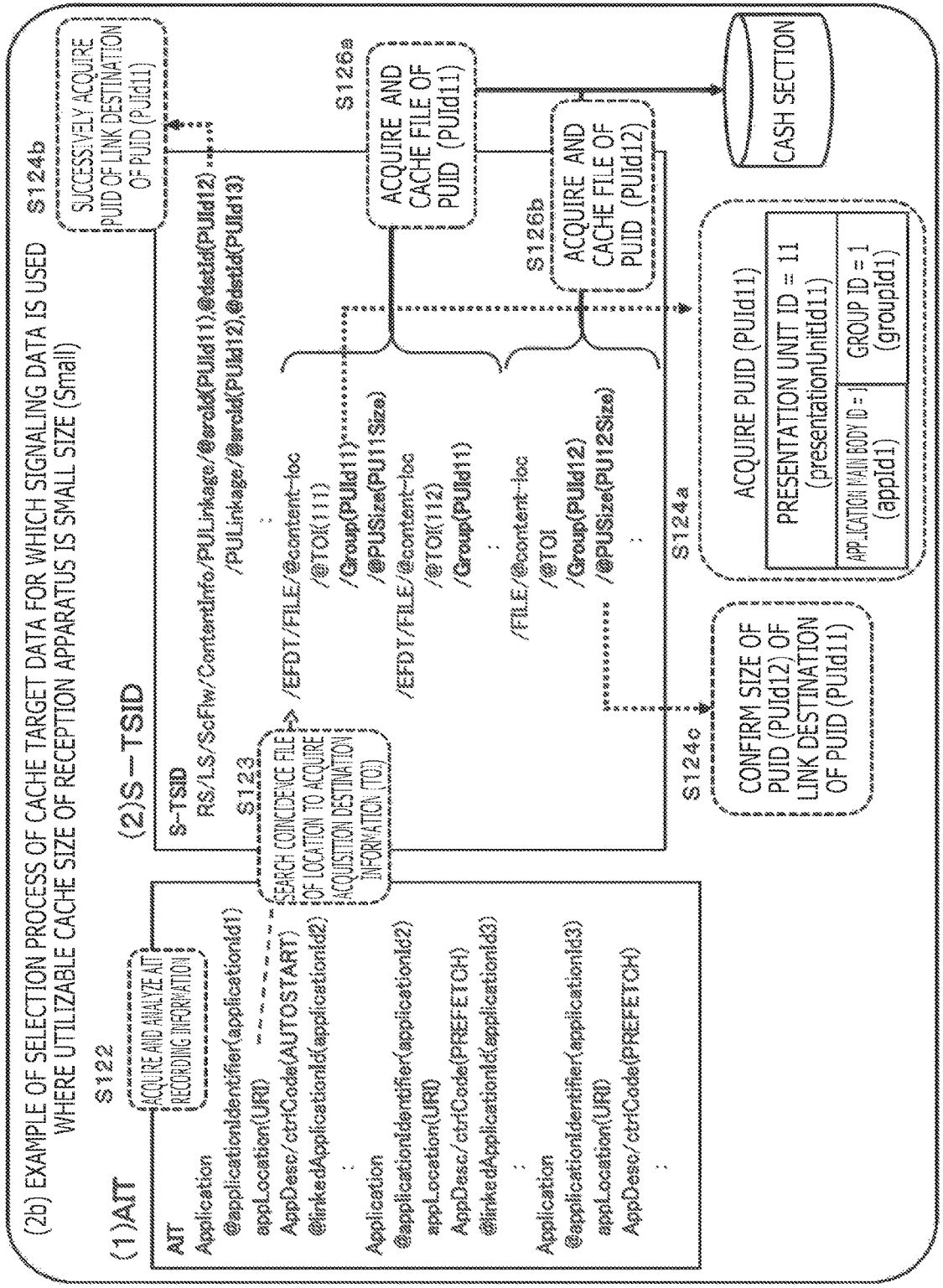

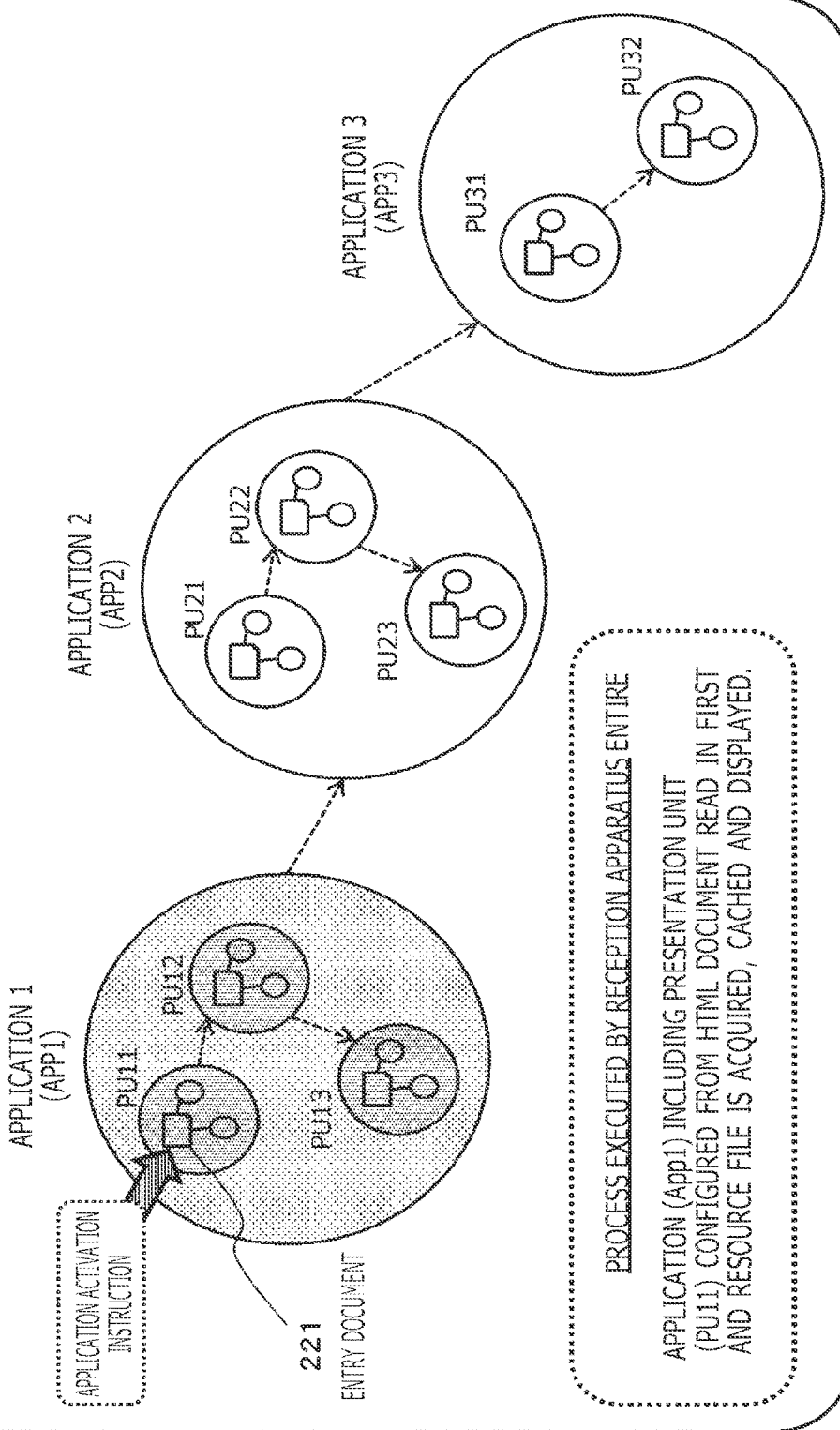

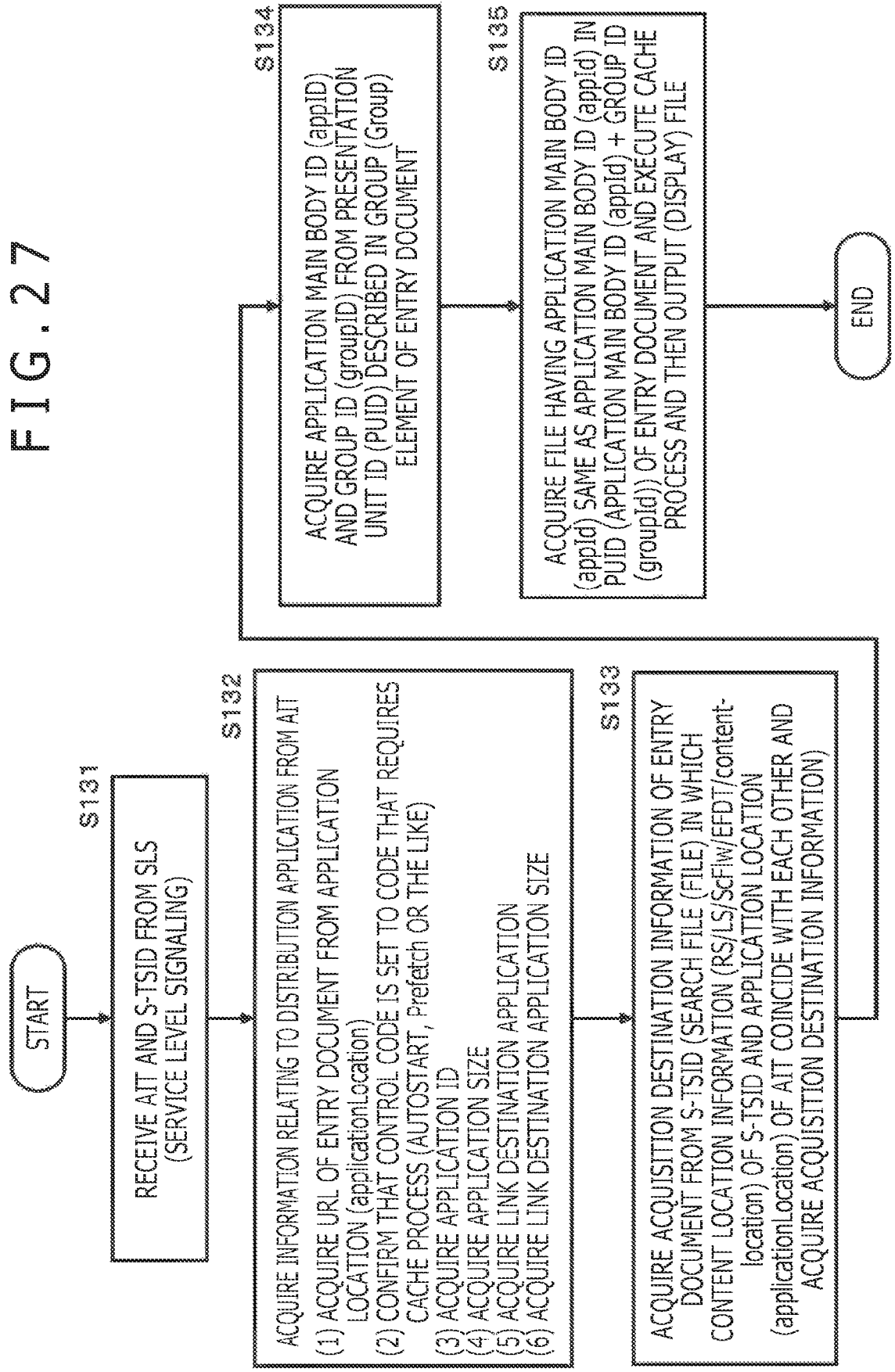

F I G . 2 8

(3b) EXAMPLE OF SELECTION PROCESS OF CACHE TARGET DATA FOR WHICH SIGNALING DATA IS USED WHERE UTILIZABLE CACHE SIZE OF RECEPTION APPARATUS IS MEDIUM SIZE (Medium)

(1) AIT

AIT
S132 — ACQUIRE AND ANALYZE AIT RECORDING INFORMATION

Application
@applicationIdentifier(applicationId1)
appLocation(URI)
AppDesc/ctrlCode(AUTOSTART)
@linkedApplicationId(applicationId2)

Application
@applicationIdentifier(applicationId2)
appLocation(URI)
AppDesc/ctrlCode(PREFETCH)
@linkedApplicationId(applicationId3)

Application
@applicationIdentifier(applicationId3)
appLocation(URI)
AppDesc/ctrlCode(PREFETCH)

(2) S-TSID

S-TSID
RS/LS/ScFlw/ContentInfo/PULinkage/@srcId(PUId11),@dstId(PUId12)
/PULinkage/@srcId(PUId12),@dstId(PUId13)

S133 — SEARCH COINCIDENCE FILE OF LOCATION TO ACQUIRE ACQUISITION DESTINATION INFORMATION (TOI)

/EFDT/FILE/@content-loc
/@TOI(111)
/Group(PUId11)
/@PUSize(PU11Size)

/EFDT/FILE/@content-loc
/@TOI(112)
/Group(PUId11)
:
/FILE/@content-loc
/@TOI
/Group(PUId12)
/@PUSize(PU12Size)

S135 — ACQUIRE AND CACHE FILE OF APPLICATION MAIN BODY ID (appId) SAME AS APPLICATION MAIN BODY ID (appId) CONFIGURING PUID (PUId11)

→ CASH SECTION

S134 — ACQUIRE PUID (PUId11)

| PRESENTATION UNIT ID = 11 (presentationUnitId11) | |
|---|---|
| APPLICATION MAIN BODY ID = 1 (appId1) | GROUP ID = 1 (groupId1) |

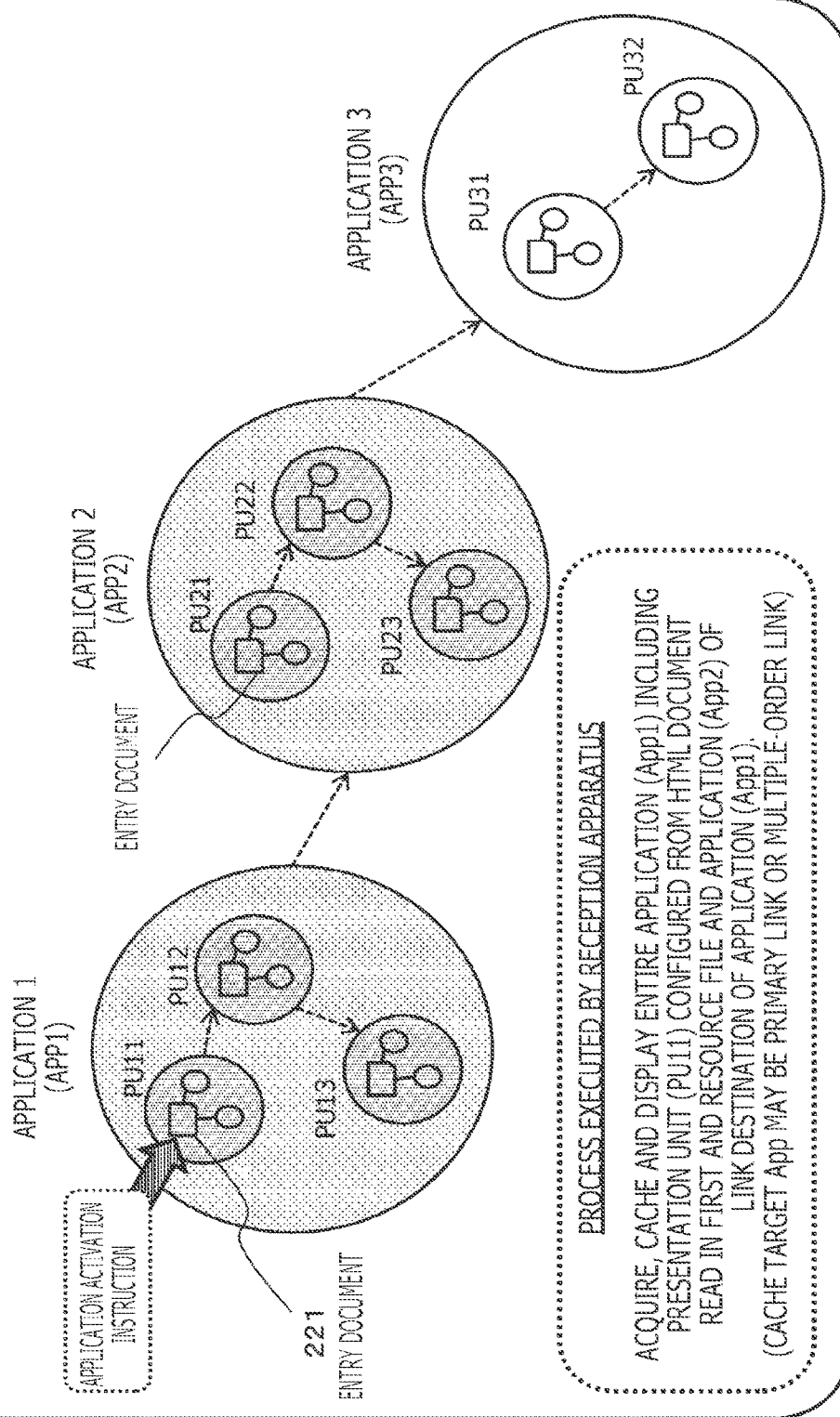

RECEPTION APPARATUS, TRANSMISSION APPARATUS AND DATA PROCESSING METHOD

TECHNICAL FIELD

The present disclosure relates to a reception apparatus, a transmission apparatus and a data processing method. More particularly, the present disclosure relates to a reception apparatus, a transmission apparatus and a data processing method ready for communication data for executing reception or transmission of data, for example, through a broadcasting wave or a network.

BACKGROUND ART

OTT (Over The Top) is available as a data distribution method capable of distributing a content such as image data or audio data irrespective of a service form of respective communications carriers. A distribution content by the OTT is called OTT content, and a distribution service of image (video) data utilizing the OTT is called OTT video or OTT-V (Over The Top Video).

As a data streaming distribution standard in accordance with the OTT-V, the DASH (Dynamic Adaptive Streaming overHTTP) standard is available. DASH is a standard relating to adaptive (adaptive type) streaming distribution for which a streaming protocol based on HTTP (HyperText Transfer Protocol) is used.

In adaptive (adaptive type) streaming, in order to make it possible for content reproduction to be performed by various clients that are data distribution destinations, a content distribution server of a broadcasting station or the like creates a manifest file in which segmented files of moving picture content of a plurality of bitrates and attribute information and a URL (Uniform Resource Locator) of each of the segmented files are described, and presents the manifest file to a client.

The client acquires the manifest file from the server and selects an optimum bitrate content according to the size of a display section of the own apparatus or a utilizable communication bandwidth, and receives and reproduces the selected content. Also dynamic change of the bitrate can be performed in response to a variation of the network bandwidth, and the client side can switchably receive an optimum content suitable for a situation at any time, and reproduction of a moving picture content in which occurrence of video intermittence is reduced is implemented. It is to be noted that adaptive (adaptive type) streaming is disclosed, for example, in PTL 1 (JP 2011-87103A).

Development and standardization relating to a system for transmitting and receiving a content such as a broadcasting program using one-way communication by a broadcasting wave or the like from a transmission apparatus of a broadcasting station or some other content server to a reception apparatus such as a television set, a PC or a portable terminal or using bidirectional communication or one-way communication through a network such as the Internet are proceeding actively.

It is to be noted that, as a prior art document that discloses a technology for implementing data distribution through a broadcasting wave and a network, for example, PTL 2 (JP 2014-057227A) is available.

As a standard relating to a data distribution system through a broadcasting wave and a network, standardization of ATSC (Advanced Television System Committee) 3.0 is proceeding.

In ATSC3.0, a configuration is examined in which middleware for executing a reception process and so forth of an ATSC3.0 broadcast is incorporated in a broadcast distribution device (tuner-incorporating device) in which an ATSC3.0 compliant physical layer (ATSC-PHY) so as to make it possible to receive signaling data including control information and so forth for ATSC broadcasting to perform various controls based on the signaling data.

In particular, a configuration is examined which makes it possible to implement, by control based on signaling data, an outputting process of a broadcast content or a data process utilizing various applications provided through a broadcasting wave or the like utilizing an application program utilized in the Internet or the like, namely, a client application, as it is.

For example, an ATSC3.0 compliant physical layer (ATSC-PHY) and ATSC3.0 broadcast reception middleware are incorporated in a reception apparatus of a broadcast service (not only a server for exclusive use but also a PC, a TV, a tablet, a smartphone or the like) installed in a home or at a hot spot.

This makes it possible for the reception apparatus to utilize, after reception of an ATSC3.0 broadcast service, an application (for example, an ATSC3.0 DASH client application) that operates on a reproduction control section or an application control section of the reception apparatus to execute reproduction of a broadcast content or various applications distributed by a broadcast.

In order for the reception apparatus to execute an application, a cache process for storing various files that configure the application, for example, an image file of moving pictures, an audio file and so forth into a cache (storage section) in the user apparatus is required.

However, where the cache (storage section) of the reception apparatus does not have a sufficient free capacity, a case in which all of configuration files of the application cannot be stored occurs.

If the application is executed while part of the application configuration files cannot be cached, then such an application error sometimes occurs that images (moving pictures) or audio data that have not been cached successfully are missed or the application cannot be executed at all.

CITATION LIST

Patent Literature

[PTL 1]
JP 2011-87103A
[PTL 2]
JP 2014-057227A

SUMMARY

Technical Problem

The present disclosure has been made, for example, in view of such problems as described above, and the present disclosure provides a reception apparatus, a transmission apparatus, and a data processing method. By the reception apparatus for receiving an application through a broadcasting wave or the like and executing it, they make it possible to execute an application in a predetermined unit of an application or in a predetermined unit of an application component by a cache process by which a data size or link information of applications or application component units is acquired.

Further, in one embodiment of the present disclosure, a reception apparatus, a transmission apparatus and a data processing method are provided which make it possible to execute an application with certainty based on cache data by acquiring data size information or link information of application components, selecting a cacheable application or application component based on the acquired information and performing a cache process.

Solution to Problem

The first aspect of the present disclosure resides in a reception apparatus, including:
a communication section configured to receive first signaling data in which an application size that is a data size of each application and application link information that is link information between the applications are recorded; and
a data processing section configured to compare a cache size that is a data size capable of being stored in a storage section of the own apparatus and a data size, acquired from the first signaling data, of each of the applications that have a link relationship with each other to determine one or more cacheable applications as cache target applications and executes a cache process in a unit of an application.

Further, the second aspect of the present disclosure resides in a transmission apparatus, including:
a packet in which application configuration data is stored;
a data processing section configured to create a packet in which first signaling data in which an application size that is a data size of the application and application link information that is link information between applications are recorded is stored; and
a communication section configured to transmit the packet created by the data processing section.

Further, the third aspect of the present disclosure resides in a data processing method executed by a reception apparatus, including:
receiving, by a communication section, first signaling data in which an application size that is a data size of each of applications and application link information that is link information between the applications are recorded; and
comparing, by a data processing section, a cache size that is a data size capable of being stored in a storage section of the own apparatus and a data size, acquired from the first signaling data, of each of the applications that have a link relationship with each other to determine one or more cacheable applications as cache target applications and executing a cache process in a unit of an application.

Further, the fourth aspect of the present disclosure resides in a data processing method executed by a transmission apparatus, including:
creating, by a data processing section, a packet in which application configuration data is stored, and
a packet in which first signaling data in which an application size that is a data size of each of the applications and application link information that is link information between the applications are recorded is stored; and
transmitting, by a communication section, the packets created by the data processing section.

Further objects, features and advantages of the present disclosure will become more apparent from a more detailed description based on the working example hereinafter described and the attached drawings. It is to be noted that the term system herein is a logical aggregation configuration of a plurality of apparatus and is not limited to a system in which respective component apparatus are accommodated in the same housing.

Advantageous Effects of Invention

With the configuration of the working example of the present disclosure, an apparatus and a method are implemented which make it possible to allow a reception apparatus to execute a cache process in a unit of an application or in a unit of a presentation unit thereby to make it possible to achieve an application execution process of high completeness.

In particular, the reception apparatus receives, from a transmission apparatus, signaling data in which an application size that is a data size of an application, application link information, and a data size of each of presentation units (PUs) that are application components are recorded. The reception apparatus compares a cache size and the data size of each of the applications and PUs with each other, determines cacheable applications or PUs as cache target data, and executes a cache process in a unit of an application or a PU.

By the present configuration, an apparatus and a method are implemented which make it possible to allow a reception apparatus to execute a cache process of a unit of an application or a unit of a presentation unit to allow an application execution process of high completeness.

It is to be noted that the advantageous effects described herein are illustrative and not restrictive to the last and there may be additional effects.

BRIEF DESCRIPTION OF DRAWINGS

FIG. 12 is a view illustrating an example of an application acquisition process based on signaling data.
FIG. 13 is a view illustrating an example of a record of broadcasting distribution application related data in a USBD/USD.
FIG. 14 is a view illustrating an example of a record of a broadcasting distribution application related data in a USBD/USD.

FIG. 17 is a view illustrating an example of a data record of an S-TSID.

FIG. 18 is a view illustrating an example of a data record of an S-TSID.

FIG. 25 is a view illustrating a description of signaling data to be referred to upon the cache process in response to the cache size of the reception apparatus.

FIG. 26 is a view illustrating a particular example of the cache process in response to the cache size of the reception apparatus.

FIG. 27 is a view depicting a flow chart illustrating a particular sequence of the cache process in response to the cache size of the reception apparatus.

FIG. 28 is a view illustrating a description of signaling data to be referred to upon the cache process in response to the cache size of the reception apparatus.

FIG. 29 is a view illustrating a particular example of the cache process in response to the cache size of the reception apparatus.

DESCRIPTION OF EMBODIMENT

In the following, details of a reception apparatus, a transmission apparatus, and a data processing method of the present disclosure are described with reference to the drawings. It is to be noted that the description is given in the following order.

1. Example of Configuration of Communication System
2. Data Communication Protocol FLUTE, and ROUTE
3. Example of Communication Process Executed by Transmission Apparatus and Reception Apparatus
4. Example of Data Output to Which Application in Reception Apparatus Is Applied
5. Example of Configuration and Example of Processing of Reception Apparatus
6. Example of Configuration of Application
7. Cache Process of Application
8. Configuration of Signaling Data and Cache Target Data Selection Process in Which Signaling Data Is Applied
9. Example of Particular Process According to Cache Size (Data Storage Permission Size) of Reception Apparatus
9-1. Example of Process When Data Storage Permission Cache Size of Reception Apparatus Is Minimum Size (Minimum) and Only One Presentation Unit (PU) Is Storable
9-2. Example of Process Where Data Storage Permission Cache Size of Reception Apparatus Is Small Size (Small) and Plural Presentation Units (PUs) Are Storable
9-3. Example of Process Where Data Storage Permission Cache Size of Reception Apparatus Is Medium Size (Medium) and One Presentation Unit (PU) Is Storable
9-4. Example of Process Where Data Storage Permission Cache Size of Reception Apparatus Is Large Size (Large) and Plural Presentation Units (PUs) Are Storable
9-5. Example of Process Where Data Storage Permission Cache Size of Reception Apparatus Is Maximum Size (Maximum) and Plural Presentation Units (PUs) Are Storable
10. Overall Sequence of Data Processing by Reception Apparatus
10-1. Overall Sequence of Broadcasting Stream Reception Process by Reception Apparatus
10-2. Detailed Sequence of Broadcast Stream Reception Process by Reception Apparatus 10-3. Detailed Sequence of Reception and Analysis Processes of Signaling by Reception Apparatus 10-4. Detailed Sequence of Acquisition and Execution Processes of Application by Reception Apparatus 10-5. Detailed Sequence of Acquisition Process of Application through Broadcast by Reception Apparatus 10-6. Detailed Sequence of Cache Process in Unit of Presentation Unit (PU) by Reception Apparatus 10-7. Detailed Sequence of Cache Process in Unit of Application by Reception Apparatus 10-8. Transition Process Sequence between Applications or Presentation Units (PUs) by Reception Apparatus 11. Particular Example of Application Transition Process 12. Example of Cache Control Process Utilizing Service Worker (SW)

13. Example of Configuration of Transmission Apparatus and Reception Apparatus

14. Summary of Configuration of Present Disclosure

[1. Example of Configuration of Communication System]

First, an example of a configuration of a communication system that executes a process of the present disclosure is described with reference to FIG. 1.

Figure 1:
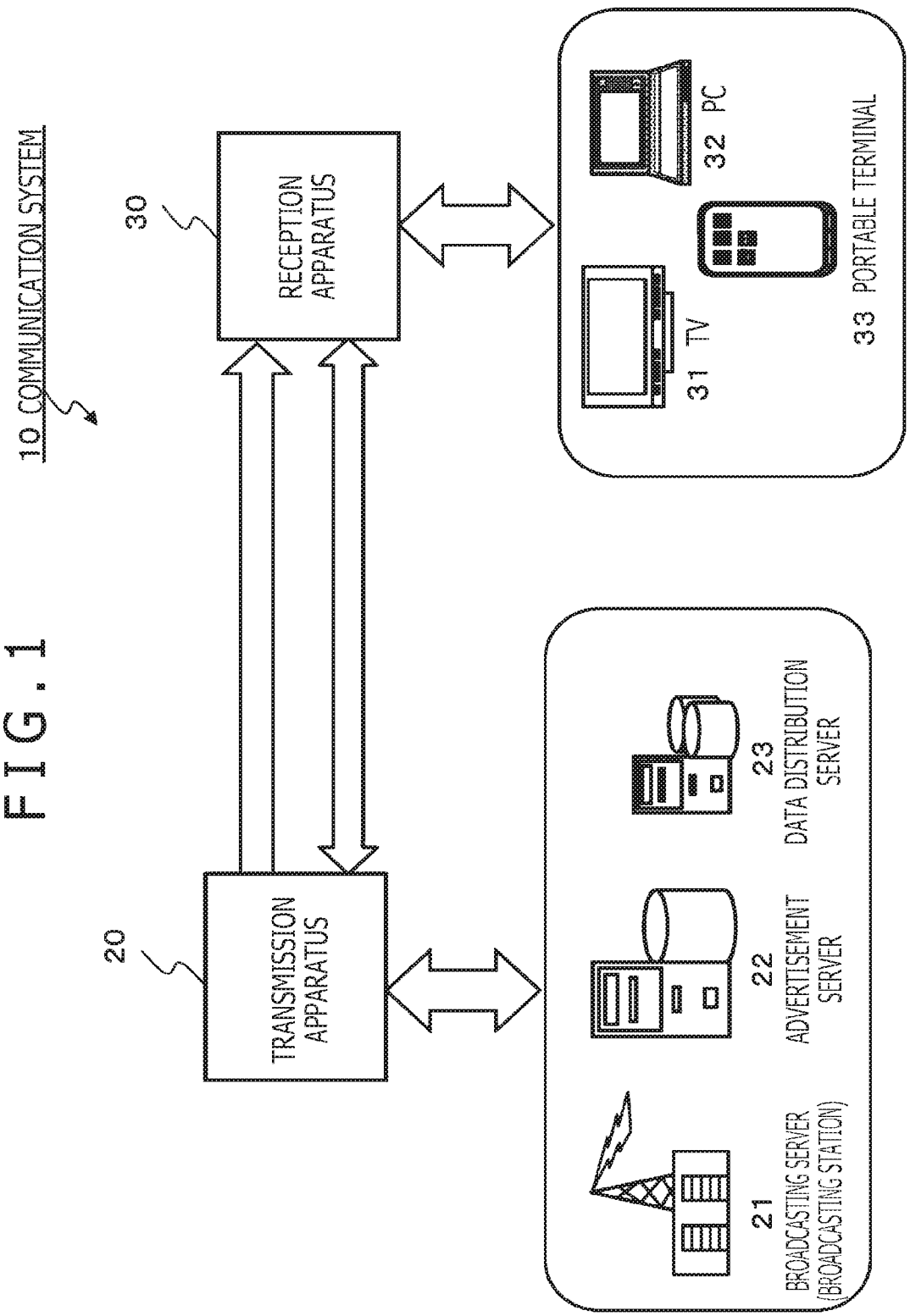
FIG. 1 is a view illustrating an example of a configuration of a communication system that executes a process of the present disclosure.

As depicted in FIG. 1, the communication system 10 includes a transmission apparatus 20 that is a communication apparatus that transmits a content of image data, audio data or the like, and a reception apparatus 30 that is a communication apparatus that receives the content transmitted from the transmission apparatus 20.

The transmission apparatus 20 particularly is an apparatus at the side that provides various content (broadcasting programs, advertisements and other data) such as, for example, a broadcasting server (broadcasting station) 21 that principally transmits TV programs and so forth, an advertisement server 22 that principally transmits advertisement data or a data distribution server 23 that transmits various data.

Meanwhile, the reception apparatus 30 is a client apparatus of a general user and particularly is configured, for example, from a television set 31, a PC 32, a portable terminal 33 or the like.

It is to be noted that, although the television set 31, PC 32 and portable terminal 33 are depicted as representative examples of a reception apparatus in FIG. 1, reception apparatus that can execute the process of the present disclosure include, in addition to the apparatus described, various reception apparatus such as, for example, a smartphone, a tablet terminal a smart watch, a wearable device and so forth.

Further, while the broadcasting server (broadcasting station) 21, advertisement server 22 and data distribution server 23 are depicted distinctly as examples of the transmission apparatus 20 in FIG. 1, one server may be configured such that it transmits broadcasting programs, advertisements and other data.

For example, such a configuration is possible that one broadcasting station distributes various broadcasting programs, advertisements, applications and other data through broadcasting waves, or also such a configuration is possible that one server distributes various broadcasting programs, advertisements, applications and other data through a communication network.

Data communication between the transmission apparatus 20 and the reception apparatus 30 is performed as communication that utilizes at least one of or both bidirectional communication or unidirectional communication through a network such as the Internet and unidirectional communication by a broadcasting wave or the like.

Content transmission from the transmission apparatus 20 to the reception apparatus 30 is executed in accordance with various formats such as, for example, the MPEG-DASH standard or MMT (MPEG Media Transport) that are standards for an adaptive (adaptive) streaming technology. It is to be noted that, when the process of the present disclosure is executed, there is no limitation in regard to the data distribution format.

The MPEG-DASH standard includes the following two standards.

(a) A standard for a manifest file (MPD: Media Presentation Description) for describing metadata that is management information for a moving image or an audio file (b) A standard for a file format (segment format) for transmission of a moving image content Content distribution from the transmission apparatus 20 to the reception apparatus 30 is executed in accordance with the MPEG-DASH standard described above.

The transmission apparatus 20 encodes content data to create a data file including encoded data and metadata of the encoded data. The encoding process is executed, for example, in accordance with the MP4 file format prescribed in MPEG. It is to be noted that a file of encoded data when the transmission apparatus 20 creates a data file of the MP4 format is called "mdat," and metadata is called "moov," "moof" or the like.

Content provided from the transmission apparatus 20 to the reception apparatus 30 is various data such as, for example, music data, video data of movies, television programs, videos, photographs, documents, pictures, charts and so forth, games, software and so forth.

Transmission data of the transmission apparatus 20 are described with reference to FIG. 2.

Figure 2:
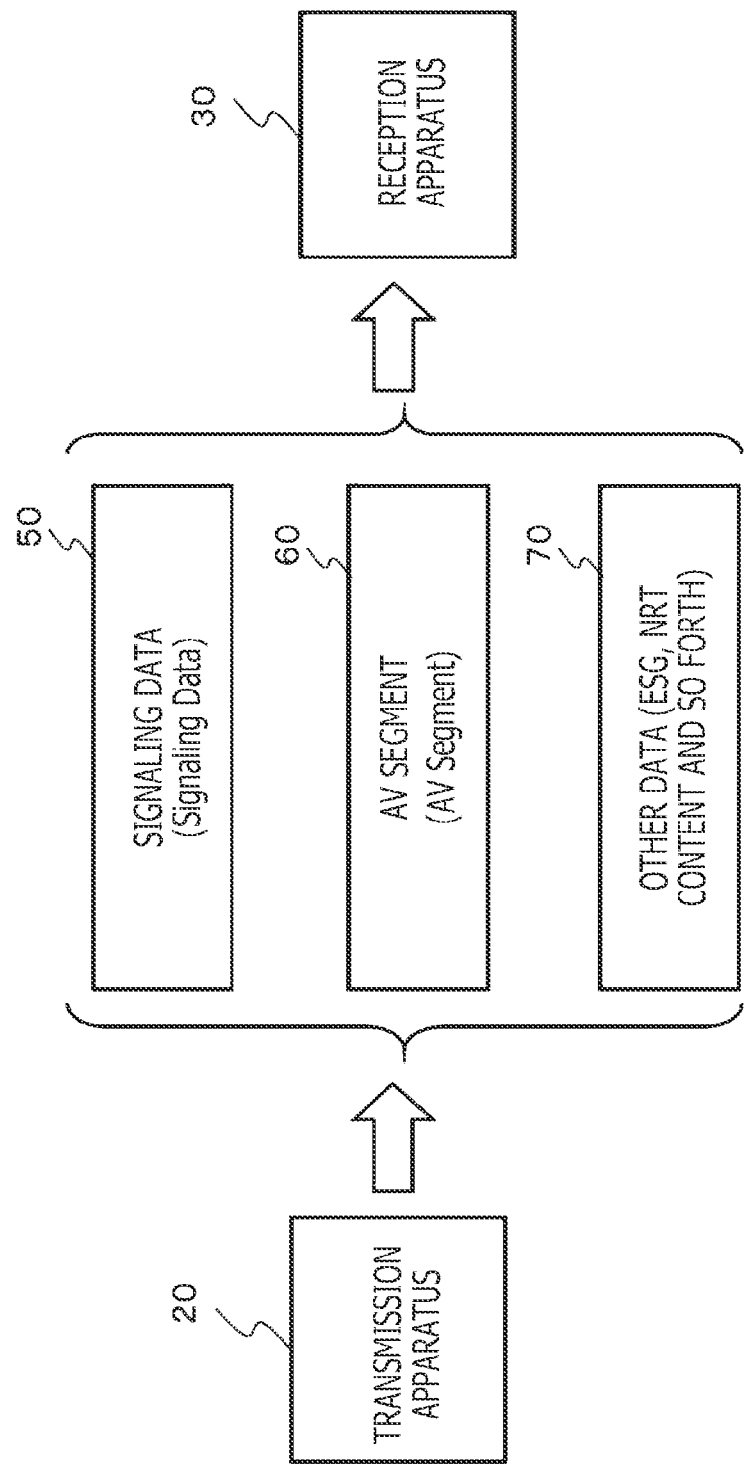
FIG. 2 is a view illustrating transmission data of a transmission apparatus.

The transmission apparatus 20 that executes data transmission in accordance with the MPEG-DASH standard performs transmission of plural kinds of data when divided roughly as depicted in FIG. 2:

(a) signaling data 50;

(b) AV segment 60; and (c) other data (ESG, NRT content and so forth) 70.

The AV segment 60 is configured from image (Video) or audio (Audio) data to be reproduced by a reception apparatus, namely, a broadcasting program content provided, for example, from a broadcasting station or the like. For example, the AV segment 60 is configured from MP4 encoded data (mdat) or metadata (moov, moof) described hereinabove. It is to be noted that an AV segment is also called DASH segment.

Meanwhile, the signaling data 50 is configured from broadcasting program schedule information such as a broadcasting program table, address information required for broadcasting program acquisition (URL (Uniform Resource Locator) or the like), information necessary for a reproduction process of a content, guide information configured, for example, from codec information (encoding method or the like) and various control information such as application control information.

It is necessary for the reception apparatus 30 to receive the signaling data 50 prior to reception of the AV segment 60 in which a broadcasting program content that is a reproduction target is stored.

The signaling data 50 is transmitted as data of, for example, the XML (Extensible Markup Language) format from the transmission apparatus 20.

The signaling data is repetitively transmitted at any time. For example, the signaling data is transmitted frequently and repetitively after every 100 milliseconds or the like.

This is because it is intended to make it possible for a reception apparatus (client) to acquire the signaling data immediately at any time.

It is possible for the client apparatus (reception apparatus) to execute, at any time without a delay, a process necessary for reception and reproduction of a broadcasting program content such as acquisition of a necessary access address of a broadcasting program content or a codec setting process on the basis of receivable signaling data.

The other data 70 includes, for example, an ESG (Electronic Service Guide), an NRT content and so forth.

The ESG is an electronic service guide (Electronic Service Guide) and is guide information such as, for example, a broadcasting program table.

The NRT content is a content of the non-real time type.

The NRT content includes various applications to be executed, for example, on a browser of the reception apparatus 30 that is a client, data files of moving images, still images and so forth, and so forth.

The following data depicted in FIG. 2, namely,
(a) signaling data 50,
(b) AV segment 60, and
(c) other data (ESG, NRT content and so forth) 70 are transmitted, for example, in accordance with the data communication protocol: FLUTE (File Delivery over Uni-directional Transport).

[2. Data Communication Protocol FLUTE, and ROUTE]

The data communication protocol: FLUTE (File Delivery over Uni-directional Transport) is a protocol for performing session control of content to be transmitted by a multicast.

For example, a file (identified based on the URL and the version) created by the server side that is a transmission apparatus is transmitted to a client that is a reception apparatus in accordance with the FLUTE protocol.

The reception apparatus (client) 30 accumulates a reception file and a URL and a version of the file in an associated relationship with each other, for example, into a storage section (client cache).

A file that has the same URL but has a different version is regarded that the substance thereof is updated. Although the FLUTE protocol performs only unidirectional file transfer control and does not have a selective filtering function of a file by a client, if the client side performs selection of files, whose transfer is controlled by the FLUTE, utilizing metadata linked to the file, then selective filtering can be implemented and a local cache reflecting a liking of a user can be configured, updated and managed.

It is to be noted that the metadata can be extended and incorporated into the FLUTE protocol and also can be described by a separate protocol such as a protocol for the ESG (Electronic Service Guide).

It is to be noted that FLUTE is initially specified as a file transfer protocol in the multicast. FLUTE is configured from a combination of an FDT and a multicast protocol of a scalable file object called ALC, particularly, an LCT or FEC component that is a building block of the multicast protocol.

Although the conventional FLUTE is developed in order that it is utilized principally for file transfer of the asynchronous type, it is being extended at present by the ATSC (Advanced Television System Committee), which is a normalization organization for a data distribution system through a broadcasting wave and a network, to make it easy to apply the FLUTE also to broadcast live streaming. The extended specification of FLUTE is called ROUTE (Real-Time Object Delivery over Unidirectional Transport).

As a standard whose standardization is being progressed at present as one of standards for a data distribution system through a broadcasting wave and a network, ATSC (Advanced Television System Committee) 3.0 is available. This ATSC3.0 prescribes a stack configuration that adopts ROUTE for transmission of signaling data, an ESG, an asynchronous file, a synchronous type stream and so forth in place of the conventional FLUTE protocol.

[3. Example of Communication Process Executed by Transmission Apparatus and Reception Apparatus]

Now, an example of a communication process executed by a transmission apparatus and a reception apparatus is described.

Figure 3:
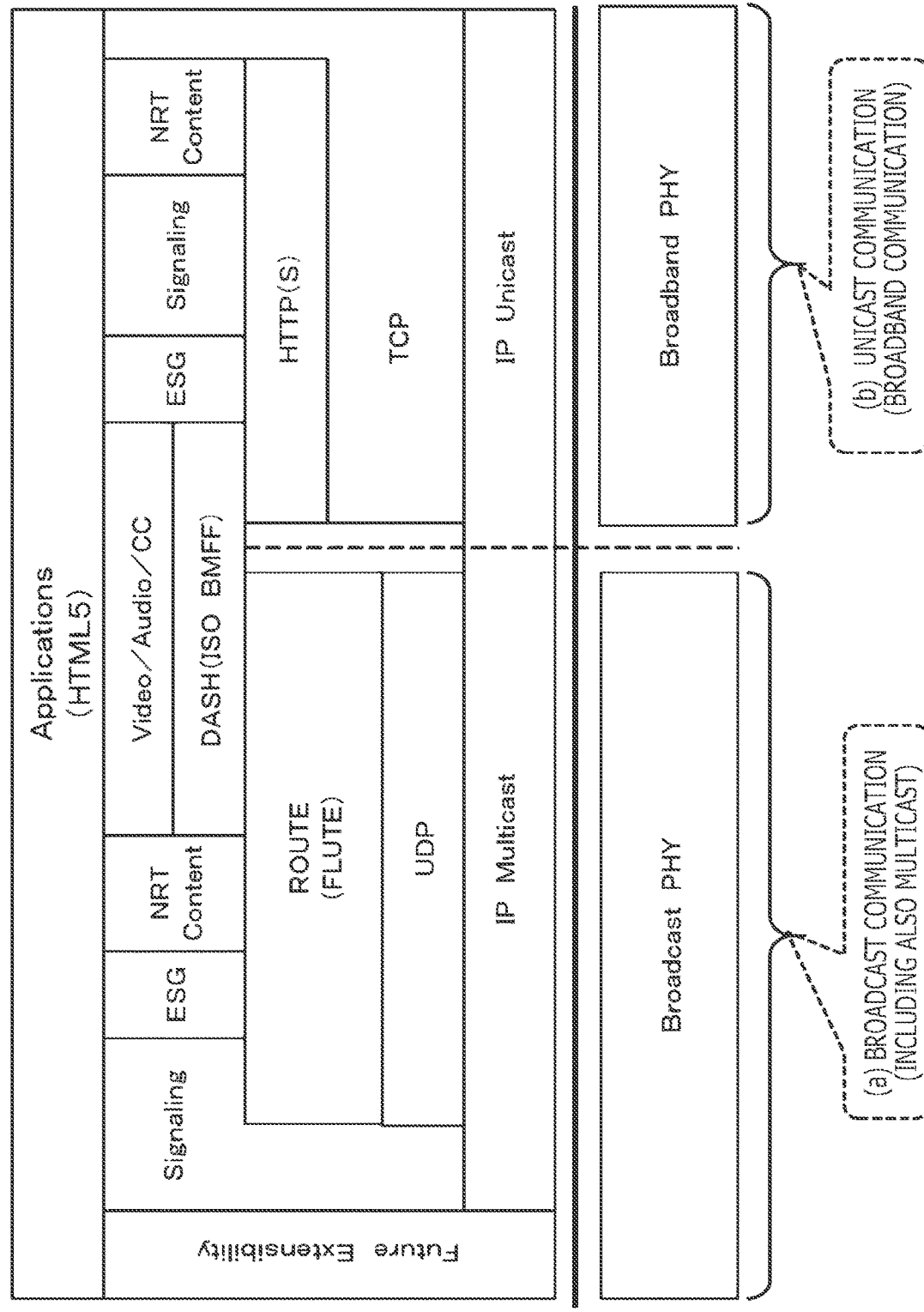
FIG. 3 is a view depicting an example of a protocol stack of the transmission apparatus and a reception apparatus.

FIG. 3 is a view depicting an example of a protocol stack of a transmission apparatus and a reception apparatus.

The example depicted in FIG. 3 has two protocol stacks for performing processing of the following two communication data:

(a) broadcast (including multicast) communication (for example, broadcasting type data distribution); and (b) unicast (broadband) communication (for example, P2P communication of the HTTP type).

The left side in FIG. 3 is a protocol stack corresponding to the (a) broadcast communication (for example, broadcasting type data distribution).

The right side in FIG. 3 is a protocol stack corresponding to the (b) unicast (broadband) communication (for example, P2P communication of the HTTP type).

The protocol stack corresponding to the (a) broadcast communication (for example, broadcasting type data distribution) depicted at the left side in FIG. 3 has the following layers in order from a lower layer:

(1) broadcast physical layer (Broadcast PHY);
(2) IP multicast layer (IP Multicast);
(3) UDP layer;
(4) ROUTE (=extended type FLUTE) layer;
(5) ESG, NRT content, DASH (ISO BMFF) and Video/Audio/CC; and
(6) Application layer (Applications (HTML5 (HyperText Markup Language 5)).

It is to be noted that a signaling (Signaling) layer is set as an upper layer of the (2) IP multicast layer (IP Multicast).

The signaling layer is a layer applied to transmission and reception of the signaling data 50 described hereinabove with reference to FIG. 2. The signaling data includes broadcasting program schedule information such as a broadcasting program table, address information (URL or the like) necessary for broadcasting program acquisition, information necessary for a reproduction process of a content, guide information configured, for example, from codec information (encoding method or the like) or the like, control information and so forth.

The signaling data is data including access information of an AV segment received and reproduced by a reception apparatus (client), guide information necessary for a process after reception such as a decoding process and control information, and is data transmitted repetitively at any time from a transmission apparatus.

The signaling data has various types according to information. In particular, for example, a USD (user service description (User Service Description)) that is signaling data in a unit of a service is available.

The USD includes various kinds of control information. As representative control information, an MPD (media presentation description (Media Presentation Description)) that is signaling data having a manifest file in which various guide information and control information corresponding to content (AV segments) are stored is available.

The various kinds of signaling data are data necessary for a reception apparatus (client) to perform reception, a reproduction process and a control process of an AV segment or an application (application program) transmitted from a transmission apparatus, and are set, for example, as files (metafiles) separate for different categories and transmitted from a transmission apparatus.

It is to be noted that, as an upper layer of the (1) broadcast physical layer (Broadcast PHY), a utilization permitting layer of a new protocol in the future (Future Extensibility) is set.

The (1) broadcast physical layer (Broadcast PHY) is a physical layer configured by a communication controlling section that controls a communication section, for example, of a broadcasting system for executing broadcast communication.

The (2) IP multicast layer (IP Multicast) is a layer that executes a data transmission and reception process in accordance with the IP multicast.

The (3) UDP layer is a creation and analysis processing layer of a UDP packet.

The (4) ROUTE layer is a layer for performing storage or retrieval of transfer data in accordance with the ROUTE protocol that is an extended type FLUTE protocol.

ROUTE is a multicast protocol of a scalable file object called ALC similarly to FLUTE and particularly is configured from a combination of an LCT or FEC component that is a building block of the protocol.

Figure 4:
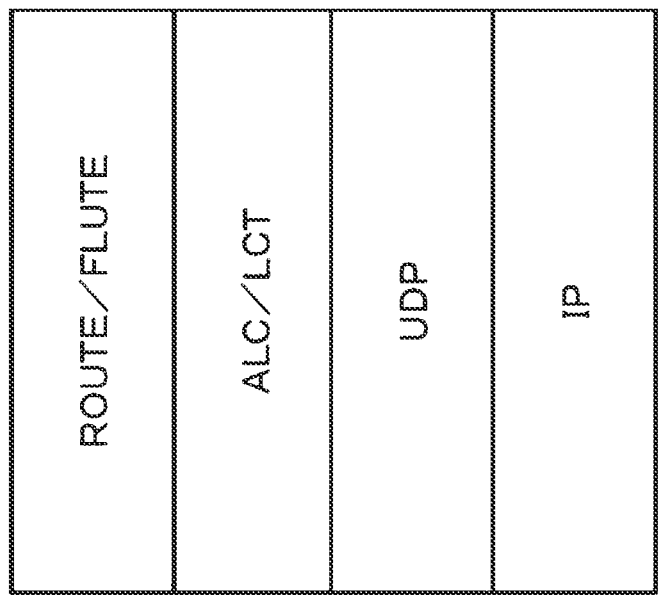
FIG. 4 is a view depicting a protocol stack relating to ROUTE and FLUTE.

FIG. 4 depicts a protocol stack relating to ROUTE and FLUTE.

The (5) ESG, NRT content, DASH (ISO BMFF) and Video/Audio/CC are data transferred in accordance with the ROUTE protocol.

A broadcast type distribution service in accordance with the DASH standard is called MBMS (Multimedia Broadcast Multicast Service). As a method for efficiently implementing the MBMS by LTE, eMBMS (evolved Multimedia Broadcast Multicast Service) is available.

MBMS or eMBMS is a broadcast type distribution service and is a service by which same data, for example, a movie content or the like is distributed all at once using a common bearer to a plurality of user terminals (UEs) that are reception apparatus positioned within a particular area. By broadcast distribution in accordance with MBMS or eMBMS, the same content can be provided simultaneously to a large number of reception apparatus such as smartphones, PCs or television sets positioned within a distribution service providing area.

MBMS and eMBMS prescribe a process for downloading a file, which complies with the 3GPP file format (ISO-BMFF file, MP4 file), in accordance with the transfer protocol ROUTE or FLUTE.

Most of the following data described hereinabove with reference to FIG. 2, namely,
(a) signaling data 50,
(b) AV segment 60, and
(c) other data (ESG, NRT content and so forth) 70 are transmitted in accordance with the ROUTE protocol or the FLUTE protocol.

The (5) ESG, NRT content, DASH (ISO BMFF) and Video/Audio/CC are data transferred in accordance with the ROUTE protocol.

The ESG is electronic service guide (Electronic Service Guide) and is guide information such as, for example, a broadcasting program table.

The NRT content is a content of the non-real time type.

As described hereinabove, the NRT content includes, for example, various application files executed on a browser of a reception apparatus that is a client, data files of moving images, still images and so forth, and so forth.

The Video/Audio/CC is real data that becomes a reproduction target such as videos, audios and so forth distributed in accordance with the DASH standard.

The (6) application layer (Applications (HTML5) is an application layer for executing creation or analysis of data to be transferred in accordance with the ROUTE protocol and outputting control and so forth of other various data, and performs data creation, analysis, outputting processes and so forth in which, for example, HTML5 is applied.

On the other hand, the protocol stack corresponding to the (b) unicast (broadband) communication (for example, P2P communication of the HTTP type) depicted at the right side in FIG. 3 has the following layers in order from a lower layer:
(1) broadband physical layer (Broadband PHY);
(2) IP unicast layer (IP Unicast);
(3) TCP layer;
(4) HTTP layer;
(5) ESG, Signaling, NRT content, DASH (ISO BMFF) and Video/Audio/CC; and
(6) application layer (Applications (HTML5)).

The (1) broadband physical layer (Broadband PHY) is a physical layer configured by a communication controlling section such as a device driver that controls a communication section such as, for example, a network card that executes broadband communication.

The (2) IP unicast layer (IP Unicast) is a layer that executes an IP unicast transmission and reception process.

The (3) HTTP layer is a creation and analysis processing layer of an HTTP packet.

The upper layers are similar to those of the stack configuration of the (a) broadcast communication (for example, broadcasting type data distribution) at the left side in FIG. 3.

It is to be noted that the transmission apparatus (server) 20 and the reception apparatus (client) 30 perform processing in accordance with at least one of the two processing systems of FIG. 3, namely, of the two communication protocol stacks:
(a) broadcast communication (for example, broadcasting type data distribution); and
(b) unicast (broadband) communication (for example, P2P communication of the HTTP type).

In the protocol stack depicted in FIG. 3, an attribute of a file group (including a URL that is an identifier of a file) to be multicast transferred in accordance with ROUTE (FLUTE) not only can be described in a control file of ROUTE (FLUTE) but also can be described in signaling (Signaling) data in which a file transfer session is to be described. Further, a further detailed attribute of the file transfer session can be described through an ESG (that can be applied also to a presentation application to an end user).

As described hereinabove, normalization of ATSC (Advanced Television System Committee) 3.0 is being progressed as one of standards relating to a data distribution system through a broadcasting wave and a network.

In standardization of the IP-based transport stack in ATSC3.0, a method has been proposed by which a file based on the file format of MPEG-DASH (ISO-BMFF file, MP4 file) is transferred by the ROUTE (Real-Time Object Delivery over Unidirectional Transport) protocol extended from FLUTE (File Delivery over Unidirectional Transport), and is set as a standard candidate method.

By applying the ROUTE protocol, a fragmented MP4 (fragmented MP4) file sequence of the DASH standard, an MPD (Media Presentation Description)) that is a control information (signaling data) storage metafile of the DASH standard and, for example, such signaling data for broadcast distribution as the USBD/USD (User Service Bundle Description/User Service Description), and the S-TSID (Service based Transport Session Description)

and so forth can be transmitted.

The USD is configured from information of a predetermined service unit such as, for example, a broadcasting station or a broadcasting program and is configured from information necessary for a reception apparatus to utilize a service such as access information (URL or the like) for receiving a service, codec information, reproduction timing information and so forth. The USBD is a bundle (bundle) of USDs.

The S-TSID is additional information of a unit of a service and has recorded therein additional information that is not recorded in a USD.

As described hereinabove, the ROUTE protocol is a protocol based on FLUTE. A metadata file that describes transfer control parameters in FLUTE is called FDT (File Delivery Table), and a metadata file in which transfer control parameters in ROUTE are described is called S-TSID (Service based Transport Session Description). The S-TSID is a superset of FDTs and includes FDTs.

USBD/USD, S-TSID, MPD and so forth proposed as signaling data of the ATSC3.0 service layer (SLS: Service Layer Signaling) are all transferred by a ROUTE session.

It is to be noted that, in a broadcasting service in compliance with ATSC3.0, communication that applies not only the ROUTE protocol described above but also MMT (MPEG Media Transport) can also be utilized.

[4. Example of Data Output to which Application in Reception Apparatus is Applied]

Now, an example of data outputting from the reception apparatus (client) 30 that receives data of various broadcasting content, applications and so forth from the transmission apparatus 20 such as the broadcasting server 21 and outputs the data is described.

Figure 5:
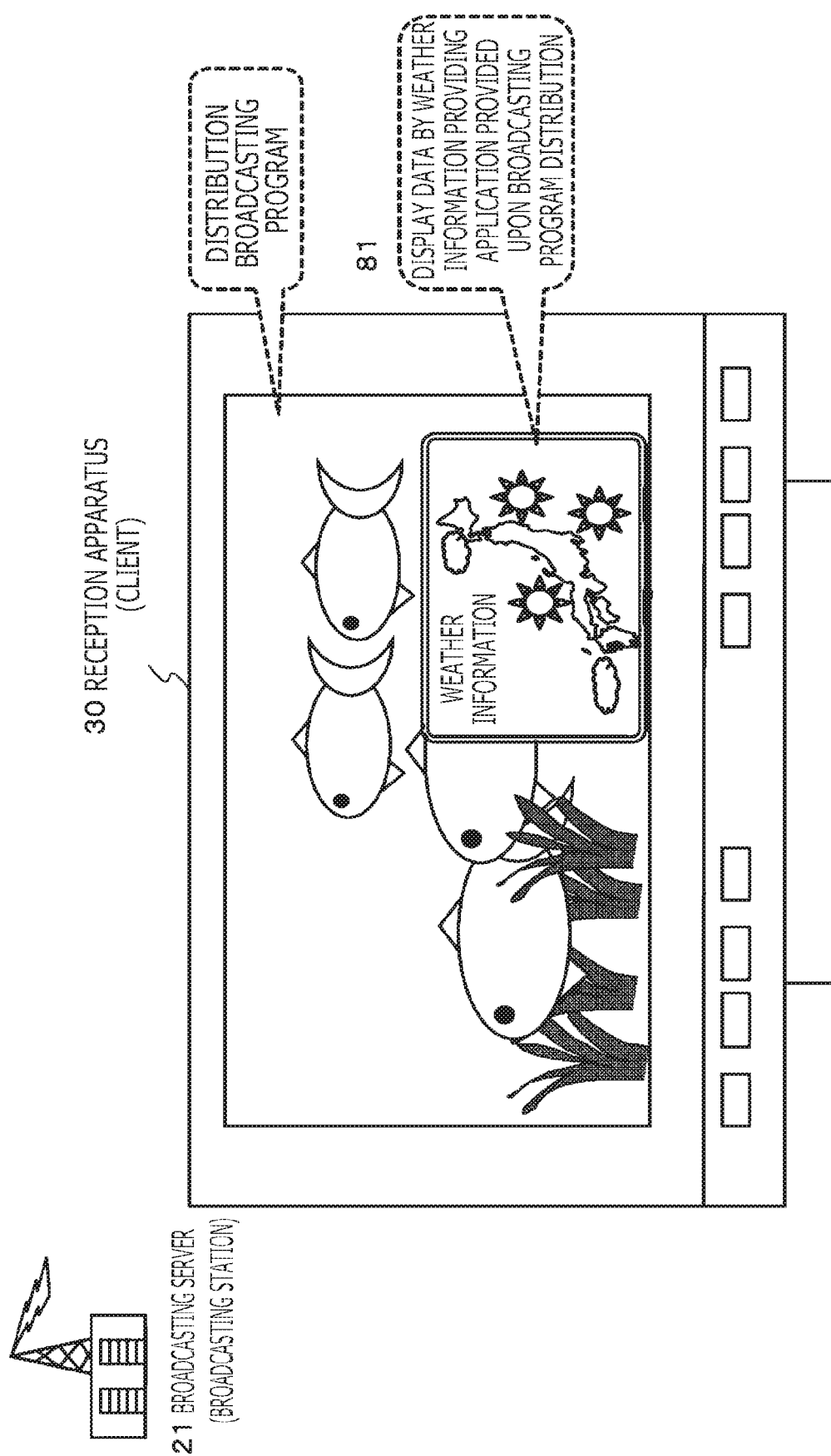
FIG. 5 is a view illustrating an example of a data output of the reception apparatus (client) 30.

FIG. 5 depicts a state in which the reception apparatus 30 receives a certain broadcasting program content from the transmission apparatus 20 such as the broadcasting server 21 and displays the broadcasting program content on a display section of the reception apparatus 30.

The transmission apparatus 20 such as the broadcasting server 21 provides, together with broadcasting program distribution, an application for displaying weather information and various data files to be utilized in the weather information displaying application, for example, data files including various data of moving images, still images, audio and so forth as NRT content (non-real time content) to the reception apparatus 30.

In the following description, such applications and data files are referred to as "resources."

The reception apparatus 30 can utilize a "resource" received from the transmission apparatus 20, namely, a data file configured by an application, to perform display of weather information together with broadcasting program display as depicted in FIG. 5.

In order to perform such data display that utilizes an application, it is necessary to acquire all files configuring the application, for example, an HTML (HyperText Markup Language) file,
a moving image file,
an audio file, and
a style sheet
and store them into a cache section that is a storage section of the reception apparatus 30.

However, for example, if such a state that the remaining cache space of the reception apparatus becomes short and some moving image files cannot be cached occurs and the application is executed in this state, then such a situation that an incomplete application in which the reproduction region of the moving image that has not been cached successfully is blank is executed occurs.

Now, an example in which the reception apparatus 30 utilizes an application received from the transmission apparatus 20 to display an advertisement is described with reference to FIG. 6.

Figure 6:
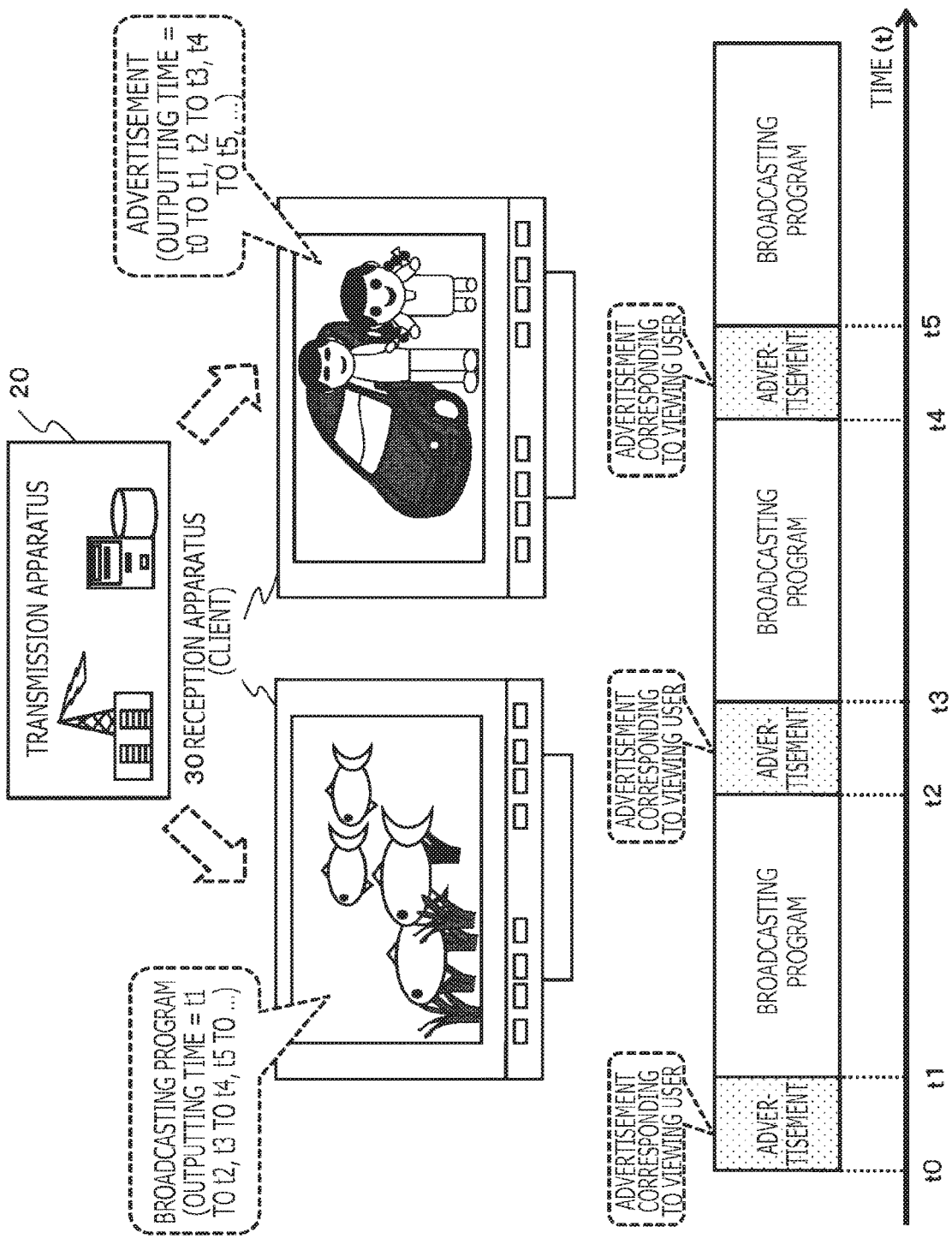
FIG. 6 is a view illustrating an example of selection of an output advertisement utilizing various user information.

To the reception apparatus 30, for example, a movie, a news or some other broadcasting program (main content) and an advertisement are outputted alternately along a timeline (time axis (t)) depicted at a lower portion in FIG. 6.

If the broadcasting program start time of a certain channel selected by a user is represented by t0, then a broadcasting program and an advertisement are outputted alternately in accordance with time transition in the following manner:

time period from t0 to t1: advertisement;
time period from t1 to t2: broadcasting program;
time period from t2 to t3: advertisement;
time period from t3 to t4: broadcasting program;
time period from t4 to t5: advertisement; and
after t5: broadcasting program.

Here, the advertisement outputted to the reception apparatus 30 is displayed utilizing an application transmitted separately from a broadcasting program content transmitted from the transmission apparatus 20. The transmission apparatus 20 transmits a plurality of advertisement applications for displaying advertisements according to various users, so-called target advertisements, as NRT (non-real time) content to the reception apparatus 30. For example, the transmission apparatus 20 transmits such advertisement applications for various users (viewers) as (a) an advertisement displaying application of a game for children,
(b) an advertisement application of fashion items for young people, and
(c) an advertisement application of alcoholic drinks for adults
to the reception apparatus 30.

The reception apparatus 30 selectively acquires and outputs an advertisement optimum to a user on the basis of user (viewer) information set by the reception apparatus 30 side.

The user information is various information such as, for example, an age, a sex, an address, a hobby, a taste and so forth of a user (viewer).

For such user information, information registered in advance in the storage section of the reception apparatus is used.

Alternatively, the reception apparatus 30 may be configured such that, at a point of time at which a broadcasting program is started, user information is inputted by the user (viewer) such that the input information is utilized.

An application acquired, for example, through a broadcasting wave by the reception apparatus 30 is configured from various data files as described hereinabove. In particular, if execution of an application is started after all of a plurality of application configuration files such as, for example, an HTML (HyperText Markup Language) file,
a moving image file,
an audio file, and
a style sheet are acquired and stored into a cache section that is the storage section of the reception apparatus 30 as described hereinabove, then full advertisement reproduction can be performed.

In order to execute a cache process of application configuration files with certainty, it is significant for the reception apparatus 30 to selectively acquire, after comparing the cache free space of the own apparatus and the data size of an application scheduled to acquire with each other, cacheable data and start a cache process.

By executing such cache control, data whose cache process is started can be stored with certainty into the cache section (storage section) of the reception apparatus 30.

If a cache process is started without performing such cache control, then there is the possibility that such a situation that the cache section (storage section) overflows in the middle of the cache process and part of the data cannot be cached may occur.

The reception apparatus 30 of the present disclosure executes cache control for comparing the cache free space of the own apparatus and the data size of the application scheduled to acquire with each other, selectively acquiring cacheable data and then starting a cache process.

A particular configuration of the cache controlling process is hereinafter described.

It is to be noted that the example of the application described hereinabove with reference to FIGS. 5 and 6 is one example, and as an application to be provided to the reception apparatus 30, the transmission apparatus 20 has various applications in addition to the example described with reference to FIGS. 5 and 6.

For example, various applications such as a news information providing application, a player information providing application during baseball live broadcasting, applications for executing map information in a travel program, hotel information, quiz, and questionnaire processes and so forth are available.

[5. Example of Configuration and Example of Processing of Reception Apparatus]

Now, an example of a configuration and an example of processing of the reception apparatus 30 are described with reference to FIG. 7 and subsequent figures.

It is to be noted that the reception apparatus 30 is configured from a television set 31, a PC 32, a portable terminal 33 or some of various apparatus such as, for example, a smartphone, a tablet terminal, a smart watch, a wearable device and so forth as described hereinabove with reference to FIG. 1.

Figure 7:
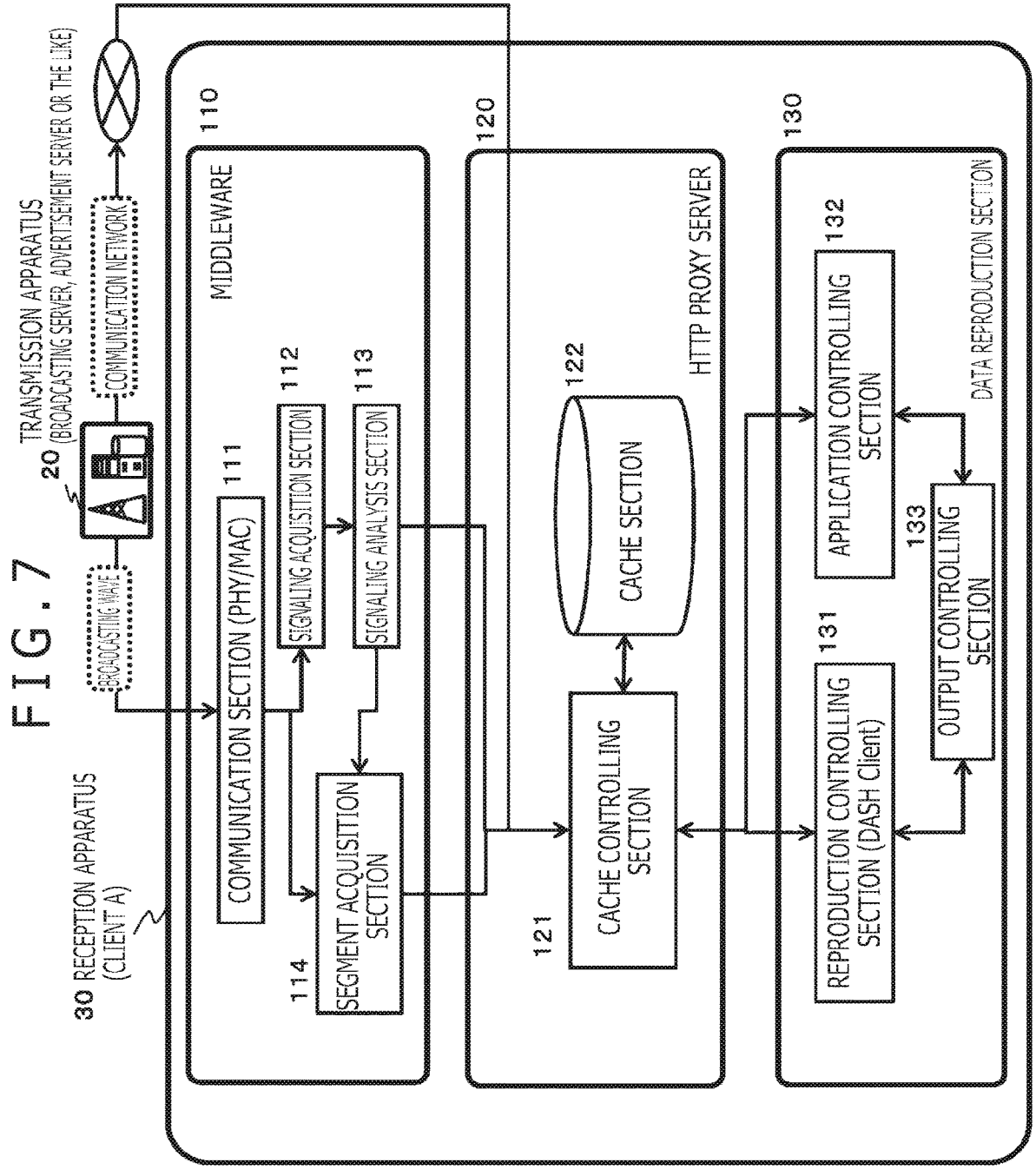
FIG. 7 is a view illustrating an example of a configuration of the reception apparatus.

The reception apparatus 30 depicted in FIG. 7 includes middleware 110 that receives transmission data from the transmission apparatus 20 such as a broadcasting server or an advertisement server, a proxy server 120 that executes an analysis or a cache process of reception data, and a data reproduction section 130 that executes a data reproduction process by broadcasting program reproduction or application execution.

The transmission apparatus 20 such as a broadcasting server or an advertisement server transmits an AV segment configured from a broadcasting content or the like, an application, signaling data and other data by data transmission through a broadcasting wave or a communication network such as the Internet.

The middleware 110 of the reception apparatus 30 depicted in FIG. 7 receives and analyzes provision data through a broadcasting wave from the transmission apparatus 20.

The middleware 110 includes a communication section (PHY/MAC) 111, a signaling acquisition section 112 that acquires signaling data, a signaling analysis section 113 that analyzes signaling data, and a segment acquisition section 114 that acquires signaling data, broadcasting program content data of videos, audios and so forth, and a data file of an NRT content or the like of an application or the like.

Data received by the middleware 110 is stored into a cache section (proxy cache) 122 through a cache controlling section 121 of the proxy server 120. The proxy server 120 further stores the data acquired from the transmission apparatus 20 through a network into the cache section 122.

The cache controlling section 121 of the proxy server 120 receives a data acquisition request from a reproduction controlling section (DASH Client) 131 or an application controlling section 132 of the data reproduction section 130 and provides requested data to the data reproduction section.

For example, the cache controlling section 121 performs an address resolution process or the like in response to a data acquisition request from the reproduction controlling section (DASH Client) 131 or the application controlling section 132, acquires data corresponding to an address from the cache section 121 and outputs the data to the reproduction controlling section (DASH Client) 131 or the application controlling section 132 of the data reproduction section 130. It is to be noted that, where the requested data is not stored in the cache section 122, the requested data may be acquired from the outside and provided.

The reproduction controlling section (DASH client) 131 of the data reproduction section 130 executes reproduction control of a content transmitted in compliance with the DASH (MPEG-DASH) standard.

As described hereinabove, the MPEG-DASH standard includes the following two standards:

(a) standard for a manifest file (MPD: Media Presentation Description) for describing metadata that is management information for a moving image or an audio file; and (b) standard for a file format (segment format) for transmission of a moving image content.

The content distribution from the transmission apparatus 20 to the reception apparatus 30 is executed in compliance with the MPEG-DASH standard described hereinabove.

A content is transmitted as segments (AV segments or the like) that are divisional data of a predetermined unit, for example, in accordance with the MP4 file format prescribed in MPEG, and the reproduction controlling section (DASH Client) 131 refers to a manifest file (MPD) to execute a process for acquiring the segments in which the reproduction target content is stored and so forth.

The application controlling section 132 performs control of execution, starting, ending and so forth of an application provided from the transmission apparatus 20 such as, for example, the weather forecast and advertisement applications described hereinabove with reference to FIGS. 5 and 6.

An output controlling section 133 acquires broadcasting program configuration data or application execution data provided from the reproduction controlling section 131 or the application controlling section 132 and executes a decoding process of the acquired data, an outputting process to the display section and so forth.

It is to be noted that the reproduction controlling section (DASH Client) 131 or the application controlling section 132 refers to signaling data transmitted from the transmission apparatus 20 (broadcasting server 21, advertisement server 22 or the like), acquires necessary data in accordance with information described in the signaling data from the proxy server 120 and executes reproduction control or application control in accordance with information described in the signaling data.

As described hereinabove with reference to FIG. 2, the signaling data 50 is configured from broadcasting program schedule information such as a broadcasting program table, address information (URL (Uniform Resource Locator) or the like) that is required for broadcasting program acquisition, information necessary for a reproduction process of a content, guide information configured, for example, from codec information (encoding method and so forth) and various control information such as application controlling information.

The reproduction controlling section (DASH Client) 131 or the application controlling section 132 executes a data acquisition process, data reproduction control, application execution control and so forth based on the signaling data acquired by acquiring signaling data (SLS: Service Layer Signaling).

For example, the application controlling section 132 executes application control based on various signaling data in which attribute information or control information corresponding to an application is recorded. In particular, the application controlling section 132 executes application control that utilizes an application information table (AIT: Application Information Table) in which, for example, the USBD/USD that is signaling data of ATSC3.0, the S-TSID or attribute information or control information corresponding to an individual application is recorded and so forth.

It is to be noted that the reproduction controlling section (DASH Client) 131 or the application controlling section 132 executes processing utilizing data stored in the cache section 122 of the proxy server 120.

The data stored in the cache section 122 is data received by the middleware (Client Local ATSC Middleware) 110 or data received by the proxy server 120 through a network.

The data acquired through a broadcasting wave or a communication network by the middleware 110 or the proxy server 120 is, for example, a DASH-MPD file, a DASH segment (segment) file, other general application file, an SLS (Service level Signaling) file in which signaling data is stored or the like.

They are stored into the cache section 122 under the control of the cache controlling section 121.

Thereafter, the cache controlling section 121 acquires requested data from the cache section 122 in response to a request from the reproduction controlling section (DASH Client) 131 or the application controlling section 132, and the requested data is provided to the reproduction controlling section (DASH Client) 131 or the application controlling section 132, by which it is utilized in a data reproduction process such as rendering of a stream, execution of an application and so forth.

If the reproduction controlling section (DASH Client) 131 or the application controlling section 132 issues a request for provision of a segment (segment) file, other general application file or a signaling data file to the cache controlling section 121 of the proxy server 120 (HTTP request), then the cache controlling section 121 of the proxy server 120 receiving the request performs data acquisition from the cache section 122. It is to be noted that, if the cache section 122 does not have the data, then an acquisition process through a broadcast or a network is performed.

Further, the reproduction control (DASH Client) 131 or the application controlling section 132 acquires signaling data in which reproduction information of a content, control information of an application and so forth are recorded. The signaling data are acquired by the signaling acquisition section (SLS Signaling Retriever) 112.

For example, various signaling data such as the USBD/USD, AIT, S-TSID, MPD and so forth are acquired and utilized.

The signaling acquisition section (SLS Signaling Retriever) 112 extracts signaling data to be carried by an SLS LCT packet that is broadcast received through the communication section (ATSC tuner: ATSC3.0 PHY/MAC) 111.

The signaling data are acquired by the signaling acquisition section 112 of the middleware 110 and analyzed by the signaling analysis section (SLS Signaling Parser) 113.

The signaling data include, for example, an AV segment required for broadcasting program reproduction and address information (URL) for acquiring various data files (resources) required for execution of an application and so forth, and the signaling analysis section 113 performs an acquisition process of address information (broadcasting distribution address information) for acquiring a necessary segment or resource file and so forth.

On the basis of the broadcasting distribution address information, an LCT packet in which a desired file is stored is acquired from a broadcasting stream, and acquired data are deployed in the cache section 122 of the proxy server 120.

It is to be noted that the cache controlling section 121 of the proxy server 120 confirms, upon acquisition of an application and a cache process, the cacheable data capacity of the cache section 122, acquires an application size and a data size of a unit of a component of the application from the signaling data, selects cacheable data and executes a cache process. This cache process is hereinafter described in detail.

[6. Example of Configuration of Application]

As described hereinabove with reference to FIGS. 5 and 6, the reception apparatus 30 receives various applications, for example, through a broadcasting wave from the transmission apparatus 20 and executes the received applications.

An example of a configuration of an application provided from the transmission apparatus 20 to the reception apparatus 30 is described below with reference to FIG. 8 and subsequent figures.

Figure 8:
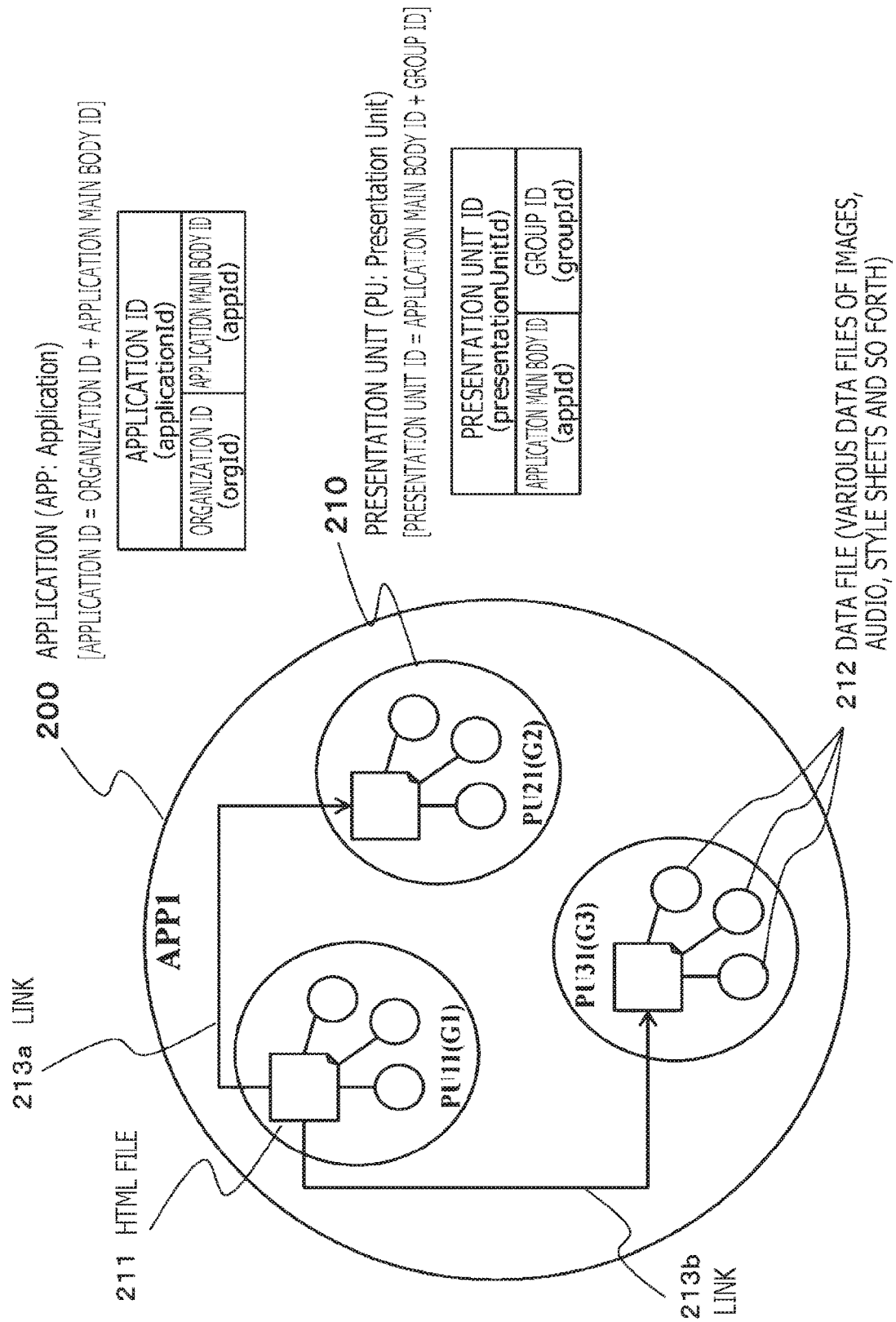
FIG. 8 is a view illustrating an example of a configuration of an application.

FIG. 8 depicts an example of a configuration of one application (APP1) 200.

The application (APP1) 200 is configured from one or more presentation units (PUs: Presentation Units) 210.

It is to be noted that one presentation unit (PU: Presentation Unit) is configured from a set of one or a plurality of HTML (HyperText Markup Language) files 211 and data files 212 presented utilizing the HTML files.

In particular, for example, one presentation unit (PU) is a unit configured from the following components:

(1) one or a plurality of HTML files;

(2) an image (moving image, still image) file outputted in accordance with the HTML;

(3) an audio file outputted in accordance with the HTML; and (4) a style sheet storage file that prescribes a data output style in accordance with the HTML.

For example, one presentation unit (PU) is set by the components described above.

If all of data belonging to one presentation unit (PU) can be acquired, then it is guaranteed that data outputting by an HTML document included in the presentation unit (PU), for example, outputting of a Web page, is executed in a complete form.

It is to be noted that the application (APP1) 200 is configured from one or a plurality of presentation units (PUs: Presentation Units).

In the example depicted in FIG. 8, the application (APP1) 200 has three presentation units (PU11 (G1 (group 1)) to PU31 (G3 (group 3))).

To the presentation units (PUs) in one application, group IDs (groupId) different from each other are set.

To each of configuration data (HDML file, data file) of a presentation unit (PU), a group ID is set as an identifier such that it can be identified to which one of the PUs each of the configuration data belongs.

Further, a link is sometimes set between the presentation units (PU11 (G1) to PU31 (G3)). In the example of FIG. 8, a link 213a from the HTML file 211 of the presentation unit (PU11 (G1)) to the HTML file of the presentation unit (PU21 (G2)) is set.

Further, a link 213b from the HTML file of the presentation unit (PU11 (G1)) to the HTML file of the presentation unit (PU31 (G3)) is set.

The two PUs between which a link is set have a relationship therebetween in which transition of a PU that, for example, during execution of a presentation unit (PU) of the link source, execution of a presentation unit of a link destination is started is performed in response to a trigger provided by some event.

If a user clicks part of a region in display data, for example, by an HTML document of the presentation unit (PU11 (G1)), for example, a display region of an icon such as a tag, then the click process is detected as a transition execution event, and such a process as displaying the display data based on an HTML document of the presentation unit (PU21 (G2)) of the link destination is performed.

As the transition event, not only a user operation but also various events are available such as an event based on a description of signaling data such as, for example, an application information table (AIT) or the like, for example, based on lapse of time.

It is to be noted that a control code that designates starting of display, ending of display or the like of an application or other application control information is recorded in an application information table (AIT) that is signaling data corresponding to an application, and the application controlling section 132 of the reception apparatus 30 executes the application in accordance with the recorded information of the AIT.

It is to be noted that, in the AIT, also acquisition information (URL or the like) of a particular application (APP), or a control code that prescribes an execution mode of the application, for example, a control code that is execution mode prescribing information of various applications such as an automatic activation process (AUTOSTART), a prefetch (prefetch) process or the like is recorded.

It is to be noted that, to an application, an application ID that is an identifier for identifying the individual application is set.

In signaling data such as the AIT, various information relating to the application, for example, application size information, access information, control information and so forth, are recorded together with the application ID.

Details of information recorded in signaling data such as the AIT are hereinafter described.

As depicted in FIG. 8, an application ID is configured as connection data of two IDs including:

(a) organization ID (orgId); and
(b) application main body ID (appId).

The organization ID is an identifier indicative of an organization such as a broadcasting station that provides the application, a creator of the application or the like.

The application main body ID is an identifier set in an associated relationship with each application main body.

For example, if the organization ID in the former half of the application ID is referred to, then it becomes possible to confirm an organization such as a broadcasting station that provides the application, a creator of the application or the like, and if the application main body ID in the latter half of the application ID is referred to, then it becomes possible to individually identify one application from among a plurality of applications that are provided by one organization.

Also to a presentation unit (PU) that is a component of an application, a presentation unit ID (PUID) that is an identifier for identifying the individual presentation unit (PU) is set.

Although details are hereinafter described, in signaling data such as the S-TSID in which attribute information of access information or the like relating to a presentation unit (PU) is recorded, a presentation unit ID (PUID) is recorded in an associated relationship with each file belonging to the presentation unit (PU).

The reception apparatus 30 can identify, by referring to the S-TSID that is signaling data provided by the transmission apparatus 20 such as a broadcasting station, to which presentation unit (PU) each file provided by the transmission apparatus 201 belongs.

It is to be noted that, in the S-TSID, also a data size in a unit of each presentation unit (PU) is recorded.

Details of information recorded in signaling data such as the S-TSID are hereinafter described.

As depicted in FIG. 8, the presentation unit ID (PUID) is configured as data obtained by connecting two IDs including:

(a) an application main body ID (appId); and
(b) a group ID (groupId).

The application main body ID is an identifier set in an associated relationship with an application main body to which the presentation unit belongs.

A value equal to that of the "application main body ID" that is a component of the application ID described hereinabove is set.

A group ID is an identifier of each individual presentation unit (PU). Where a plurality of presentation units (PUs) are included in one application, individually different group IDs are set to them.

If the application main body ID in the former half of a presentation unit ID (PUID) is referred to, then an application to which the presentation unit belongs can be confirmed, and if the group ID in the latter half of the presentation unit ID (PUID) is referred to, then a plurality of presentation units (PUs) included in one application can be identified individually.

Although FIG. 8 depicts only one application (APP1), when the reception apparatus 30 executes an application, it may perform processing utilizing a plurality of applications.

A particular example is described with reference to FIG. 9.

Figure 9:
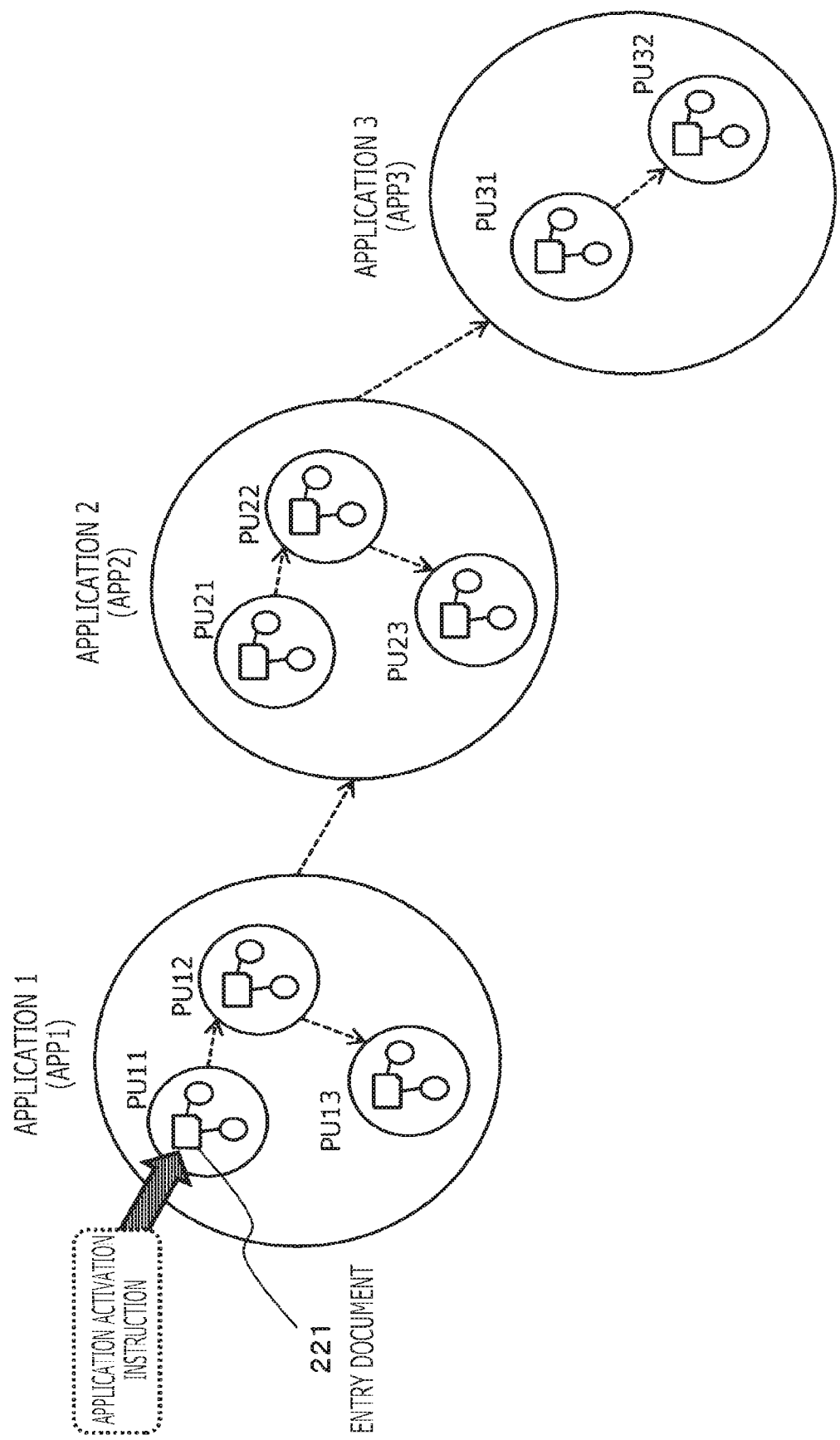
FIG. 9 is a view illustrating a configuration and a link of applications.

FIG. 9 depicts the following three applications:
(1) application 1 (APP1);
(2) application 2 (APP2); and
(3) application 3 (APPS).

A broke line arrow mark depicted in FIG. 9 indicates a link relationship.

A link is set between presentation units (PUs) in each application as described hereinabove with reference to FIG. 8 and is set, in the example of FIG. 9, also between the applications.

It is assumed that, in a process in which the applications 1 to 3 are utilized, the application that is activated first is the application 1 (APP1), and an HTML document of one presentation unit (PU11) in the application 1 (APP1) is an HTML document that is activated first.

It is to be noted that an HTML document that is utilized first upon execution of a certain application is called entry document.

In the example depicted in FIG. 9, the entry document of the application 1 (APP1) is an HTML document of the presentation unit (PU11), namely, an entry document 221 depicted in FIG. 9.

A link indicated by a broken line arrow mark directed from the application 1 (APP1) to the application (APP2) indicates that, during execution of the application 1 (APP1), a process for activating the application 2 (APP2) is performed on the basis of occurrence of a predetermined transition event such as, for example, a screen image operation by a user or lapse of time.

A link is sometimes set between a plurality of applications to perform a process in which the plurality of applications are applied in this manner.

It is to be noted that information of a link relationship between applications or a link relationship between presentation units (PUs) is recorded in signaling data such as the AIT or the S-TSID, and the reception apparatus 30 can grasp each link relationship on the basis of the description of the signaling data.

[7. Cache Process of Application]

In order for the reception apparatus 30 to execute an application, it is necessary to store (cache) configuration data of the application into the storage section (cache section) of the reception apparatus.

For example, it is necessary to store configuration data (application resource) of an application of an execution target into the cache section 122 depicted in FIG. 7.

The application is executed by the application controlling section 130, and the application controlling section 130 acquires data (resources) necessary for application execution from the cache section 122 to execute the application.

If necessary date is not stored in the cache section 122, then there is the possibility that an execution error of the application may occur.

Although it is necessary to store necessary data into the cache section 122 before an execution timing of an application, if the cache section 122 does not have a sufficient free space, then there is the possibility that all of application configuration data may not be able to be stored into the cache section 122.

In the configuration of the present disclosure, the reception apparatus 30 compares the cache size corresponding to the data amount (free space) capable of being stored into the cache section 122 and the application size or the presentation unit (PU) size with each other to perform a data storage process (cache process) into the cache section 122 in a unit of a presentation unit (PU) or in a unit of an application.

If data are stored in the cache section 122 at least in a unit of a presentation unit (PU), then it is guaranteed that data outputting to which an HTML document included in presentation units (PUs) is executed in a complete form.

In the following, a cache process by the reception apparatus 30, namely, a process for storing data into the cache section 122 in a unit of an application or in a unit of a presentation unit (PU) is described.

Figure 10:
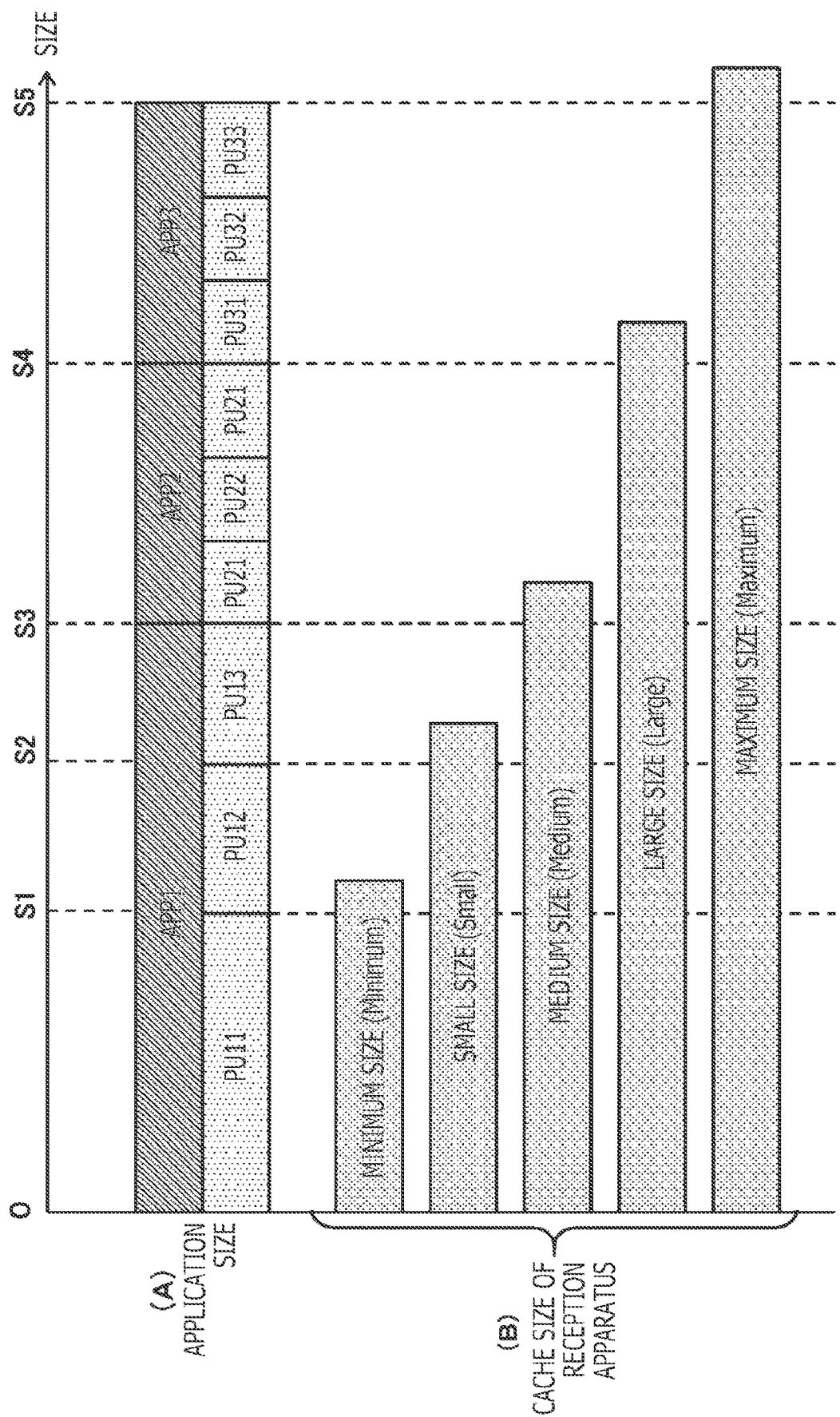
FIG. 10 is a view illustrating an example of correspondence between a size of an application and a cache size.

FIG. 10 is a view illustrating an example of a corresponding relationship of an application and a data size of a presentation unit (PU) to a cache size of the reception apparatus.

The axis of abscissa is an axis corresponding to the data size and the cache size.

FIG. 10 depicts respective size setting examples of
(A) an application size, and
(B) a cache size of the reception apparatus from above.

The example depicted as the (A) application size indicates individual sizes the following three applications described hereinabove with reference to FIG. 9:
(1) application 1 (APP1);
(2) application 2 (APP2); and
(3) application 3 (APP3).

The data size of the application 1 (APP1) is S3.

The total data size of the application 1 (APP1)+application 2 (APP2) is S4.

The total data size of the application 1 (APP1) to the application 3 (APPS) is S5.

Further, the application 1 (APP1) is configured from three presentation units (PUs).

The data size of a presentation unit (PU11) is

The total data size of the presentation unit (PU11)+presentation unit (PU12) is S2.

The total data size of the presentation unit (PU11) to presentation unit (PU13) is S3 and coincides with S3 of the data size of the application 1 (APP1).

Meanwhile, as an example of a cache size of the (B) reception apparatus, the following five cache sizes are indicated:
(1) minimum size (Minimum);
(2) small size (Small);
(3) medium size (Medium);
(4) large size (Large); and
(5) maximum size (Maximum).

The sizes are an example of cache sizes that can be utilized by the reception apparatus 30 as various user apparatus that execute an application provided from the transmission apparatus 20 such as, for example, a portable terminal, a PC or the like.

(1) The data size, namely, the cache size, which can be stored (cached) into a cache of the minimum size (Minimum) is equal to or greater than S1 but smaller than S2.

(2) The data size, namely, the cache size, which can be stored (cached) into a cache of the small size (Small) is equal to or greater than S2 but smaller than S3.

(3) The data size, namely, the cache size, which can be stored (cached) into a cache of the medium size (Medium) is equal to or greater than S3 but smaller than S4.

(4) The data size, namely, the cache size, which can be stored (cached) into a cache of the large size (Large) is equal to or greater than S4 but smaller than S5.

(5) The data size, namely, the cache size, which can be stored (cached) into a cache of the maximum size (Maximum) is equal to or greater than S5.

When the reception apparatus having such various cache sizes try to cache (store) three applications transmitted from a transmission apparatus into the cache section and then execute the applications, it is necessary to select a cache target in response to each of the cache sizes.

Although ideally it is desired to cache all application configuration data files of all of the application 1 to application 3, all of the three applications can be stored only by the cache of (5) the maximum size (Maximum).

It is necessary for reception apparatus having caches of the (1) minimum size (Minimum) to (4) large size (Large) to perform a process for selecting and caching cache target data.

A cache target selection process of the reception apparatus of the present disclosure is executed in the following rules.

(Rule 1) If the cache size is sufficient to store all of the applications having a link relationship to each other, then all of the applications having the link relationship to each other are stored (cached).

(Rule 2) If the cache size is not sufficient to store all of the applications having a link relationship to each other, then data are stored (cached) in a unit of an application or in a unit of a presentation unit (PU).

(Rule 3) The order of priority in application storage in a unit of an application follows a link route from an initial execution application.

(Rule 4) The order of priority in storage in a unit of a presentation unit (PU) follows a link route from a presentation unit (PU) having an entry document.

The reception apparatus applies the rules described above to compare the cache size of the own apparatus with the application size and the respective presentation unit (PU) sizes to select a cache target.

When a cache target selection process in accordance with the rules described above is performed, the cache target data according to the five cache sizes depicted in FIG. 10 are set in the following manner:

(1) minimum size (Minimum)=presentation unit (PU11);
(2) small size (Small)=presentation unit (PU11)+presentation unit (PU12);
(3) medium size (Medium)=application (APP1)
(4) large size (Large)=application (APP1)+application (APP2); and
(5) maximum size (Maximum)=application (APP1)+application (APP2)+application (APPS).

Upon such cache target selection processes, the reception apparatus refers to the AIT or the S-TSID that is signaling data transmitted from the transmission apparatus 20.

The signaling data have recorded therein information of a unit of an application and information of a unit of a presentation unit (PU).

For example, size information and link information of each application or each PU are recorded in an associated relationship with an application ID and a presentation unit ID (PUID) described hereinabove with reference to FIG. 8.

An example of a cache target selection process in which ID information is used is described with reference to FIG. 11.

Figure 11:
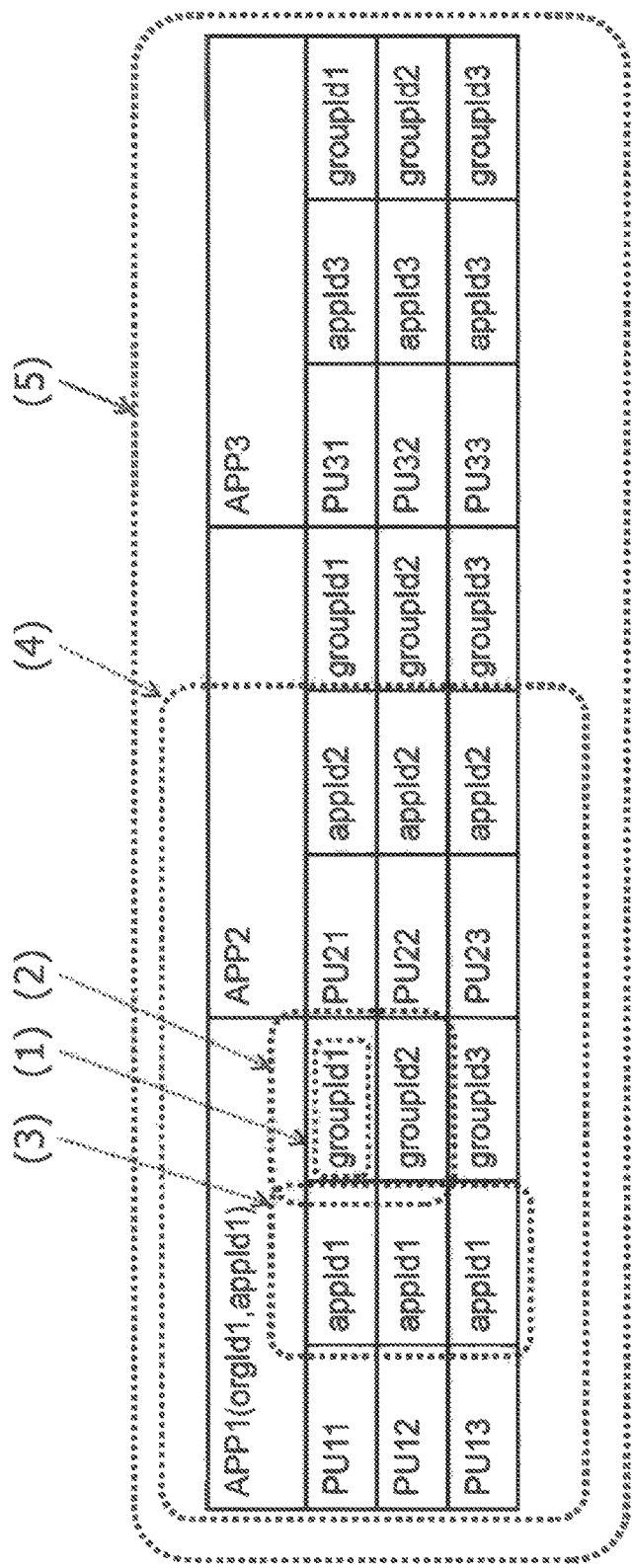
FIG. 11 is a view illustrating an example of a cache target selection process based on correspondence between a size of an application and a cache size.

FIG. 11 depicts an example of a cache target selection process in the case of the following five cache sizes described hereinabove with reference to FIG. 10:

(1) minimum size (Minimum);
(2) small size (Small);
(3) medium size (Medium);
(4) large size (Large); and
(5) maximum size (Maximum).

A reception apparatus having a permissible cache size of the (1) minimum size (Minimum) selects the presentation unit (PU11) having an entry document as a cache target PU of the highest priority rank.

The presentation unit (PU11) having an entry document can be discriminated on the basis of the signaling data (AIT, S-TSID).

The reception apparatus selects a file having the PUID of the presentation unit (PU11) having an entry document as a cache target and executes a cache process.

In the S-TSID as the signaling data, group IDs of respective files configuring the presentation unit (PU) are recorded in a unit of a file. In particular, a group ID set as a latter half ID configuring a presentation unit ID (PUID) described hereinabove with reference to FIG. 8 is recorded in an associated relationship with each file.

The reception apparatus having a permissible cache size of the minimum size (Minimum) selects, as a cache target, a file whose group ID same as the group ID (groupId1) of the ID (PUID) of the presentation unit (PU11) having an entry document is recorded in a file list of signaling data (S-TSID).

It is to be noted that details of a data recording configuration of signaling data are hereinafter described.

A reception apparatus having a permissible cache size of the (2) small size (Small) selects the presentation unit (PU11) having an entry document as a cache target PU of the highest priority rank. Further, the reception apparatus can determine the second presentation unit (PU12) designated as a link destination from the presentation unit (PU11) having an entry document as a cache target.

As described hereinabove, in the S-TSID as signaling data, group IDs of respective files configuring the presentation unit (PU) are recorded in a unit of a file.

A reception apparatus having a permissible cache size of the small size (Small) selects a file in which a group ID coincident with one of the following two group IDs (groupId1 or groupId2):

the group ID (groupId1) of the ID (PUID) of the presentation unit (PU11) having an entry document; and the group ID (groupId2) of the ID (PUID) of the presentation unit (PU12) of the link destination is recorded as a cache target from within the file list of the signaling data (S-TSID).

A reception apparatus having a permissible cache size of the (3) medium size (Medium) can determine all of the presentation units (PU11 to PU13) configuring the initial execution application (APP1) as a cache target.

As described hereinabove with reference to FIG. 8, a presentation unit (PU) has a presentation unit ID (PUID) set thereto, and the front half of the ID is configured from an application main body ID such that an application to which the presentation unit (PU) belongs can be identified.

Accordingly, the reception apparatus may select, as a cache target, a presentation unit whose application main body ID set to the front half of the presentation unit ID (PUID) has a value equal to that of the application main body ID of the PU of the entry document from within the list of presentation units (PUs) recorded in the S-TSID as the signaling data.

In the example of FIG. 11, each presentation unit (PU) to which the application main body ID=appId1 is set, that is, each files belonging to PU11 to PU13 is selected as a cache target.

A reception apparatus having a permissible cache size of the (4) large size (Large) can determine as a cache target the initial execution application (APP1) and a different application (APP2) set as a link destination of the application (APP1).

The reception apparatus having a permissible cache size of the (4) large size (Large) acquires all configuration files of the application (APP1) by a process similar to that by the "reception apparatus having a permissible cache size of the (3) medium size (Medium)," and further searches files belonging to the application 2 (APP2) using the application main body ID (appId2) as a search key regarding the different application (APP2) set as the link destination of the application (APP1) and determines the files as a cache target.

In the example depicted in FIG. 11, files belonging to presentation units (PUs) to which one of the
application main body ID=appId1, and
application main body ID=appId2
is set, namely, the presentation units PU11 to PU13 and PU21 to PU23, are selected as a cache target.

A reception apparatus having a permissible cache size of the (5) maximum size (Maximum) can determine all of the initial execution application (APP1), another application (APP2) set as a link destination of the application (APP1) as well as a further application (APP3) set as a link destination of the application (APP2) as a cache target.

The reception apparatus having a permissible cache size of the (5) maximum size (Maximum) acquires all of configuration files of the application (APP1) and the application (APP2) by a process similar to that by the "reception apparatus having a permissible cache size of the (4) large size (Large)" described above. Further, the reception apparatus searches files belonging to the application 3 (APP3) using the application main body ID (appId3) as a search key regarding the different application (APP3) set as a link destination of the application (APP2) to set the files as cache target.

In the example depicted in FIG. 11, files belonging to presentation units (PUs) to which one of the
application main body ID=appId1,
application main body ID=appId2, and
application main body ID=appId3
is set, namely, to the presentation units PU11 to PU13, PU21 to PU23 and PU31 to PU33, are selected as a cache target.

[8. Configuration of Signaling Data and Cache Target Data Selection Process in which Signaling Data is Applied]

Now, a configuration of signaling data provided from the transmission apparatus 20 to the reception apparatus 30 and a cache target data selection process, in which signaling data is applied, executed by the reception apparatus 30 are described with reference to FIG. 12 and so forth.

The transmission apparatus 20 transmits an application to the reception apparatus 30 and provides various signaling data in which access information to the transmission application, attribute information of the application and control information are recorded to the reception apparatus 30.

As the signaling data relating to an application to be provided from the transmission apparatus 20 to the reception apparatus 30, for example, the following data are available:

(1) USBD/USD (User Service Bundle Description/User Service Description);
(2) S-TSID (Service based Transport Session Description); and
(3) application information table (AIT: Application Information Table).

As described hereinabove, the USD is configured from information in a unit of a predetermined service such as, for example, a broadcasting station or a broadcasting program, and is configured from information necessary to utilize a service on a reception apparatus such as access information (URL or the like) for receiving a service, codec information, reproduction timing information and so forth. The USBD is a bundle (bundle) of USDs, and not only a USD but also a USBD are signaling data in which control information having the same substance is stored.

The S-TSID is additional information in a unit of each service and has recorded therein additional information that is not recorded in the USD.

As described hereinabove, the ROUTE protocol is a protocol based on FLUTE. A metadata file that describes transfer control parameters in FLUTE is called FDT (File Delivery Table), and a metadata file in which transfer control parameters in ROUTE are described is called S-TSID (Service based Transport Session Description). The S-TSID is a superset of FDTs and includes FDTs.

The AIT is signaling data unique to one or a plurality of applications set corresponding to the application or applications and has recorded therein information for acquisition (URL) of the application, control information applied for application execution and so forth.

A configuration of the signaling data and an example of a selection process of cache target data in which such signaling data are utilized are described with reference to FIG. 12 and so forth.

FIG. 12 is a view illustrating part of data of the
(1) USBD/USD,
(2) AIT, and
(3) S-TSID
and an application acquisition process that utilizes the data.

It is to be noted that the signaling data such as the USBD/USD, AID and S-TSID are transmitted repetitively at any time from the transmission apparatus 20, and a reception apparatus acquires such signaling data in advance before acquisition of an application. Further, the reception apparatus refers to the acquired signaling data to acquire access information to the application and then acquires the application.

An application can be acquired through a broadcasting wave or a communication network such as the Internet.

The USBD has recorded therein one of base patterns including:
(a) a broadcasting wave correspondence base pattern that is access information configuration data for application acquisition where an application is provided through a broadcasting wave; and
(b) a communication network correspondence base pattern that is access information configuration data for application acquisition where an application is acquired through a communication network.

In the USBD/USD depicted in FIG. 12, where an application is to be transmitted through a broadcasting wave, a base pattern is recorded into a base pattern recording region corresponding to the broadcasting wave (USD/deliveryMethod/atsc:BcAppService/basePattern).

On the other hand, where an application is to be transmitted through a communication network, a base pattern is recorded into a base pattern recording region corresponding to the communication network (USD/deliveryMethod/atsc:UcAppService/basePattern).

The reception apparatus can decide, depending upon in which one of the USBD and the USD a base pattern is recorded, whether the application is transmitted through a broadcasting wave or is transmitted through a communication network such as the Internet or else is transmitted through both of a broadcasting wave and a communication network such as the Internet.

Further, in the AIT that is signaling data corresponding to an application, a URI for acquiring a specific application is recorded.

For an acquisition process of an application, the reception apparatus refers, first at step S11, to a base pattern recorded in the USBD (or USD) to confirm which one of a broadcasting wave and a communication network is utilized for distribution of the application, and combines the URI recorded in the AIT, base pattern and URI to create access information (application acquisition address) to the application.

In particular, the reception apparatus first confirms a transmission path (broadcasting wave/network communication) of an application on the basis of a delivery method (deliveryMethod) of the USD (user service description) that is signaling data transmitted from the transmission apparatus and the description of the allocation location (ApplicationLocation) of the AIT, and then creates access information (application acquisition address) to the application by combining one of the base patterns and the URI.

If it is confirmed that an application is distributed through a communication network, then the reception apparatus applies the created access information (application acquisition address) to acquire the application through the communication network at step S21.

On the other hand, if it is confirmed that the application is distributed through a broadcasting wave, then at step S31, the reception apparatus acquires the S-TSID, which is another signaling data, and searches file unit information of files having location information (RS/LS/ScFlw/EFDT/@content-loc) coincident with the application location (application(URI)) recorded in the ART.

In the S-TSID, information of respective file units configuring the presentation unit (PU) is recorded.

Further, the reception apparatus acquires a TOI (Transport Object Identifier) recorded in the file unit information of the S-TSID.

The TOI (Transport Object Identifier) is a packet identifier recorded in the packet header of an LCT packet in which the application transmitted from the transmission apparatus 20 is stored.

In the packet header of the LCT packet, the TOI as an identifier according to the payload of the packet is recorded.

At step S32, the reception apparatus selectively acquires an LCT packet in which a file included in the target application is stored from among LCT packets transmitted by a broadcasting wave on the basis of the TOI recorded in the S-TSID.

As depicted in (1) of FIG. 12, in the USBD/USD, a base pattern as application access information corresponding to a broadcasting wave or a communication network is recorded.

A particular example of recorded data of the USBD/USD indicating that an application is transmitted as an NRT content through a broadcasting wave is described with reference to FIGS. 13 and 14.

(1) of FIG. 13 depicts a setting that defines an NRT application transmission service through a broadcasting wave as one of NRT services to be transmitted through a broadcasting wave.

As depicted in (1) of FIG. 13, a definition region 231 for an NRT application transmission service through a broadcasting wave is newly set in the delivery method (deliveryMethod) in the USBD/USD.

Into this new definition region, a base pattern of an NRT application distributed by one or more (1 to N) broadcasts is recorded.

(2) of FIG. 13 depicts a configuration in which a base pattern definition region 232 for an NRT application transmission service through a broadcasting wave is set newly in an application transmission service definition region (atsc: broadcastAppService) defined in the delivery method (deliveryMethod) in the USBD/USD.

(3) of FIG. 14 depicts a setting that a base pattern itself is not recorded but a flag (0, 1) from which it is identifiable whether a service type, namely, a service providing form, is a linear type service that is a service of distribution, for example, of a live broadcasting program or the like or a distribution service of a non-real time (NRT) content including application distribution is to be recorded.

A recording region 233 for the flag described above is provided in an application transmission service definition region (atsc: broadcastAppService) defined in the delivery method (deliveryMethod) in the USBD/USD.

The reception apparatus can confirm whether or not application distribution by a broadcasting service is being executed, for example, by referring to the recorded data in (1) to (3) depicted in FIGS. 13 and 14.

On the other hand, in the AIT (application information table) and the S-TSID as the signaling data, data for performing a selection process of cache target data described hereinabove with reference to FIGS. 10 and 11 are recorded.

An example of recorded data of the AIT and S-TSID is described with reference to FIGS. 15 and 16.

Figure 15:
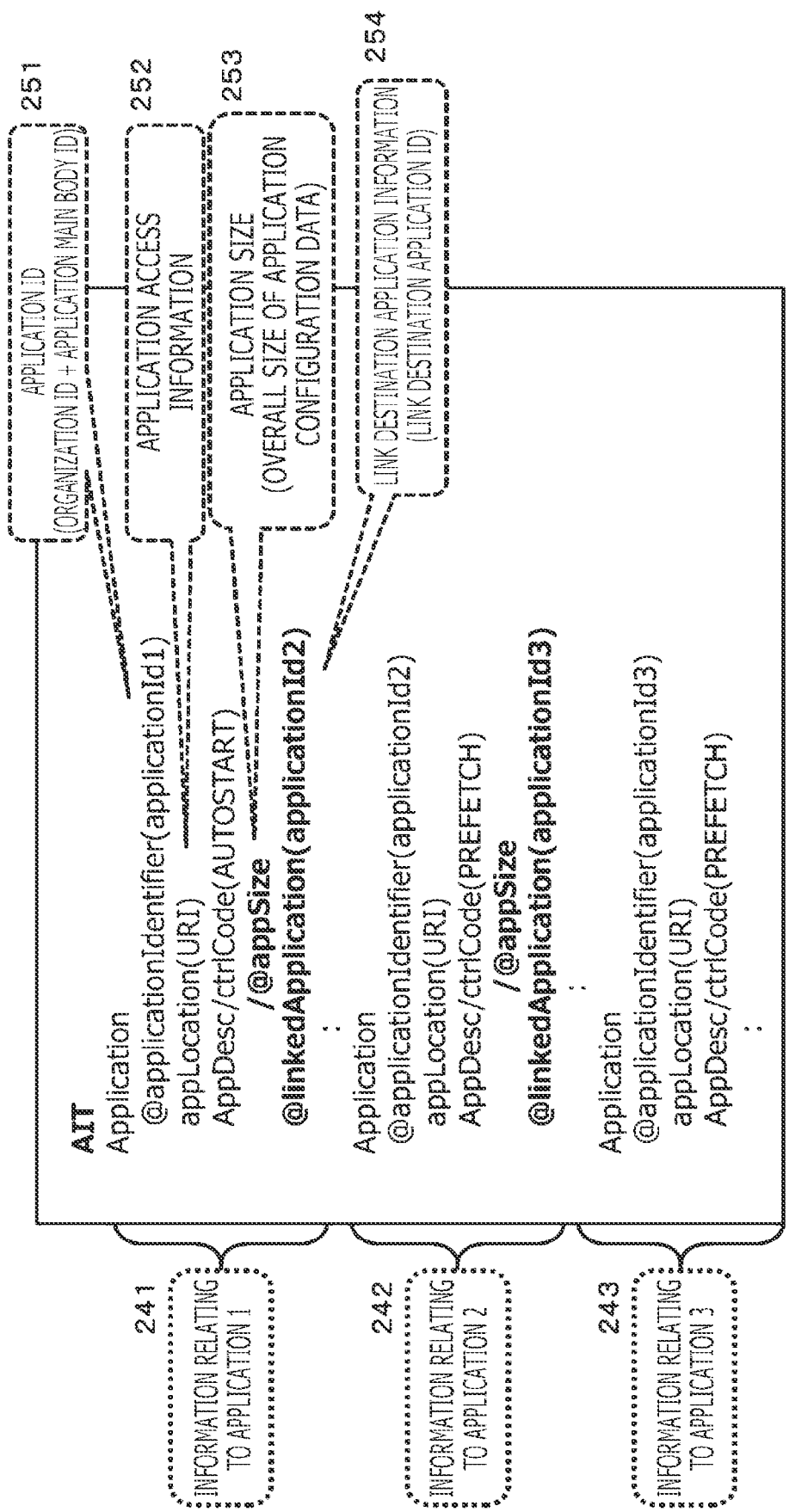
FIG. 15 is a view illustrating an example of a data record of an AIT.

FIG. 15 is a view depicting an example of recorded data of the AIT (application information table).

The AIT depicted in FIG. 15 is an example of the AIT in which information corresponding to the three applications (APP1 to APP3) described hereinabove with reference to FIGS. 9 and 10 is recorded.

Although the AIT can be set such that only one application is recorded therein, also it is possible to set the AIT such that information of a plurality of applications related to each other is recorded collectively.

In the AIR depicted in FIG. 15, a recording region 241 of information relating to the application 1 (APP1), a recording region 242 of information relating to the application 2 (APP2), and a recording region 243 of information relating to the application 3 (APP3) are included.

In each of the application information recording regions 241 to 243, such information as an application ID 251, application access information (appLocation(URI)) 252, an application size 253, and link destination application information 254 is recorded.

The application ID 251 is the application identifier described hereinabove with reference to FIG. B.

In particular, the application ID 251 is an application ID configured from an organization ID (orgId) and an application main body ID (appId).

The application access information (appLocation(URI)) 252 is a URI utilized in order to acquire the application. As described hereinabove with reference to FIG. 12, access information can be created by combining the application access information 252 and a base pattern recorded in the USBD.

The application size 253 is a total data size of all configuration data included in one application.

For example, in the case of the application 1 (APP1) depicted in FIG. 9, the total size of files configuring the three presentation units (PU11 to PU13) is recorded. In the example depicted in FIG. 10, the size of the application (APP1) is S1, and this S1 is recorded as the application size 253.

The link destination application information 254 is information relating to a link between applications described hereinabove with reference to FIG. 9. In particular, an application ID of an application of a link destination is recorded in the link destination application information 254.

It is to be noted that, where there is no application of a link destination, nothing is recorded in the link destination application information 254.

Now, recorded data of an S-TSID is described with reference to FIG. 16.

As described hereinabove, the S-TSID is a metadata file in which transfer control parameters in a unit of a service are described and is signaling data including an FDT (file delivery table) that is information in a unit of a file of a large number of files provided in a service.

Figure 16:
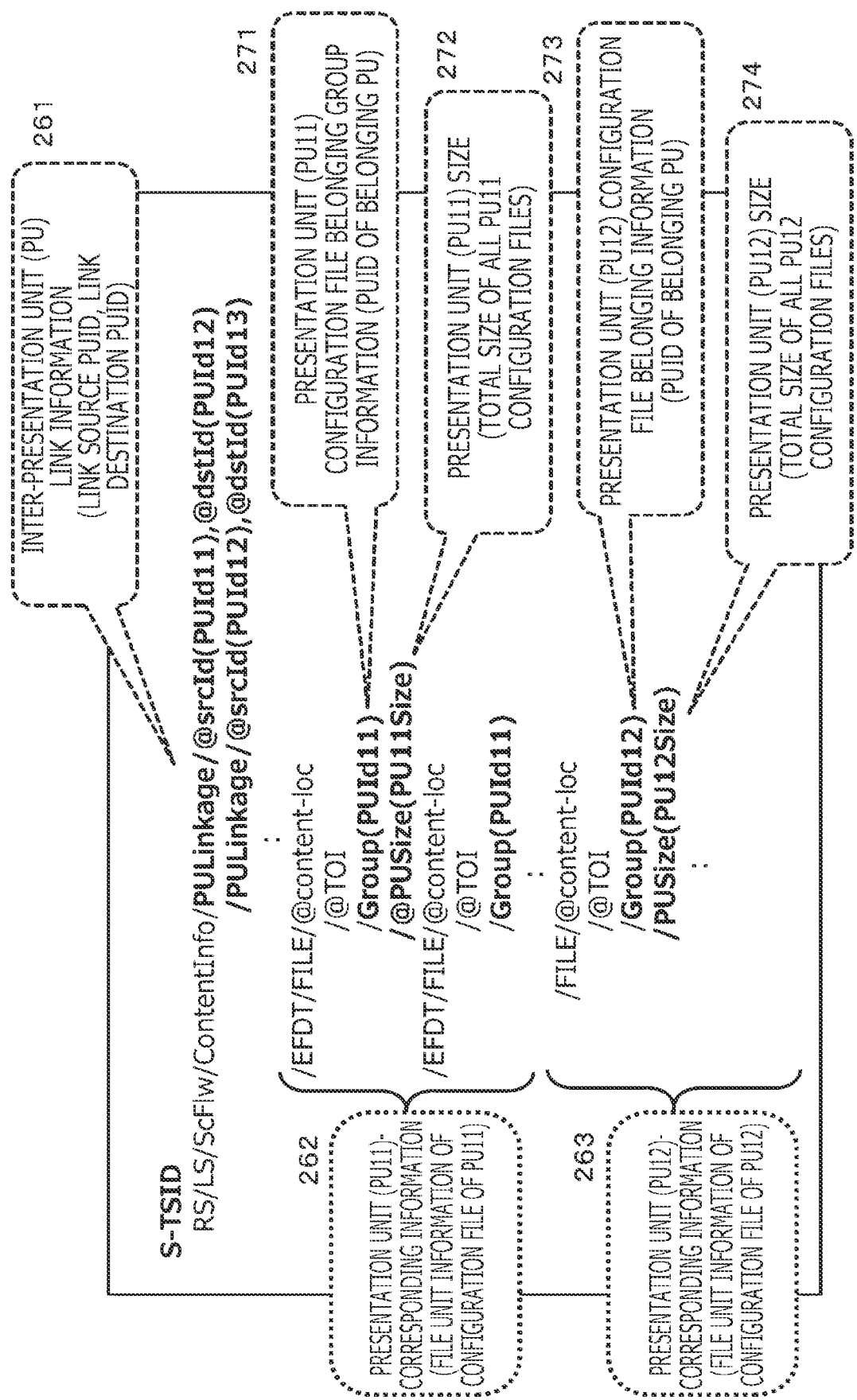
FIG. 16 is a view illustrating an example of a data record of an S-TSID.

The S-TSID depicted in FIG. 16 depicts only part of the S-TSID in which information corresponding to the three application (APP1 to APP3) described hereinabove with reference to FIGS. 9 and 10 is recorded.

It is to be noted that, in FIG. 16, information recording regions corresponding to the two presentation units (PU11 and PU12) belonging to the application 1 (APP1), namely, only presentation unit (PU11) corresponding information 262, and presentation unit (PU12) corresponding information 263 are selectively indicated.

In regions following the information recording regions corresponding to the presentation units (PU11 and PU12) depicted in FIG. 16, information of PU13, PU2/ to PU23 and PU31 to PU33 is recorded.

In the S-TSID depicted in FIG. 16, the following various information is recorded:

inter-presentation unit (PU) link information 261;

presentation unit (PU11) corresponding information 262; and presentation unit (PU12) corresponding information 263.

In the inter-presentation unit (PU) link information 261, a PUID of a presentation unit (PU) of a link source and a PUID of a presentation unit (PU) of a link destination are recorded.

It is to be noted that a PUID is configured from an application main body ID (appId) of an application to which the presentation unit (PU) belongs and a group ID (groupId) with which presentation units in the same application can be identified individually as described hereinabove with reference to FIG. 8.

It is to be noted that, according to a group ID (groupId) configuring a PUID, serial numbers of, for example, 1, 2 and 3 are set to presentation units (PUs) included in one application, and a PU of the group ID (groupId) 1 is a PU having an entry document.

Further, the first file (File) having an entry document is a file corresponding to an HTML document as the entry document.

In the file unit information of the first file, presentation unit (PU11) size information is recorded.

As depicted in FIG. 16, in the presentation unit (PU11) corresponding information 262, information of file units belonging to the presentation unit (PU11) is recorded.

In the first file unit information, the following various information is recorded:

TOI information as file access information;

belonging group information 271 of presentation unit (PU11) configuration files; and presentation unit (PU11) size information 272.

In the second and following file unit information, such information as

TOI information as file access information, and belonging group information of presentation unit (PU11) configuration files is recorded.

Further, in the presentation unit (PU12) corresponding information 263, information of file units belonging to the presentation unit (PU12) is recorded.

In the first file unit information, the following various information is recorded:

TOI information as file access information;

belonging information 273 of presentation unit (PU12) configuration files; and presentation unit (PU12) size information 274.

In this manner, in the S-TSID, next usages of respective file units configuring a presentation unit (PU) are recorded, and in this file unit information, an ID of the presentation unit and size information of the presentation unit are recorded.

A data recording example of an FDT (file delivery table) that is a data recording region of file units of the S-TSID is depicted in FIG. 17.

As depicted in FIG. 17, the following various information is recorded in the FDT (file delivery table) that is a data recording region for a file unit:

(a) a content location (@Content-Location) as access information to the file;

(b) a TOI (Transport Object Identifier) that is a packet identifier recorded in the packet header of an LCT packet transmitted from the transmission apparatus; and (c) a length and a type of a content.

Further, in a data recording region 281 depicted in FIG. 17, such data as (d) a presentation unit ID (PUID), and (e) a presentation unit (PU) size are recorded.

Further, as described hereinabove with reference to FIG. 16, in the S-TSID, the inter-presentation unit (PU) link information 261 is recorded.

A particular recording example of this is described with reference to FIG. 18.

The inter-presentation unit (PU) link information 261 is recorded in the following recording region in the S-TSID, namely, in RS/LS/ScFlw/ContentInfo and so forth.

FIG. 18 is a view depicting an example of inter-PU link information recorded in the content information (ContentInfo).

For example, inter-presentation unit (PU) link information is recorded in such setting, for example, as indicated in a data recording region 282 of FIG. 18.

In the data recording region 282, a region in which such two PUIDs as a presentation unit ID (PUID) of a link source, and a presentation unit ID (PUID) of a link destination are recorded is set.

Now, an application acquisition process executed by reference to signaling data and a selection process sequence of cache target data by the reception apparatus are described with reference to a flow chart depicted in FIG. 19. In particular, an application acquisition process and a cache target data selection process to which such signaling data as

USBD/USD,

AIT, and

S-TSIS are applied are executed.

Figure 19:
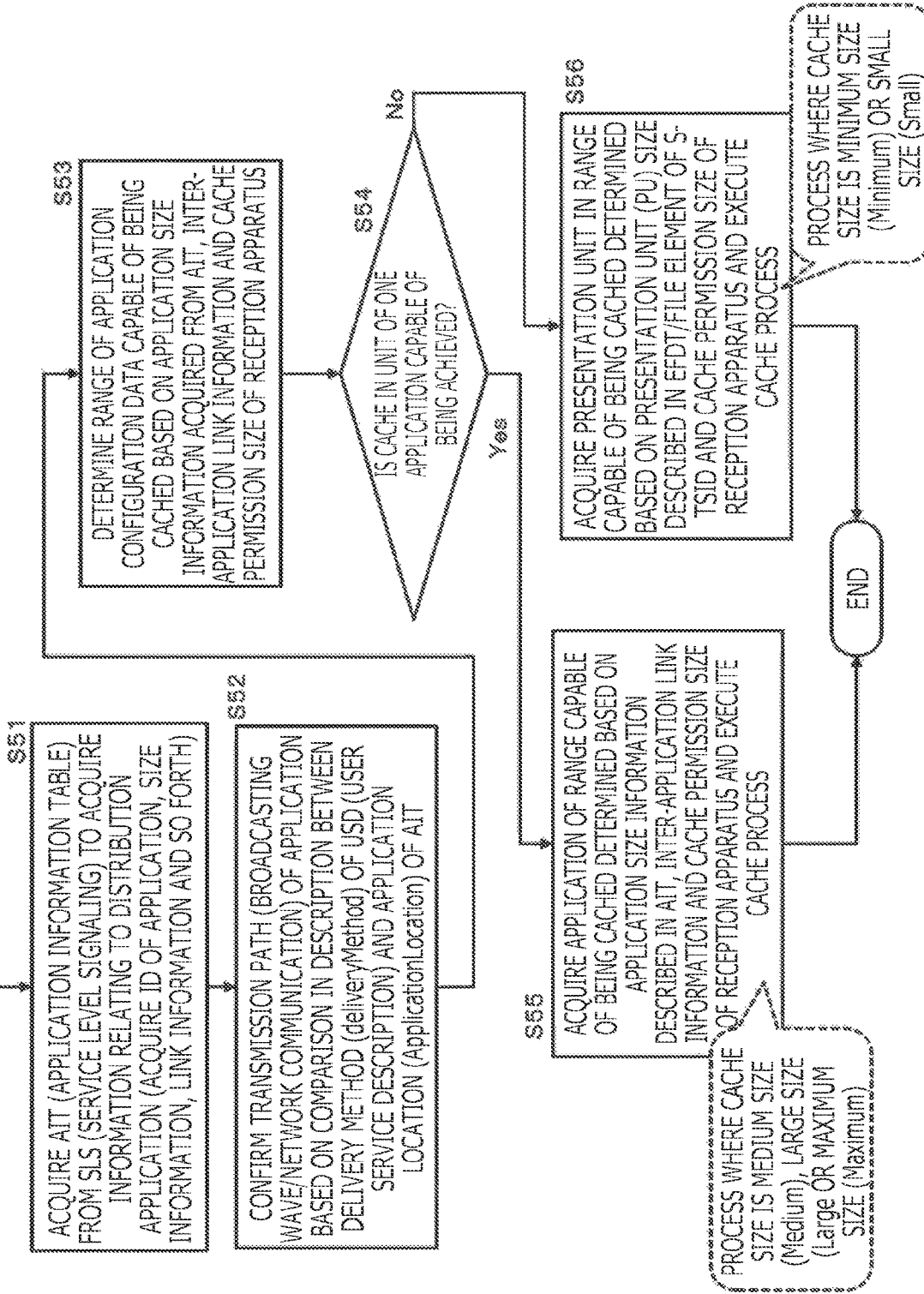
FIG. 19 is a view depicting a flow chart illustrating a processing sequence of a cache process in response to a cache size.

It is to be noted that a process in accordance with the flow depicted in FIG. 19 is a process executed by the data processing section of the reception apparatus 30. For example, the process is executed in accordance with a program in which the processing sequence depicted in FIG. 19 is recorded. It is to be noted that the data processing section that executes the processing sequence depicted in FIG. 19 is, for example, a data processing section that executes functions of the signaling analysis section 113, the cache controlling section and so forth in the reception apparatus 30 depicted in FIG. 7.

Processes at respective steps are described successively hereunder.

(Step S51)

The reception apparatus acquires, at step S51, the AIT (application information table) from the SLS (service level signaling) transmitted from the transmission apparatus to acquire information relating to a distribution application.

In particular, the reception apparatus acquires the AIT (application information table) described hereinabove with reference to FIG. 15 to acquire information relating to the distribution application.

More particularly, the reception apparatus acquires, for example, an application ID, application size information, inter-application link information and so forth.

(Step S52)

Then at step S52, the reception apparatus confirms a transmission path (broadcasting wave/network communication) for the application on the basis of comparison between a delivery method (deliveryMethod) of the USD (user service description) that is signaling data transmitted from the transmission apparatus and a description of the application location (ApplicationLocation) of the AIT.

(Step S53)

Then at step S53, the reception apparatus determines a cacheable data range on the basis of the application size information and the inter-application link information acquired from the AIT that is signaling data transmitted from the transmission apparatus and a cache permission size of the reception apparatus.

For example, the reception apparatus confirms a cacheable application configuration data range in accordance with the process described hereinabove with reference to FIGS. 10 to 18 to determine cache target data.

(Step S54)

Then, at step S54, the reception apparatus decides whether or not caching of one application unit is possible.

In particular, the reception apparatus decides whether or not the cache size described hereinabove with reference to FIGS. 10 and 11 corresponds to the medium size (Medium) to the maximum size (Maximum).

If it is decided at step S54 that caching of one application unit is possible, then the processing advances to step S55.

On the other hand, if it is decided at step S54 that caching of one application unit is impossible, then the processing advances to step S56.

(Step S55)

If it is decided at step S54 that caching of one application unit is possible, then at step S55, the reception apparatus acquires applications within the cacheable range determined on the basis of the application size information and the inter-application link information described in the AIT and the cache permission size of the reception apparatus and executes a cache process.

This process corresponds to a process where the cache size described hereinabove with reference to FIGS. 10 and 11 corresponds to the medium size (Medium) to the maximum size (Maximum).

(Step S56)

On the other hand, if it is decided at step S54 that caching of one application unit is impossible, then at step S56, the reception apparatus acquires presentation units within the cacheable range determined on the basis of the presentation unit (PU) size described in the EFDT/FILE factor of the S-TSID and the cache permission size of the reception apparatus and then executes a cache process.

This process corresponds to a process where the cache size described hereinabove with reference to FIGS. 10 and 11 corresponds to the minimum size (Minimum) to the small size (Small).

[9. Example of Particular Process According to Cache Size (Data Storage Permission Size) of Reception Apparatus]

Now, an example of a particular process according to a cache size (data storage permission size) of the reception apparatus is described with reference to FIG. 20 and so forth.

Examples of the cache target selection process in the case of the following five cache sizes described hereinabove with reference to FIGS. 10 and 11 are successively described:

(1) minimum size (Minimum);
(2) small size (Small);
(3) medium size (Medium);
(4) large size (Large); and
(5) maximum size (Maximum).

It is to be noted that also the application size and the presentation unit (PU) size are those of the setting depicted in FIGS. 10 and 11.

In particular, the cache target data according to the five cache sizes described above are set in the following manner:

(1) minimum size (Minimum)=presentation unit (PU11);
(2) small size (Small)=presentation unit (PU11)+presentation unit (PU12);
(3) medium size (Medium)=application (APP1)
(4) large size (Large)=application (APP1)+application (APP2); and
(5) maximum size (Maximum)=application (APP1)+application (APP2)+application (APPS).

In the following, examples of a process by reception apparatus having five different data storage permission cache sizes are successively described.

It is to be noted that the process examples described below are examples of a process where an application is distributed through a broadcasting wave, and the reception apparatus acquires files configuring the application through a broadcasting wave.

[9-1. Example of Process When Data Storage Permission Cache Size of Reception Apparatus Is Minimum Size (Minimum) and Only One Presentation Unit (PU) Is Storable]

First, an example of a process when the data storage permission cache size of the reception apparatus is the minimum size (Minimum) and only one presentation unit (PU) is storable is described with reference to FIG. 20 and so forth.

Figure 20:
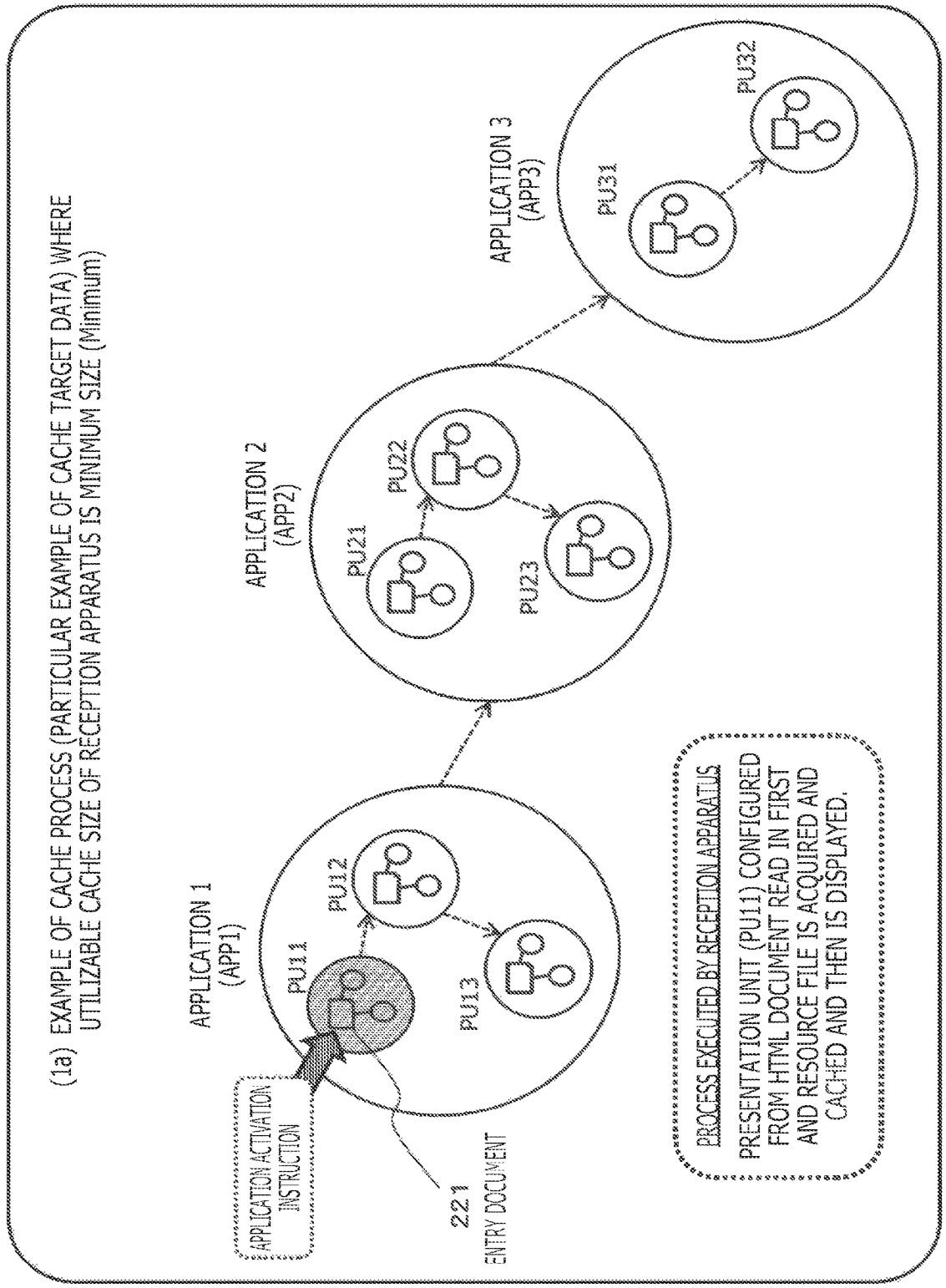
FIG. 20 is a view illustrating a particular example of the cache process in response to the cache size of the reception apparatus.

FIG. 20 is a view illustrating cache (storage) target data when the data storage permission cache size of the reception apparatus is the minimum size (Minimum).

The reception apparatus can store only one presentation unit (PU).

The process executed by the reception apparatus is a process of acquiring, caching and displaying an HTML document (entry document 221) read in first after activation of the application (APP1) and the presentation unit (PU11) configured from resource files.

Figure 21:
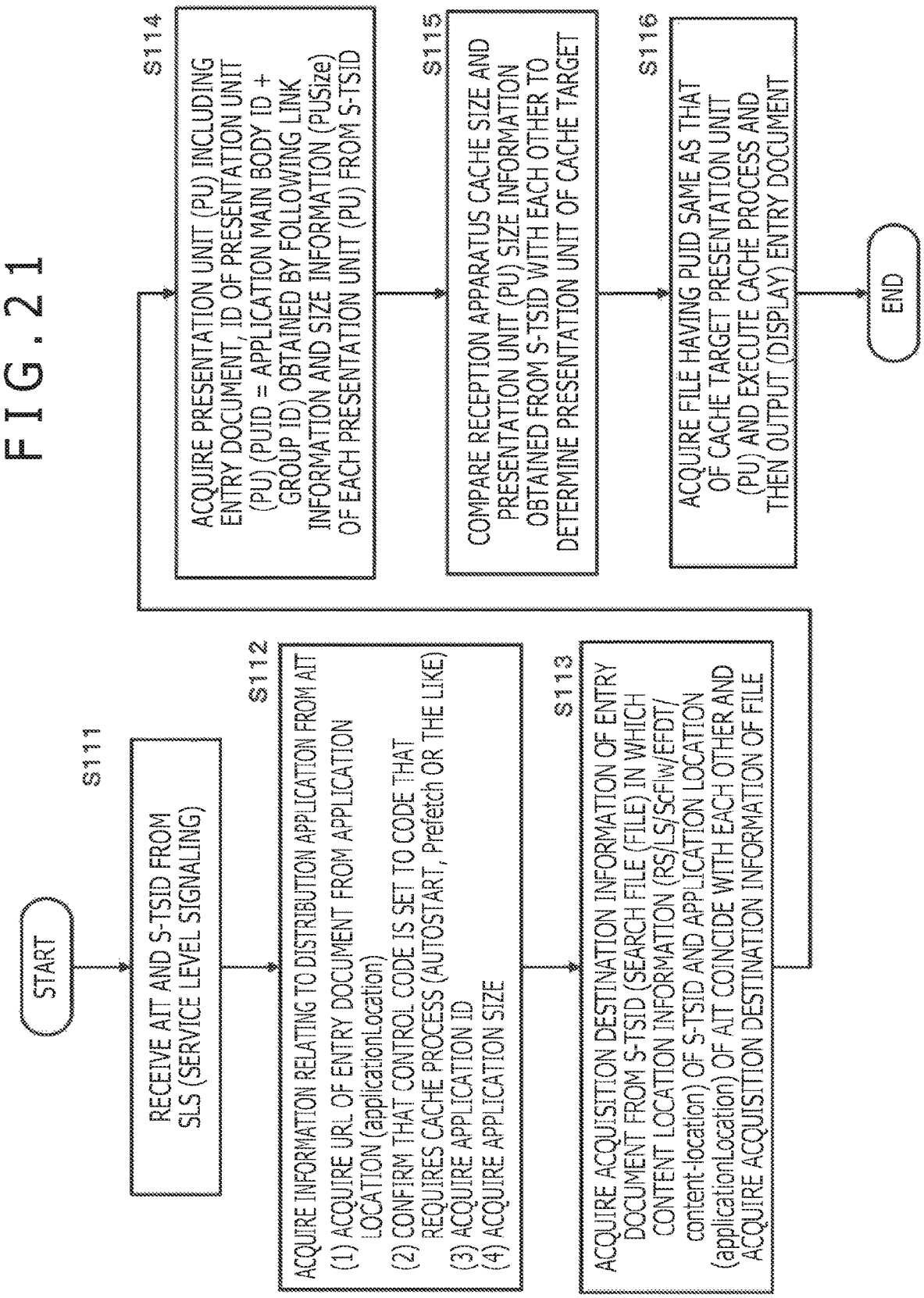
FIG. 21 is a view depicting an example of a flow chart illustrating a particular sequence of the cache process in response to the cache size of the reception apparatus.

FIG. 21 depicts a flow chart illustrating a processing sequence when the reception apparatus acquires an application through a broadcasting wave, performs a cache process and executes the application.

Figure 22:
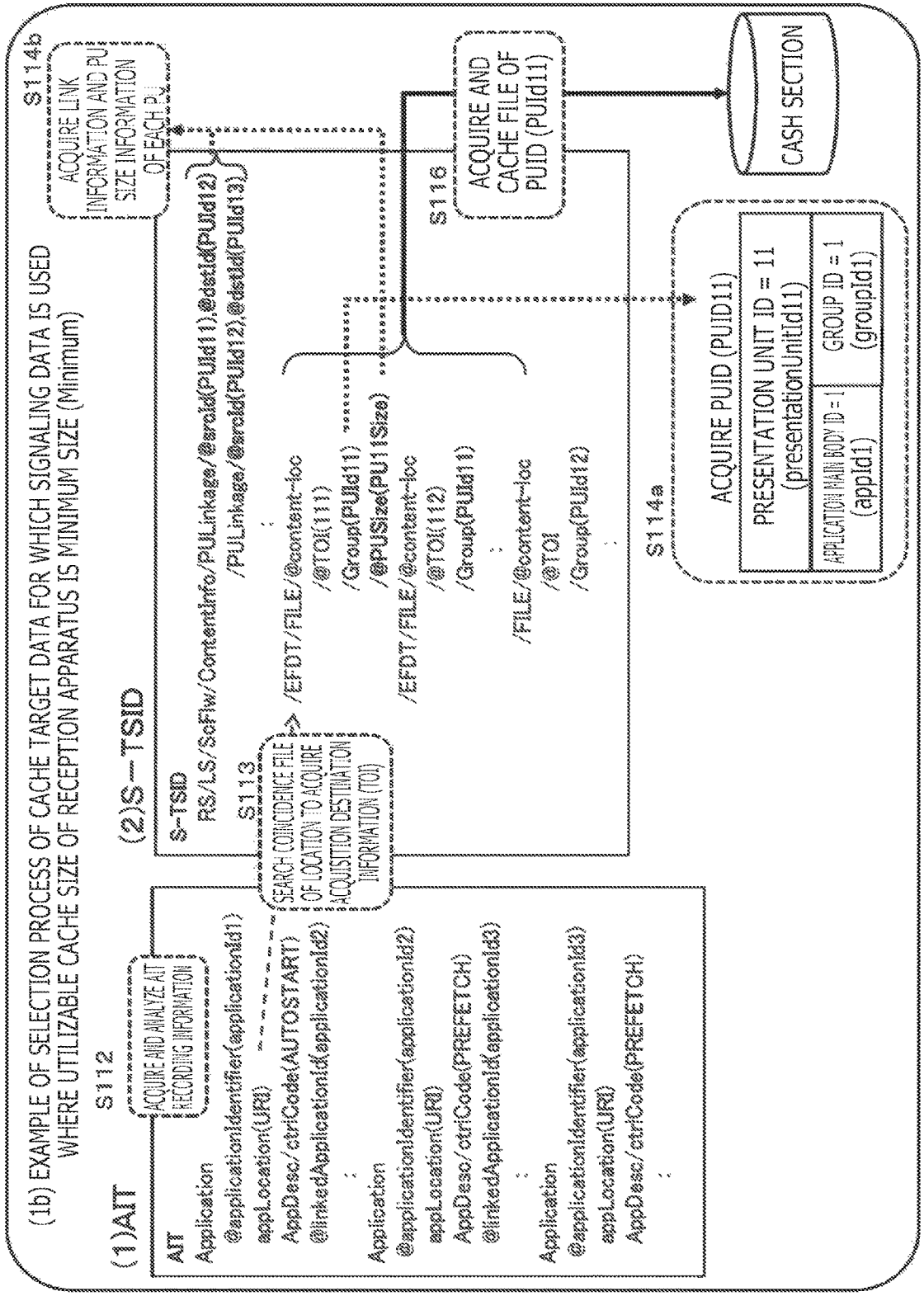
FIG. 22 is a view illustrating a description of signaling data to be referred to upon a cache process in response to the cache size of the reception apparatus.

Further, FIG. 22 depicts signaling data utilized upon processing of respective steps of the flow chart of FIG. 21. In particular, the following two signaling data, namely, (1) AIT, and
(2) S-TSID are utilizes.

Processes at respective step numbers (S111 to S116) depicted in FIG. 21 and processes at same step numbers (S111 to S116) to those depicted in FIG. 22 are same processes. In FIG. 22, recording regions of the signaling data (AIT, S-TSID) that are referred to upon processes at the respective steps and the respective step numbers are depicted in an associated relationship with each other.

Processes at the respective steps are described successively with reference to FIGS. 21 and 22.

(Step S111)

First at step S111, the reception apparatus acquires the AIT (application information table) and the S-TSID from the SLS (service level signaling) transmitted from the transmission apparatus.

(Step S112)

Then at step S112, the reception apparatus performs acquisition and confirmation of information relating to a distribution apparatus from the AIT. For example, the reception apparatus performs the following processes:

(1) to acquire a URL of an entry document from the application location(applicationLocation);

(2) to confirm that a control code is set to a code (AUTOSTART, Prefetch or the like) necessary for a cache process;

(3) to acquire an application ID; and (4) to acquire an application size.

Further, the reception apparatus compares the acquired application size and a cacheable cache size of the reception apparatus with each other.

In the present example, the reception apparatus decides that the cache size is minimum (Minimum) and is smaller than the application size and a cache process of the entire application cannot be performed.

(Step S113)

Then at step S113, the reception apparatus acquires acquisition destination information of the entry document from the S-TSID.

In particular, as indicated at step S113 of FIG. 22, the reception apparatus searches for a file (FILE) in which content location information (RS/LS/ScFlw/EFDT/content-location) recorded in the information of a file unit recorded in the S-TSID and an application location (applicationLocation) of the AIT coincide with each other to acquire the acquisition destination information.

As described hereinabove, in the S-TSID, information of file units configuring a presentation unit (PU) is recorded.

The reception apparatus searches for a file (FILE) that indicates coincidence of the application location (applicationLocation) of the AIT and acquires a TOI (Transport Object Identifier) recorded in the file unit information of the S-TSID as the acquisition destination information.

The TOI (Transport Object Identifier) is a packet identifier recorded in the packet header of an LCT packet in which the application transmitted from the transmission apparatus 20 is stored.

In the packet header of an LCT packet, a TOI as an identifier according to the payload of the packet is recorded.

The reception apparatus can selectively acquire an LCT packet in which a file included in the target application is stored from among LCT packets transmitted by a broadcasting wave on the basis of the TOI recorded in the S-TSID.

(Step S114)

Then at step S114, the reception apparatus acquires, from the S-TSID, a presentation unit (PU) including an entry document, an ID of a presentation unit (PU) obtained following link information recorded in the S-TSID (PUID=application main body ID+group ID) and size information (PUSize) of each presentation unit (PU).

As indicated by step S114a of FIG. 22, the presentation unit ID (PUID) is configured from an application main body ID (appId) and a group ID (groupId).

The application main body ID (appId) has a value equal to that of the application main body ID (appId) that is configuration data of the application ID (organization ID (orgId)+application main body ID (appId)) set to the application to which the presentation unit (PU) to which the file belongs.

Further, as indicated by step S114b of FIG. 22, the reception apparatus acquires link information recorded in the S-TSID.

The reception apparatus acquires the ID of the presentation unit (PU) (PUID=application main body ID+group ID) obtained by following the link information and size information (PUSize) of each presentation unit (PU).

(Step S115)

Then at step S115, the reception apparatus compares the cache size of the reception apparatus, namely, a utilizable cache size, and the data size of each presentation unit (PU) with each other to select presentation units to be made a cache target.

It is to be noted that the most preferential cache target PU is a presentation unit having an entry document (for example, PU11).

The second most preferential cache target PU is a link destination PU of PU11 having an entry document, for example, PU12.

Further, the link destination PU13 of PU12 is selected as a next cache target PU, and cache target PUs are successively selected following the links.

At a point of time at which the cache size is exceeded, the selection of a cache target PU is completed.

In particular, for example, in the case of

PU11 size≤cache size<(PU11+PU12) size only PU11 is selected as a cache target PU.

On the other hand, in the case of (PU11+PU12) size≤cache size<(PU11+PU12+PU13) size PU11 and PU12 are selected as cache target PUs.

In this manner, cache target PUs are successively selected following links within a range within which the total size of the PUs reaches the cache size.

In the case of the present example, the expression

PU11 size≤cache size<(PU11+PU12) size is satisfied, and only PU11 is selected as a cache target PU.

(Step S116)

Then at step S116, the reception apparatus acquires a file having a PUID same as the PUID of the presentation unit (PU) of the cache target determined at step S115, executes a cache process and outputs (displays) the entry document.

As indicated by step S116 of FIG. 22, the reception apparatus selects, from within the information of file units recorded in the S-TSID, files having a PUID (PU11) same as the PUID (PU11) of the presentation unit (PU) selects as the cache target and selectively acquires a packet in which the applicable file is stored from a broadcasting wave on the basis of the TOI recorded in the file unit information. The reception apparatus executes a process for storing (caching)

the selectively acquired file into the cache section and thereafter starts an outputting (displaying) process from the entry document.

By the processes described above, all files belonging to one presentation unit (PU11) of the application (APP1) can be acquired.

Accordingly, it is possible to execute the application utilizing all configuration files of one presentation unit (PU) and reproduce data in a complete form of a unit of a presentation unit.

In other words, an application execution process of a higher degree of completeness is implemented.

[9-2. Example of Process where Data Storage Permission Cache Size of Reception Apparatus is Small Size (Small) and Plural Presentation Units (PUs) are Storable]

Now, an example of a process where the data storage permission cache size of the reception apparatus is the small size (Small) and a plurality of presentation units (PUs) are storable is described with reference to FIG. 23 and so forth.

Figure 23:
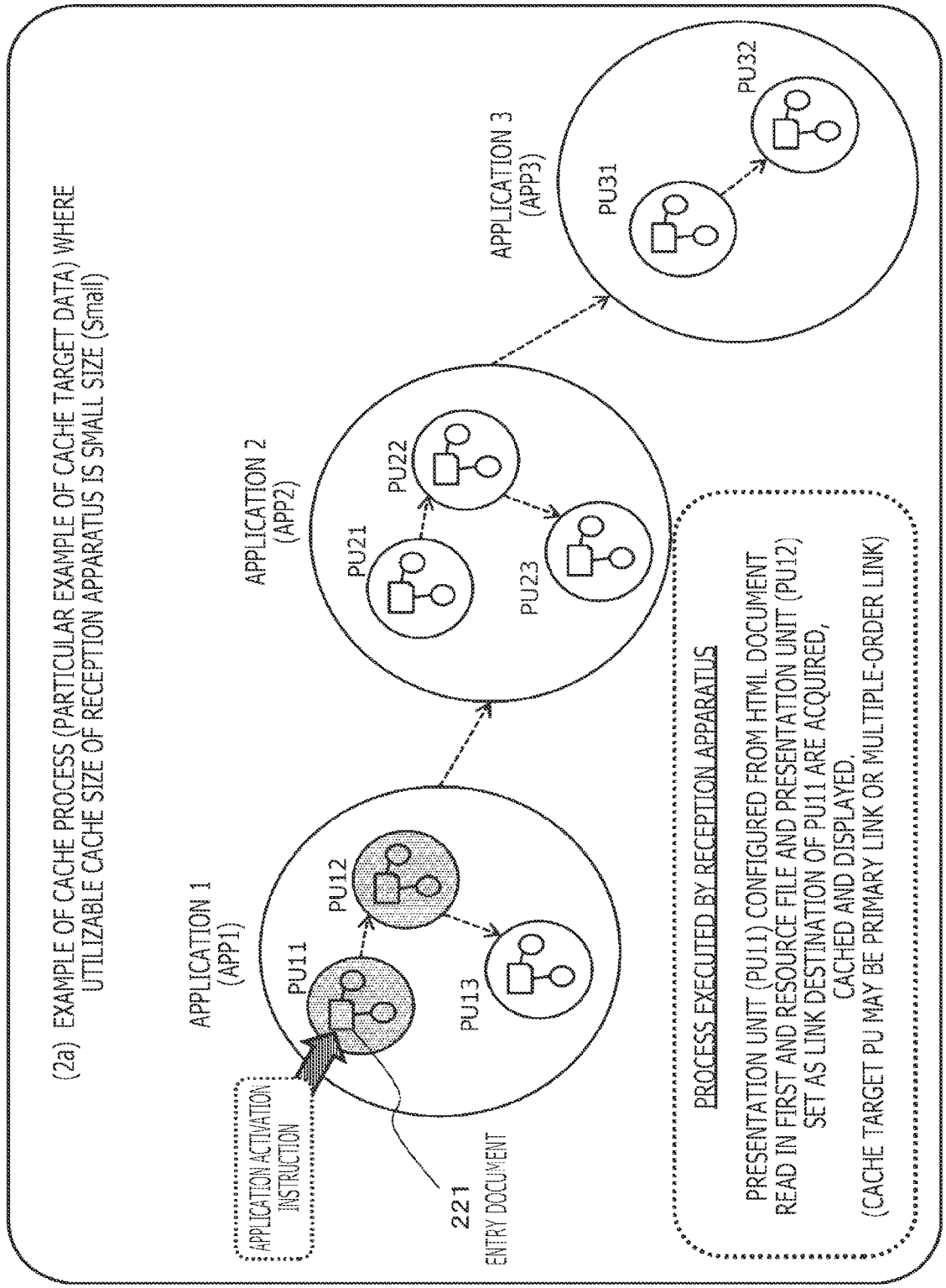
FIG. 23 is a view illustrating a particular example of the cache process in response to the cache size of the reception apparatus.

FIG. 23 is a view illustrating cache (storage) target data where the data storage permission cache size of the reception apparatus is the small size (Small).

The reception apparatus can store two presentation units (PU11 and PU12).

The process executed by the reception apparatus is a process for acquiring, caching and displaying a presentation unit (PU11) configured from an HTML document read in first after activation of the application (APP1) (entry document 221) and a resource file and another presentation unit (PU12) set as a link destination of the presentation unit (PU11).

It is to be noted that, where a plurality of presentation units are set as a link destination of the presentation unit (PU11), the reception apparatus acquires the plurality of link destination PUs.

Figure 24:
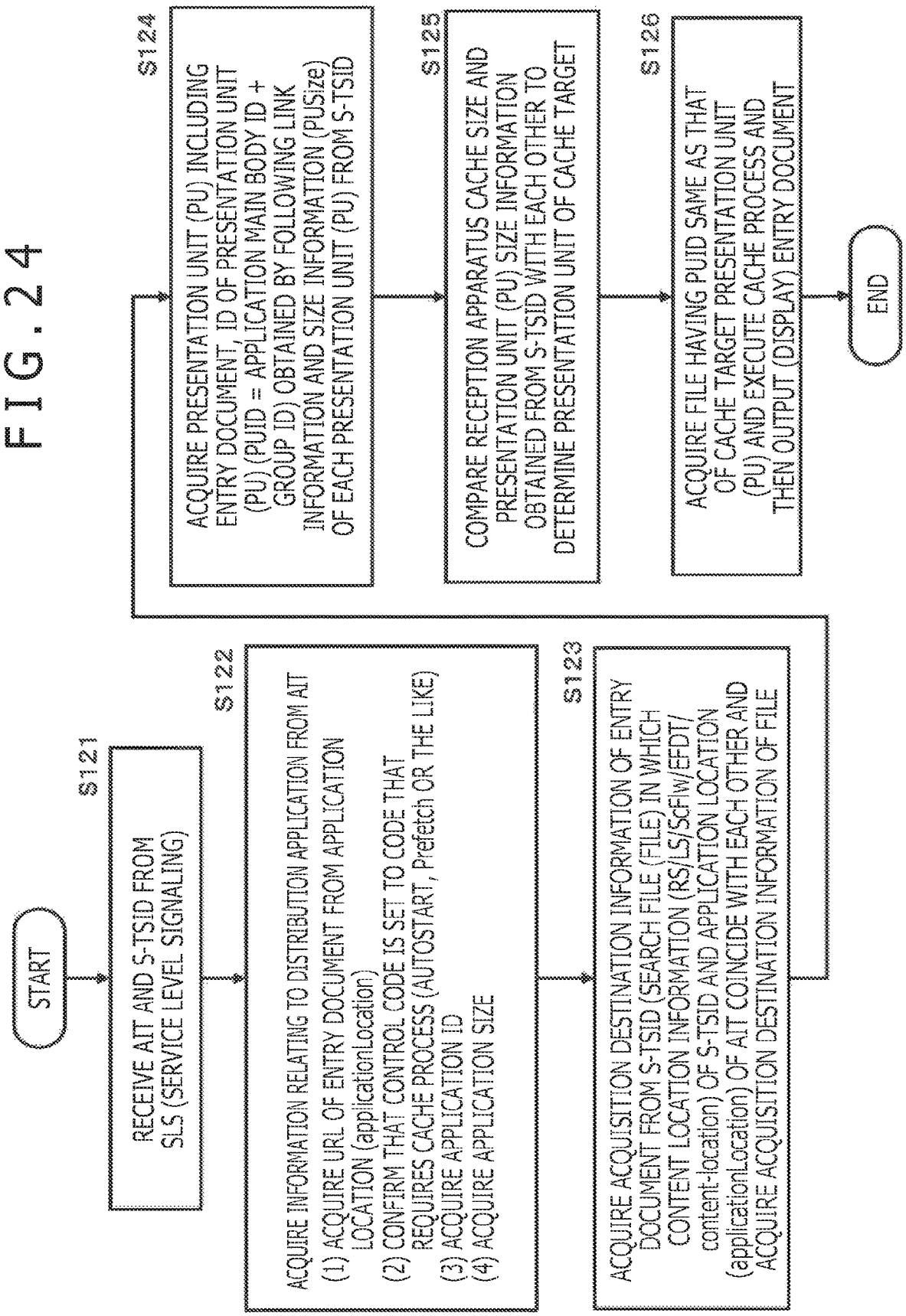
FIG. 24 is a view depicting a flow chart illustrating a particular sequence of the cache process in response to the cache size of the reception apparatus.

FIG. 24 depicts a flow chart illustrating a processing sequence when the reception apparatus acquires an application through a broadcasting wave, performs a cache process and executes the application.

Further, FIG. 25 depicts signaling data utilized upon processing at respective steps of the flow chart depicted in FIG. 24. Namely, the following two signaling data
 (1) AIT, and
 (2) S-TSID
are utilized.

Processes at respective step numbers (S121 to S126) depicted in FIG. 24 and processes at the same step numbers (S121 to S126) depicted in FIG. 25 are same processes. In FIG. 25, recording regions for the signaling data (AIT and S-TSID) that are referred to upon processing at the respective steps and the respective step numbers are indicated in an associated relationship with each other.

Process at the respective steps are successively described with reference to FIGS. 24 and 25.

(Step S121)

First at step S121, the reception apparatus acquires the AIT (application information table) and the S-TSID from the SLS (service level signaling) transmitted form the transmission apparatus.

(Step S122)

Then at step S122, the reception apparatus performs acquisition and confirmation of information relating to the distribution application from the AIT. For example, the reception apparatus performs the following processes:
 (1) to acquire the URI, of an entry document from the application location (applicationLocation);
 (2) to confirm that a control code is set to a necessary code (AUTOSTART, Prefetch or the like) for a cache process;
 (3) to acquire an application ID; and
 (4) to acquire an application size.

Further, the reception apparatus compares the acquired application size and the cacheable cache size of the reception apparatus.

In the present example, the cache size is small (Small) and is smaller than the application size, and the reception apparatus decides that a cache process of the entire application cannot be performed.

(Step S123)

Then at step S123, the reception apparatus acquires acquisition destination information of the entry document from the S-TSID.

In particular, as illustrated in step S123 in FIG. 25, the reception apparatus searches for a file (FILE) in which the application location (aplicationLocation) of the AIT coincides with the content location information (RS/LS/ScFlw/EFDT/content-location) recorded in the information of file units recorded in S-TSID to acquire the acquisition destination information.

(Step S124)

Then at step S124, the reception apparatus acquires a presentation unit (PU) that includes an entry document, an ID of a presentation unit (PU) obtained following the link information recorded in the S-TSID (PUID=application main body ID+group ID) and size information (PUSize) of each presentation unit (PU) from the S-TSID.

As depicted at step S124a of FIG. 25, a presentation unit ID (PUID) is configured from an application main body ID (appId) and a group ID (groupId).

The application main body ID (appId) has a value equal to that of the application main body ID (appId) that is configuration data of the application ID (organization ID (orgId)+application main body (appId)) set to an application to which the presentation unit (PU) to which the file belongs.

Further, as indicated at step S124b of FIG. 25, the reception apparatus acquires link information recorded in the S-TSID.

As depicted at step S124c of FIG. 25, the reception apparatus acquires the ID of the presentation unit (PU) obtained following the link information (PUID=application main body ID+group ID) and size information (PUSize) of each presentation unit (PU).

(Step S125)

Then at step S125, the reception apparatus compares the cache size of the reception apparatus, namely, a utilizable cache size, and the data size of each presentation unit (PU) with each other to select presentation units that are to be made a cache target.

It is to be noted that the most preferential cache target PU is a presentation unit that has an entry document (for example, PU11).

The second most preferential cache target PU is a link destination PU of PU11 having an entry document, for example, PU12.

Further, the link destination PU13 of PU12 is selected as a next cache target PU, and cache target PUs are successively selected following the links.

At a point of time at which the cache size is exceeded, selection of a cache target PU is completed.

In particular, for example, in the case of
 PU11 size≤cache size<(PU11+PU12) size only PU11 is selected as a cache target PU.

On the other hand, in the case of
(PU11+PU12) size≤cache size<(PU11+PU12+PU13) size,
PU11 and PU12 are selected as cache target PUs.

In this manner, cache target PUs are successively selected following links within a range within which the total size of PUs reaches the cache size.

In the case of the present example, the expression (PU11+PU12) size≤cache size<(PU11+PU12+PU13) size
is satisfied, and PU11 and PU12 are selected as cache target PUs.

(Step S126)

Then at step S126, the reception apparatus acquires a file having a PUID same as the PUID of the presentation unit (PU) of the cache target determined at step S125, executes a cache process and outputs (displays) the entry document.

As indicated by steps S126a and S126b of FIG. 25, the reception apparatus selects, from the information of file units recorded in the S-TSID, files having a PUID (PU11) same as the PUID of the cache target PU and selectively acquires a packet in which the applicable file is stored from a broadcasting wave on the basis of the TOI recorded in the file unit information. The reception apparatus executes a process for storing (caching) the selectively acquired file into the cache section and thereafter starts an outputting (displaying) process from the entry document.

By the processes described above, all files belonging to the two presentation units (PU11 and PU12) of the application (APP1) can be acquired.

Accordingly, it is possible to execute an application utilizing all configuration files of two presentation units (PUs) and reproduce data in a complete form of a unit of a presentation unit.

In other words, an application execution process of a higher degree of completeness is implemented.

[9-3. Example of Process where Data Storage Permission Cache Size of Reception Apparatus is Medium Size (Medium) and One Presentation Unit (PU) is Storable]

Now, an example of a process where the data storage permission cache size of the reception apparatus is the medium size (Medium) and one presentation unit (PU) is storable is described with reference to FIG. 26 and so forth.

FIG. 26 is a view illustrating cache (storage) target data where the data storage permission cache size of the reception apparatus is the medium size (Medium).

The reception apparatus can store one application (APP1) therein.

The process executed by the reception apparatus is a process for acquiring, caching and displaying all configuration files of the application (APP1) to which the presentation unit (PU11) configured from an HTML document (entry document 221) read in first after activation of the application (APP1) and a resource file belongs.

FIG. 27 depicts a flow chart illustrating a processing sequence when the reception apparatus acquires an application through a broadcasting wave, performs a cache process and executes the application.

Further, FIG. 28 depicts signaling data utilized upon processing at respective steps of the flow chart depicted in FIG. 27. Namely, the following two signaling data
(1) AIT, and
(2) S-TSID
are utilized.

Processes at respective step numbers (S131 to S135) depicted in FIG. 27 and processes at the same step numbers (S131 to S135) depicted in FIG. 28 are same processes. In FIG. 28, recording regions for the signaling data (AIT and S-TSID) that are referred to upon processing at the respective steps and the respective step numbers are indicated in an associated relationship with each other.

Processes at the respective steps are successively described with reference to FIGS. 27 and 28.

(Step S131)

First at step S131, the reception apparatus acquires the AIT (application information table) and the S-TSID from the SLS (service level signaling) transmitted form the transmission apparatus.

(Step S132)

Then at step S132, the reception apparatus performs acquisition and confirmation of information relating to the distribution application from the AIT. For example, the reception apparatus performs the following processes:

(1) to acquire the URL of an entry document from the application location (applicationLocation);
(2) to confirm that a control code is set to a necessary code (AUTOSTART, Prefetch or the like) for a cache process;
(3) to acquire an application ID;
(4) to acquire an application size;
(5) to acquire a link destination application; and
(6) to acquire a link destination application size.

Further, the reception apparatus compares the acquired application size and the cacheable cache size of the reception apparatus with each other.

In the present example, the cache size is medium (Medium) and is greater than the application size of the application (APP1), and the reception apparatus decides that a cache process of the overall application (APP1) can be performed.

Further, the reception apparatus compares the data size obtained by adding the link destination application size to the application size and the cacheable cache size of the reception apparatus with each other.

In the present example, the cache size is medium (Medium) and is smaller than the total application size of the two applications (APP1 and APP2), and the reception apparatus decides that a cache process of the overall two applications (APP1 and APP2) cannot be performed.

In other words, the reception apparatus determines to execute a cache process of the one application (APP1).

(Step S133)

Then at step S133, the reception apparatus acquires acquisition destination information of the entry document from the S-TSID.

In particular, as illustrated in step S133 in FIG. 28, the reception apparatus searches for a file (FILE) in which the content location information (RS/LS/ScFlw/EFDT/contentlocation) recorded in the information of file units recorded in the S-TSID and the application location (applicationLocation) of the MT coincide with each other to acquire the acquisition destination information.

(Step S134)

Then at step S134, the reception apparatus acquires an application main body ID (appId) and a group ID (groupId) from the presentation unit ID (PUID) described in the group (Group) factor of the entry document.

As indicated at step S134 of FIG. 28, the presentation unit ID (PUID) is configured from an application main body ID (appId) and a group ID (groupId).

The application main body ID (appId) has a value equal to that of the application main body ID (appId) that is configuration data of the application ID (organization ID (orgId)+application main body (appId)) set to an application to which the presentation unit (PU) to which the file belongs.

(Step S135)

Then at step S135, the reception apparatus acquires a file having an application main body ID (appId) same as the application main body ID (appId) in the PUID of the entry document (application main body ID (appId)+group ID (groupId)), executes a cache process and outputs (displays) the file.

As indicated at step S135 of FIG. 28, the reception apparatus acquires a file having an application main body ID (appId) same as the application main body ID (appId) configuring the PUID of the entry document from the information of the file unit recorded in the S-TSID, executes a cache process and outputs (displays) the file.

By the processes described above, all files belonging to all presentation units (PU11, PU12 and PU13) belonging to the application (APP1) can be acquired.

Accordingly, it is possible to execute an application utilizing all configuration files of all presentation units (PU11, PU12 and PU13) belonging to the application (APP1) and reproduce data in a complete form of a unit of an application and a unit of a presentation unit.

In other words, an application execution process of a higher degree of completeness is implemented.

[9-4. Example of Process where Data Storage Permission Cache Size of Reception Apparatus is Large Size (Large) and Plural Applications are Storable]

Now, an example of a process where the data storage permission cache size of the reception apparatus is the large size (Large) and a plurality of applications (APP and APP2) are storable is described with reference to FIG. 29 and so forth.

FIG. 29 is a view illustrating cache (storage) target data where the data storage permission cache size of the reception apparatus is the large size (Large).

The reception apparatus can store two applications (APP1 and APP2).

The process executed by the reception apparatus is a process for acquiring, caching and displaying all configuration files of the application (APP1) to which the presentation unit (PU11) configured from an HTML document (entry document 221) read in first after activation of the application (APP1) and a resource file belongs and all configuration files of the application (APP2) that is the link destination application of the application (APP1).

Figure 30:
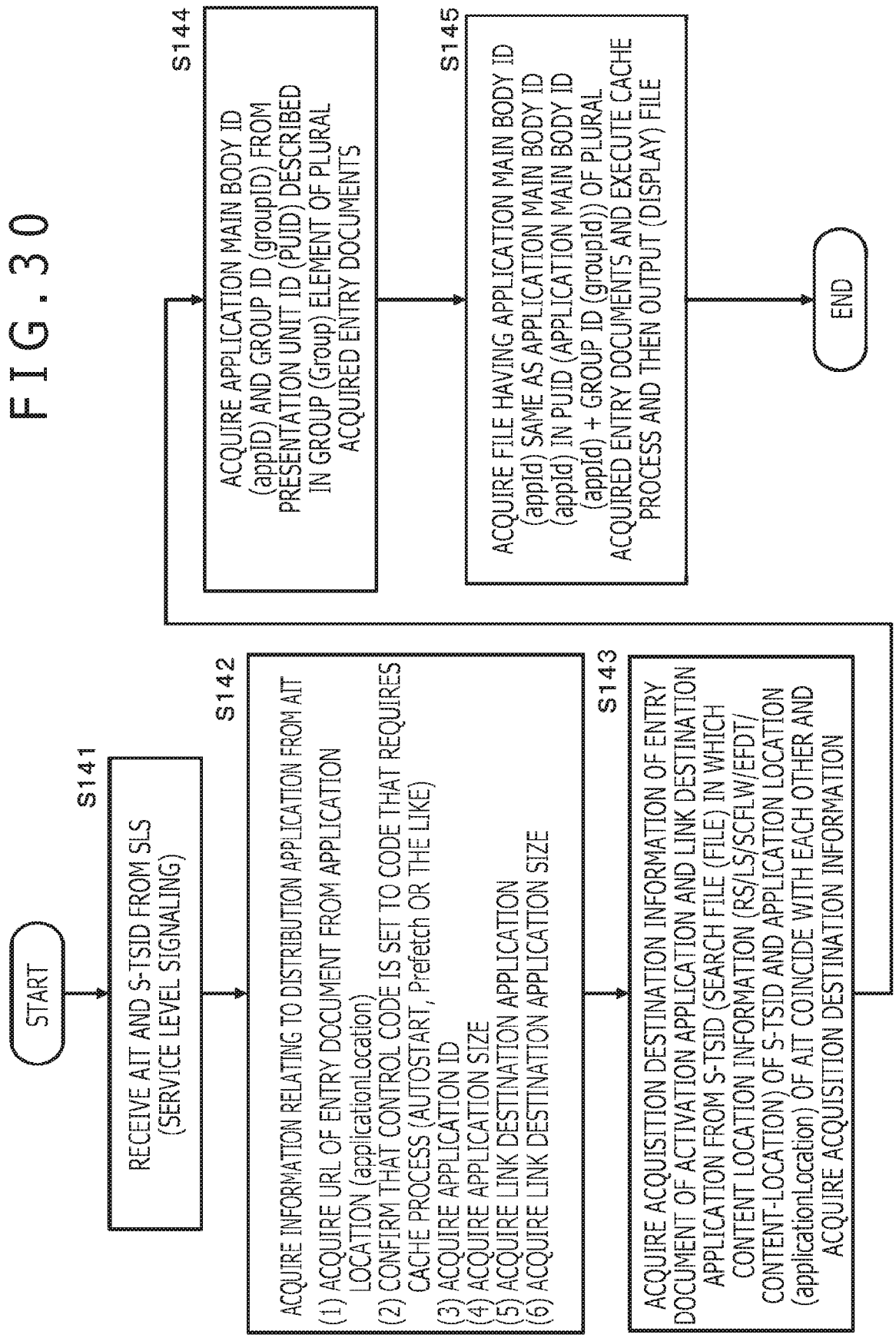
FIG. 30 is a view depicting a flow chart illustrating a particular sequence of the cache process in response to the cache size of the reception apparatus.

FIG. 30 depicts a flow chart illustrating a processing sequence when the reception apparatus acquires an application through a broadcasting wave, performs a cache process and executes the application.

Figure 31:
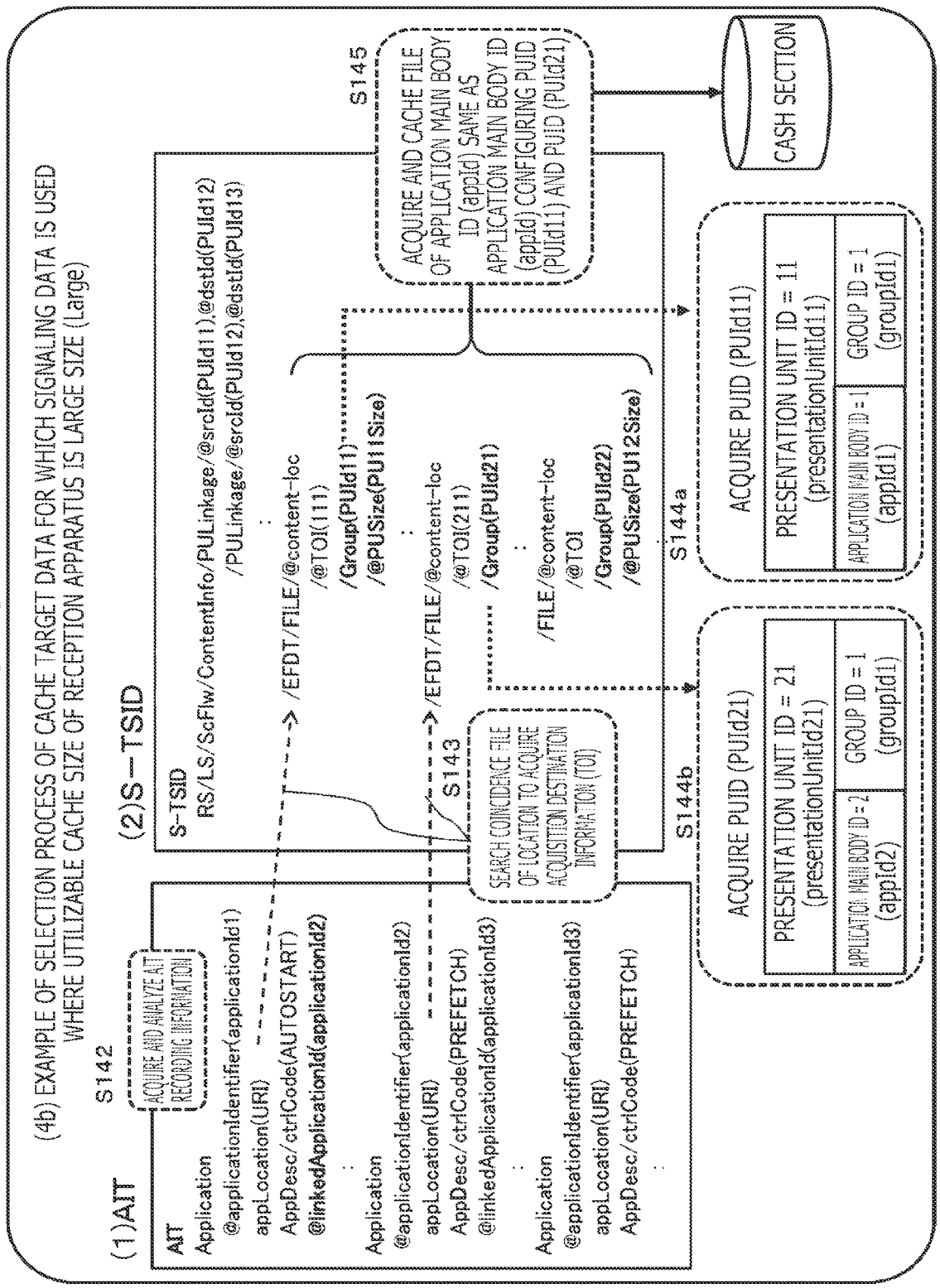
FIG. 31 is a view illustrating a description of signaling data to be referred to upon the cache process in response to the cache size of the reception apparatus.

Further, FIG. 31 depicts signaling data utilized upon processing at respective steps of the flow chart depicted in FIG. 30. Namely, the following two signaling data (1) AIT, and (2) S-TSID are utilized.

Processes at respective step numbers (S141 to S145) depicted in FIG. 30 and processes at the same step numbers (S141 to S145) depicted in FIG. 31 are same processes. In FIG. 31, recording regions of the signaling data (AIT and S-TSID) that are referred to upon processing at the respective steps and the respective step numbers are indicated in an associated relationship with each other.

Processes at the respective steps are successively described with reference to FIGS. 30 and 31.

(Step S141)

First at step S141, the reception apparatus acquires the AIT (application information table) and the S-TSID from the SLS (service level signaling) transmitted from the transmission apparatus.

(Step S142)

Then at step S142, the reception apparatus performs acquisition and confirmation of information relating to the distribution application from the AIT. For example, the reception apparatus performs the following processes:

(1) to acquire the URI, of an entry document from the application location (applicationLocation);

(2) to confirm that a control code is set to a necessary code (AUTOSTART, Prefetch or the like) for a cache process;

(3) to acquire an application ID;

(4) to acquire an application size;

(5) to acquire a link destination application; and (6) to acquire a link destination application size.

Further, the reception apparatus compares the acquired application size and the cacheable cache size of the reception apparatus with each other.

In the present example, the cache size is large (Large) and is greater than the application size of the application (APP1), and the reception apparatus decides that a cache process of the entire application (APP1) can be performed.

Further, the reception apparatus compares the data size obtained by adding the link destination application size to the application size and the cacheable cache size of the reception apparatus with each other.

In the present example, the cache size is large (Large) and is greater than the total application size of the two applications (APP1 and APP2), and the reception apparatus decides that a cache process of the entire two applications (APP1 and APP2) can be performed.

Further, the reception apparatus acquires the size of the link destination application (APP3) of the link destination application (APP2) and compares the total data size of the three applications and the cache size with each other.

In the present example, the cache size is smaller than the total data size of the three applications, and the reception apparatus decides that all of the three applications cannot be stored (cached).

As a result, the reception apparatus determines to execute a cache process of the two applications (APP1 and APP2).

(Step S143)

Then at step S143, the reception apparatus acquires acquisition destination information of the entry document of the initial execution application (APP1) from the S-TSID.

In particular, as indicated at step S143 of FIG. 31, the reception apparatus searches for a file (FILE) in which the content location information (RS/LS/ScFlw/EFDT/contentlocation) recorded in the information of file units recorded in the S-TSID and the application location (applicationLocation) of the AIT coincide with each other to acquire the acquisition destination information.

It is to be noted that, in the present example, the reception apparatus searches for a file (FILE) that indicates coincidence of two application locations (applicationLocation) recorded in the AIT to acquire acquisition destination information of the same.

(Step S144)

Then at step S144, the reception apparatus acquires an application main body ID (appId) and a group ID (groupId) from the presentation unit ID (PUID) described in the group (Group) factor of the entry document of each of the two applications.

As depicted at step S144 of FIG. 31, the presentation unit ID (PUID) is configured from an application main body ID (appId) and a group ID (groupId).

The application main body ID (appId) has a value equal to that of the application main body ID (appId) that is configuration data of the application ID (organization ID (orgId)+application main body (appId)) set to an application to which the presentation unit (PU) to which the file belongs.

In the present example, the reception apparatus acquires two application IDs (appId1 and appId2) of the link source and the link destination as indicated by steps S144a and S144b of FIG. 31.

(Step S145)

Then at step S145, the reception apparatus acquires a file having an application main body ID (appId) same as the application main body ID (appId) in the PUID of the entry document (application main body ID (appId)+group ID (groupId)), and executes a cache process.

In the present example, the reception apparatus acquires a file having the two application IDs (appId1 and appId2) and executes a cache process, and starts execution of the application using the entry document of the application 1 (APP1).

As indicated at step S145 of FIG. 31, the reception apparatus acquires a file having application main body IDS (appId1 and appId2) same as the application main body IDs (appId1 and appId2) configuring the PUIDs (PUId11 and PUId21) of the entry document from the information of the file unit recorded in the S-TSID, executes a cache process and outputs (displays) the file.

By the processes described above, all files belonging to all presentation units (PU11, PU12, PU13, PU21, PU22 and PU23) belonging to the application (APP1) and the application (APP2) of the link destination can be acquired.

Consequently, it is possible to execute an application utilizing all configuration files of all presentation units (PU11, PU12 and PU13) belonging to the application (APP1) and execute an application utilizing all configuration files of the all presentation units (PU21, PU22 and PU23) belonging to the application (APP2).

In particular, it is possible to perform data reproduction in a unit of an application and in a unit of a presentation unit in a complete form.

In other words, an application execution process of a higher degree of completeness is implemented.

[9-5. Example of Process where Data Storage Permission Cache Size of Reception Apparatus is Maximum Size (Maximum) and Plural Presentation Units (PUs) are Storable]

Now, an example of a process where the data storage permission cache size of the reception apparatus is the maximum size (Maximum) and a plurality of applications (APP1, APP2 and APPS) having a link relationship set thereamong are storable is described with reference to FIG. 32 and so forth.

Figure 32:
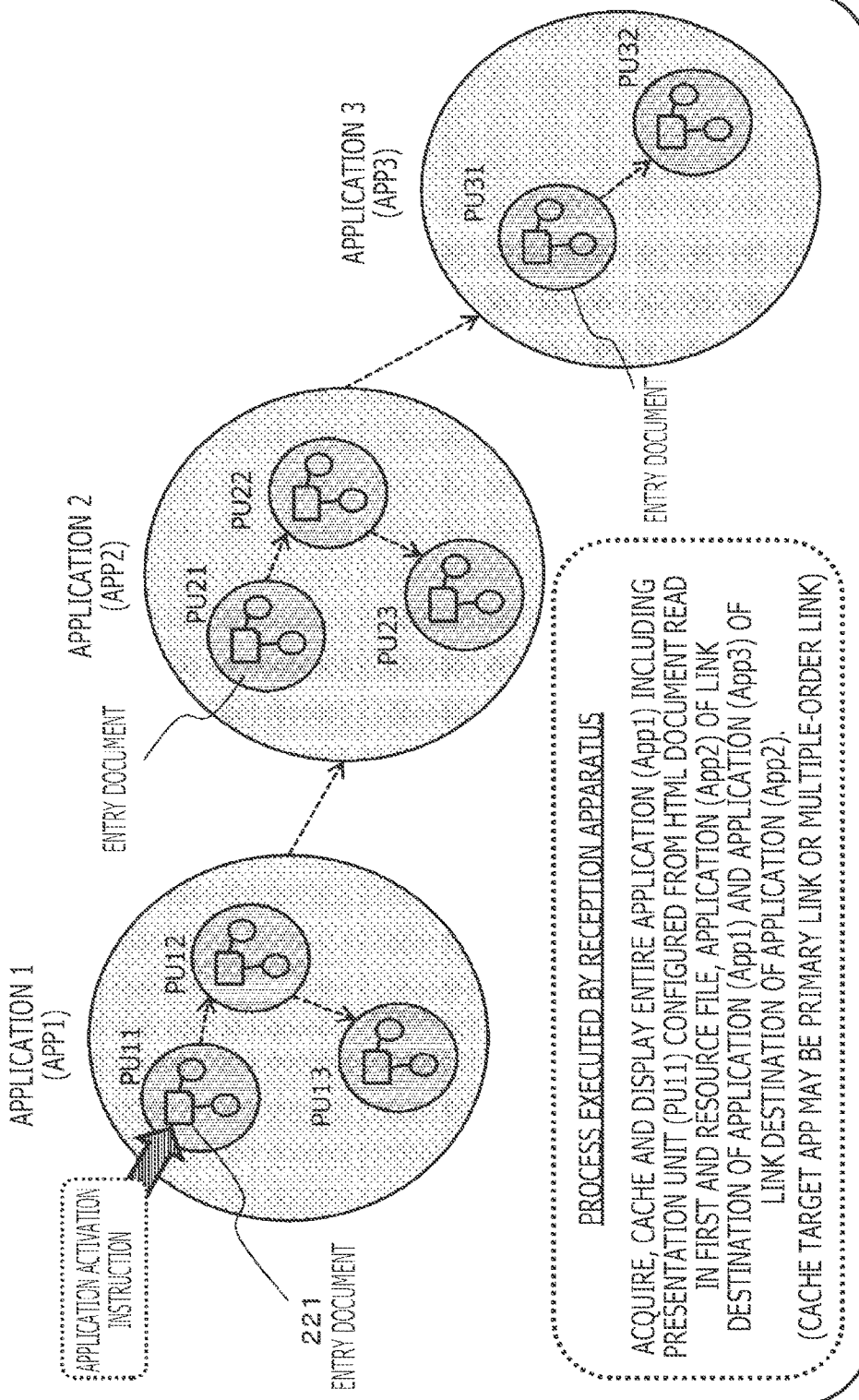
FIG. 32 is a view illustrating a particular example of the cache process in response to the cache size of the reception apparatus.

FIG. 32 is a view illustrating cache (storage) target data where the data storage permission cache size of the reception apparatus is the maximum size (Maximum).

The reception apparatus can store all of the three applications (APP1, APP2 and APP3) having a link relationship set thereamong.

The process executed by the reception apparatus is a process for acquiring, caching and displaying all configuration files of an application (APP1) to which a presentation unit (PU11) configured from an HTML document (entry document 221) read in first after activation of the application (APP1) and a resource file belongs and all configuration files of the application (APP2) that is the link destination application of the application (APP1) and the application (APP3) that is the link destination application of the application (APP2).

Figure 33:
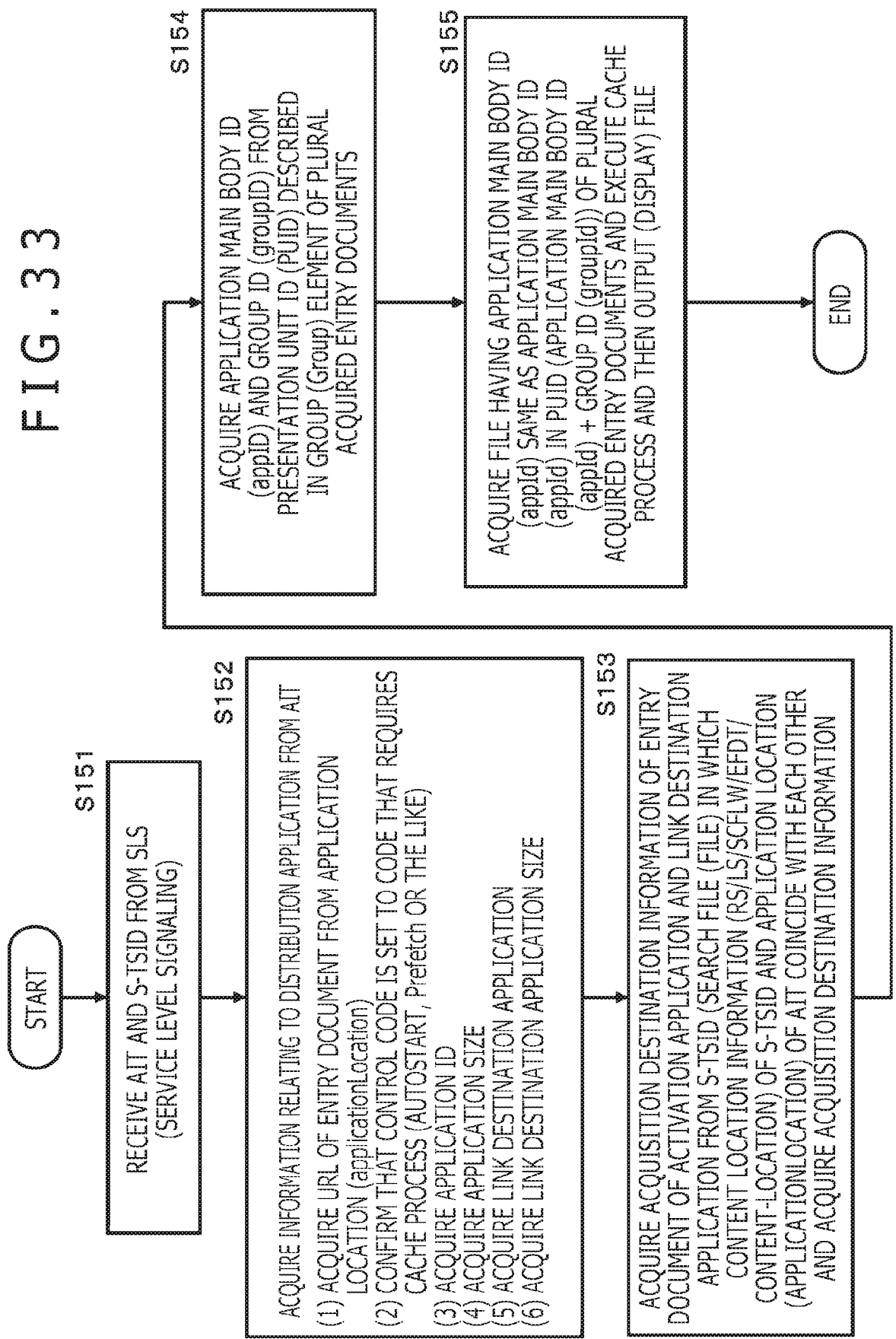
FIG. 33 is a view depicting a flow chart illustrating a particular sequence of the cache process in response to the cache size of the reception apparatus.

FIG. 33 depicts a flow chart illustrating a processing sequence when the reception apparatus acquires an application through a broadcasting wave, performs a cache process and executes the application.

Figure 34:
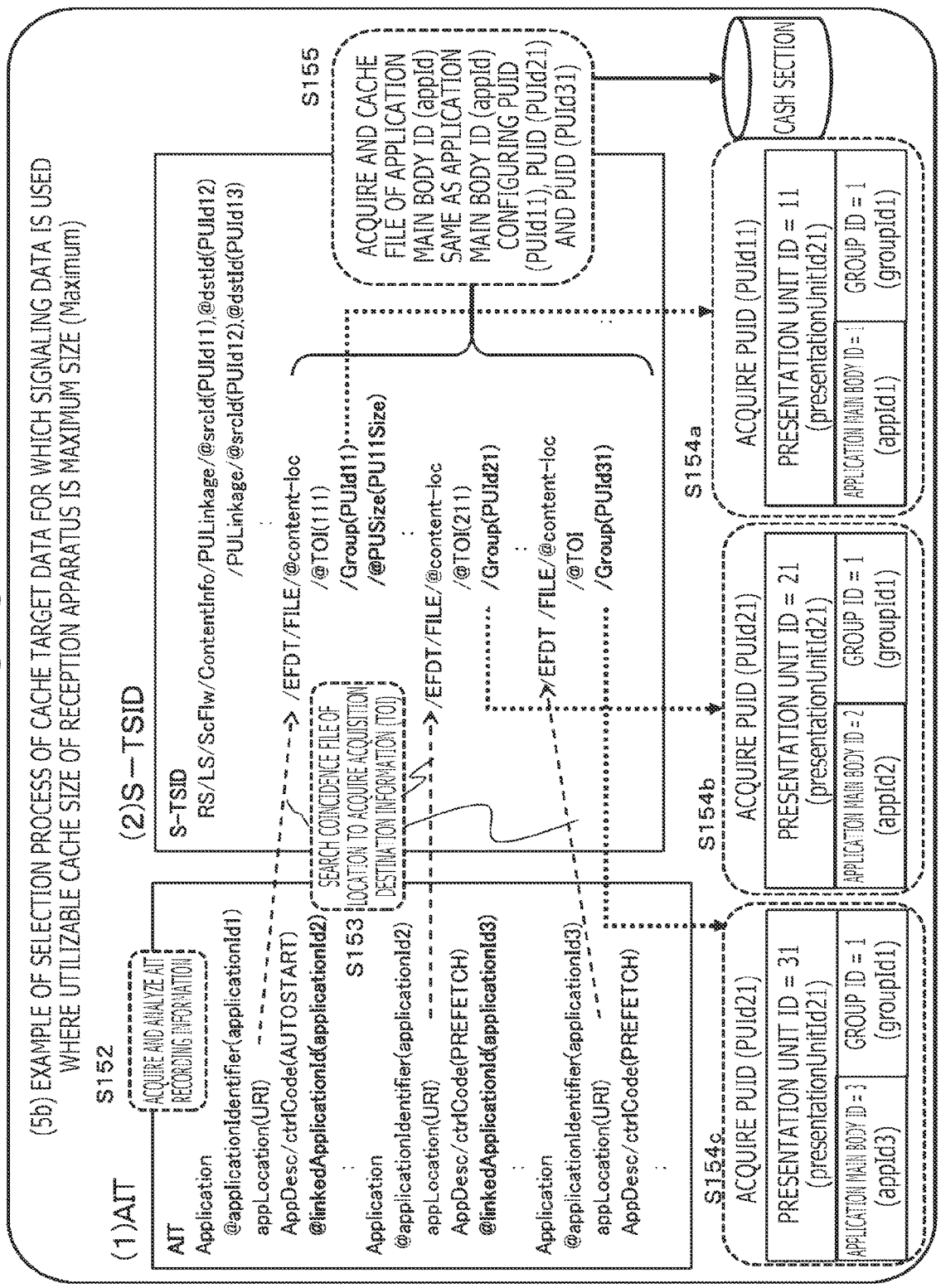
FIG. 34 is a view illustrating a description of signaling data to be referred to upon the cache process in response to the cache size of the reception apparatus.

Further, FIG. 34 depicts signaling data utilized upon processing at respective steps of the flow chart depicted in FIG. 33. Namely, the following two signaling data (1) AIT, and
(2) S-TSID are utilized.

Processes at respective step numbers (S151 to S155) depicted in FIG. 33 and processes at the same step numbers (S151 to S155) depicted in FIG. 34 are same processes. In FIG. 34, recording regions of the signaling data (AIT and S-TSID) that are referred to upon processing at the respective steps and the respective step numbers are indicated in an associated relationship with each other.

Processes at the respective steps are successively described with reference to FIGS. 33 and 34.

(Step S151)

First at step S151, the reception apparatus acquires the AIT (application information table) and the S-TSID from the SLS (service level signaling) transmitted form the transmission apparatus.

(Step S152)

Then at step S152, the reception apparatus performs acquisition and confirmation of information relating to the distribution application from the AIT. For example, the reception apparatus performs the following processes:

(1) to acquire the URL of an entry document from the application location (applicationLocation);
(2) to confirm that a control code is set to a necessary code (AUTOSTART, Prefetch or the like) for a cache process;
(3) to acquire an application ID;
(4) to acquire an application size;
(5) to acquire a link destination application; and
(6) to acquire a link destination application size.

Further, the reception apparatus compares the acquired application size and the cacheable cache size of the reception apparatus with each other.

In the present example, the cache size is maximum (Maximum) and is greater than the application size of the application (APP1), and the reception apparatus decides that a cache process of the entire application (APP1) can be performed.

Further, the reception apparatus compares the data size obtained by adding the size of the link destination application (APP2) to the application size and the cacheable cache size of the reception apparatus with each other.

In the present example, the cache size is maximum (Maximum) and is greater than the total application size of the two applications (APP1 and APP2), and the reception apparatus decides that a cache process of the entire two applications (APP1 and APP2) can be performed.

Further, the reception apparatus acquires the size of the link destination application (APP3) of the link destination application (APP2) and compares the total data size of the three applications and the cache size with each other.

In the present example, the cache size is greater than the total data size of the three applications, and the reception apparatus decides that all of the three applications can be stored (cached).

As a result, the reception apparatus determines to execute a cache process of all of the three applications (APP1, APP2 and APP3) having a link relationship therebetween.

(Step S153)

Then at step S153, the reception apparatus acquires acquisition destination information of the entry document from the S-TSID.

In particular, as indicated at step S153 of FIG. 34, the reception apparatus searches for a file (FILE) in which the content location information (RS/LS/ScFlw/EFDT/contentlocation) recorded in the information of file units recorded in the S-TSID and the application location (applicationLocation) of the AIT coincide with each other to acquire the acquisition destination information.

It is to be noted that, in the present example, the reception apparatus searches for a file (FILE) that indicates coincidence of three application locations (applicationLocation) recorded in the AIT to acquire acquisition destination information of the same.

(Step S154)

Then at step S154, the reception apparatus acquires an application main body ID (appId) and a group ID (groupId) from the presentation unit ID (PUID) described in the group (Group) factor of the entry document of each of the two applications.

As depicted at step S154 of FIG. 34, the presentation unit ID (PUID) is configured from an application main body ID (appId) and a group ID (groupId).

The application main body ID (appId) has a value equal to that of the application main body ID (appId) that is configuration data of the application ID (organization ID (orgId)+application main body (appId)) set to an application to which the presentation unit (PU) to which the file belongs.

In the present example, the reception apparatus acquires three application IDs (appId1, appId2 and appId3) having a link relationship with each other as indicated by steps S154a, S154b and S154c of FIG. 34.

(Step S155)

Then at step S155, the reception apparatus acquires a file having an application main body ID (appId1 same as the application main body ID (appId) in the PUID of the entry document (application main body ID (appId1+group ID (groupId)), and executes a cache process.

In the present example, the reception apparatus acquires a file having the three application IDs (appId1, appId2 and appId3) and executes a cache process, and starts execution of the application using the entry document of the application 1 (APP1).

As depicted at step S155 of FIG. 34, the reception apparatus acquires a file having application main body IDS (appId1, appId2 and appId3) same as the application main body IDs (appId1, appId2 and appId3) configuring the PUIDs (PUId11, PUId2l and PUId31) of the entry document from the information of the file unit recorded in the S-TSID, executes a cache process and outputs (displays) the file.

By the processes described above, all files belonging to all presentation units (PU11, PU12, PU13, PU21, PU22, PU23, PU31 and PU32) belonging to the application (APP1), application (APP2) and application (APPS) between which a link relationship is set can be acquired.

Consequently, it is possible to execute an application utilizing all configuration files of all presentation units (PU11 to PU32) belonging to the three applications (APP1 to APPS).

In particular, it is possible to perform data reproduction in a unit of an application and in a unit of a presentation unit in a complete form.

In other words, an application execution process of a higher degree of completeness is implemented.

[10. Overall Sequence of Data Processing by Reception Apparatus]

Figure 35:
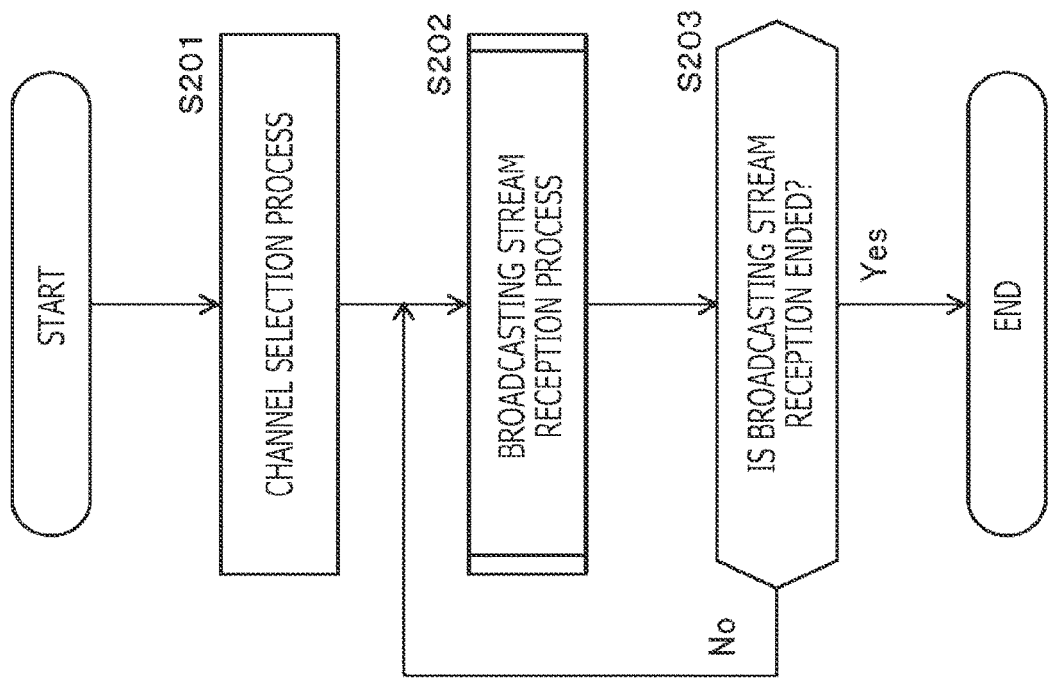
FIG. 35 is a view depicting a flow chart illustrating a process executed by the reception apparatus.

Now, a sequence of principal processes executed by the reception apparatus is described with reference to flow charts depicted in FIG. 35 and so forth.

The flow charts depicted in FIG. 35 and so forth are flow charts mainly illustrating, for example, processes given below executed by the reception apparatus:

(1) a reception process of a broadcasting process;

(2) a cache process of an application configuration file; and (3) execution of an application and a transition process between applications.

[10-1. Overall Sequence of Broadcasting Stream Reception Process by Reception Apparatus]

First, an overall sequence of a reception process of a broadcast stream executed by the reception apparatus is described with reference to a flow depicted in FIG. 35. Processes at individual steps are described.

(Step S201)

The process at step S201 is a channel selection process executed by the reception apparatus.

This is a reception channel (for example, broadcasting station) selection process by a user of the reception apparatus side.

(Step S202)

After one reception channel is selected at step S201, at step S202, the reception apparatus executes a reception process of a broadcast stream according to the selected channel.

Details of this process are hereinafter described with reference to flows of FIG. 36 and so forth.

(Step S203)

Step S203 is a decision process step of an end of reception of a broadcast stream. For example, the broadcast stream reception process at step S202 is ended using a process such as, for example, a power supply turning off process of the reception apparatus by a user as a trigger.

If reception ending of a broadcast stream is not performed, then the reception process of a broadcast stream at step S202 is executed continuously.

[10-2. Detailed Sequence of Broadcast Stream Reception Process by Reception Apparatus]

Now, a detailed sequence of the reception process of a broadcast stream executed by the reception apparatus is described with reference to a flow depicted in FIG. 36. Processes at individual steps are described.

(Step S251)

When the reception apparatus starts a reception process of a broadcast stream, it starts a reception process of a transmission packet from the transmission apparatus.

It is to be noted that the reception apparatus selectively acquires data storage packets corresponding to a channel selected in accordance with the channel selected by the reception apparatus.

It is to be noted that the data transmitted from the transmission apparatus include various data such as an AV segment, signaling data, NRT data including an application and so forth, and so forth as described hereinabove with reference to FIG. 2

It is to be noted that the signaling data include varies kinds of signaling data such as the above-described USBD/USD, AID, S-TSID and so forth.

(Step S252)

The reception apparatus refers to the packet header information and so forth of the reception packet to decide which one of an AV segment such as video, audio, subtitle data and so forth, NRT data of an application or the like, and signaling data the reception data is.

If the reception packet is a packet in which an AV segment of video, audio or caption data or the like is stored, then the processing advances to step S253.

If the reception packet is a packet in which NRT data of an application or the like is stored, then the processing advances to step S254.

If the reception packet is a packet in which signaling data such as the USBD/USD, AlI, S-TSID or the like is stored, then the processing advances to step S255.

(Step S253)

If the reception packet is a packet in which an AV segment of video, audio or caption data or the like is stored, then at step S253, the reception apparatus extracts video, audio, subtitle data or the like from the reception packet, executes a predetermined decoding process and executes rendering, namely, a reproduction outputting process.

This process is a reproduction outputting process, for example, of a broadcasting program.

(Step S254)

If the reception packet is a packet in which NRT data of an application or the like is stored, then at step S254, the reception apparatus performs a process for receiving and accumulating NRT data on the basis of the signaling data.

It is to be noted that, when the NRT data is an application, the reception apparatus performs a process including a selection process of storage (cache) data in accordance with the recording information of the signaling data such as the USBD/USD, AIT, S-TSID or the like as described hereinabove.

In particular, acquisition of signaling data corresponding to an application is executed preceding to a storage (cache) process of the application, and selective acquisition and cache processes of an application are executed in accordance with the description of the signaling data acquired precedently.

(Step S255)

If the reception packet is a packet in which signaling data such as the USBD/USD, AIT, S-TSID or the like is stored, then the processing advances to step S255.

At step S255, the reception apparatus executes reception and analysis processes of signaling data.

Figure 37:
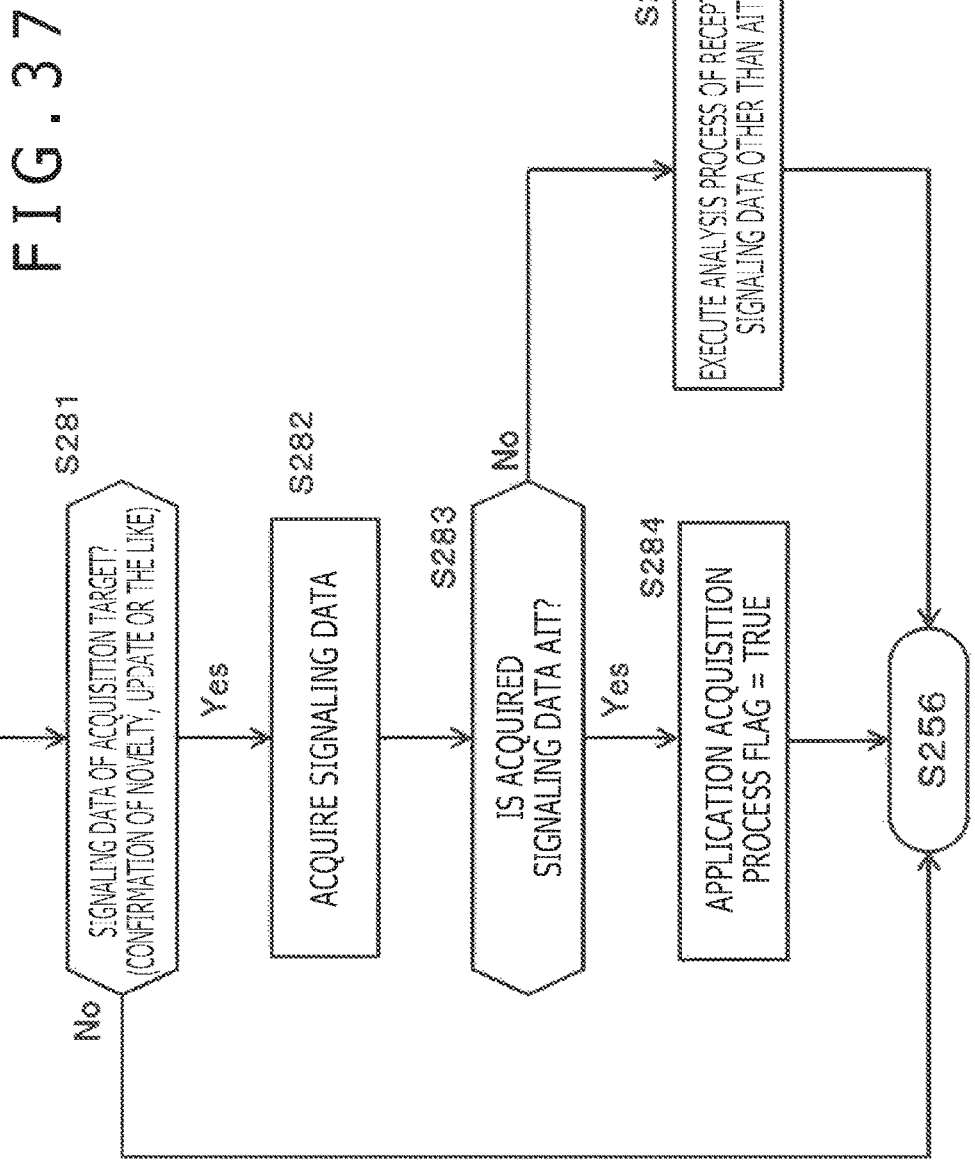
FIG. 37 is a view depicting a flow chart illustrating a process executed by the reception apparatus.

Details of the processes are hereinafter described with reference of a flow of FIG. 37.

(Step S256)

At step S256, the reception apparatus decides whether or not an acquisition process of the application is required on the basis of a result of the analysis of the signaling data at step S255.

In particular, the reception apparatus performs a process for deciding whether it is set so as to execute an acquisition process of an application, namely, whether or not an application acquisition process flag is set to True.

It is to be noted that the flat is set when the AIT is received as the signaling data at step S255. Details are hereinafter described with reference to a flow depicted in FIG. 37.

If the flag setting is such setting as to execute an application acquisition process, the processing advances to step S257.

If it is decided that the flag setting is such setting as not to perform acquisition of an application, then the processing returns to the start position of the broadcast stream reception process at step S202, and the reception apparatus executes a reception process of a next packet, namely, the processes at step S251 and so forth.

(Step S257)

If it is decided at step S256 that an acquisition process of an application is required on the basis of a result of the analysis of the signaling data at step S255, then the processing advances to step S257, at which the acquisition process of an application is executed.

This process is an acquisition process of an application in accordance with recording information of the signaling data such as the USBD/USD, AIT, S-TSID or the like described hereinabove and is a process including a process for selecting cache target data in response to a cache capacity of the own apparatus.

This process is hereinafter described in detail with reference to a flow depicted in FIG. 38.

[10-3. Detailed Sequence of Reception and Analysis Processes of Signaling by Reception Apparatus]

Figure 36:
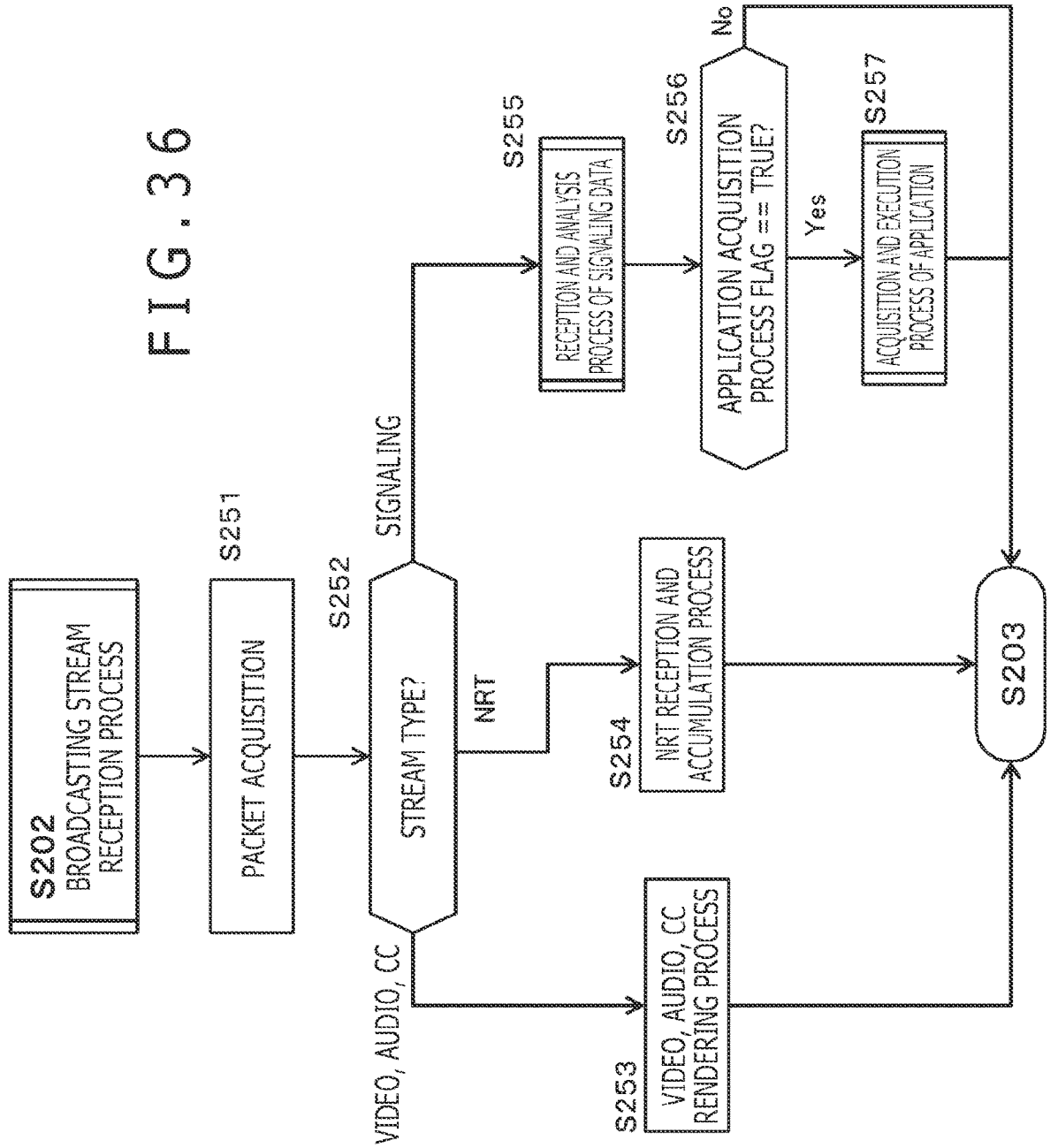
FIG. 36 is a view depicting a flow chart illustrating a process executed by the reception apparatus.

Now, a detailed sequence of the reception and analysis processes of signaling data executed at step S255 of FIG. 36 is described with reference to a flow chart of FIG. 37.

In the following, processes at individual steps are described.

(Step S281)

First at step S281, the reception apparatus decides whether or not received signaling data is signaling data to be made an acquisition target.

Where signaling data is not acquired as yet or, even if signaling data are acquired already, where updated signaling data of a version newer than that of the signaling data acquired already is received, or in a like case, the reception apparatus decides that the signaling data is signaling data of an acquisition target, and the processing advances to step S282.

(Step S282)

At step S282, the reception apparatus acquires signaling data.

It is to be noted that various kinds of signaling data are available as described hereinabove.

For example, there are such signaling data as a USBD/USD, an AIT, an S-TSID or the like, and further, various kinds of signaling data such as an MPD that is signaling data corresponding to an AV stream are available.

(Step S283)

Then at step S283, the reception apparatus decides whether or not the received signaling data is an AIT (application information table) in which control information corresponding to the application and so forth are recorded.

If the received signaling data is an AIT, then the processing advances to step S284.

IF the signaling data is different from an AIT, then the processing advances to step S285.

(Step S284)

If it is decided at step S283 that the received signaling data is an AIT (application information table) in which control information corresponding to the application and so forth are recorded, then the reception apparatus performs, at step S284, setting to execute an acquisition process of the application, namely, a process to set the application acquisition process flag to True.

(Step S285)

On the other hand, if it is decided at step S283 that the received signaling data is not an AIT (application information table) in which control information corresponding to the application and so forth are recorded but is some other signaling data, then the processing advances to step S285, at which the reception apparatus executes analysis of the received signaling data other than an AIT and a process in accordance with the reception signaling data.

[10-4. Detailed Sequence of Acquisition and Execution Processes of Application by Reception Apparatus]

Now, a detailed sequence of acquisition and execution processes of an application executed at step S257 of FIG. 36 is described with reference to a flow depicted in FIG. 38.

In the following, process of individual steps are described.

(Step S301)

First at step S301, the reception apparatus acquires control code (ctrlCode) information that prescribes a processing form for an application from the acquired AIT and decides whether or not the control code is a code that requires a cache process of the application.

The code that requires a cache process is, for example, a code that designates immediate execution of an application (AUTOSTART), a code for acquiring an application in advance and then causing the application to be executed at a predetermined point of time (PREFETCH) and so forth.

If the reception apparatus confirms that the control code recorded in the AIT is a code that requires a cache process of such applications, then the processing advances to step S302.

It is to be noted that, if the control code recorded in the AIT is not a code that requires a cache process, then the processes at the steps beginning with step S302 are not executed, but a process according to the recorded code is executed.

(Step S302)

If the reception apparatus confirms that the control code recorded in the AIT is a code that requires a cache process of the application, then it reads an acquisition destination URI of the application from the AIT at step S302.

In particular, the control code recorded in the AIT is application access information (appLocation(URI)) in the AIT recorded information described hereinabove with reference to FIG. 15.

(Steps S303 and S304)

Then at step S303, the reception apparatus refers to the USD (or USBD), which is the other signaling data, to confirm through which one of a broadcasting wave and a communication network the application is to be transmitted.

This is the process described hereinabove with reference to FIG. 12, and the reception apparatus refers to and confirms base pattern information recorded in the USD (USBD) depicted in FIG. 12.

In the USD (USBD) depicted in FIG. 12, a base pattern is recorded in a base pattern recording region (USD/deliveryMethod/atsc:BcAppService/basePattern) corresponding to a broadcasting wave when the application is transmitted through a broadcasting wave.

On the other hand, when the application is transmitted through a communication network, a base pattern is recorded into a base pattern recording region (USD/deliveryMethod/atsc:UcAppService/basePattern) corresponding to a communication network.

The reception apparatus can determine whether the application is to be transmitted through a broadcasting wave or transmitted through a communication network such as the Internet depending upon which base pattern is recorded in the USD.

If it is confirmed that the application is to be transmitted through a broadcasting wave, then the processing advances to step S305.

On the other hand, if it is confirmed that the application is to be transmitted through a communication network such as the Internet, then the processing advances to step S306.

(Step S305)

If it is confirmed that the application is transmitted through a broadcasting wave, then the processing advances to step S305, at which the reception apparatus executes an application acquisition process through a broadcasting wave.

This process is hereinafter described in detail with reference to a flow depicted in FIG. 39.

(Step S306)

On the other hand, if it is confirmed that the application is to be transmitted through a communication network such as the internet, then the processing advances to step S306, at which the reception apparatus executes an application acquisition process through a communication network.

(Step S307)

After an acquisition process of the application is performed at step S305 or step S306, the reception apparatus executes the application at step s307.

It is to be noted that the execution timing of the application or the like is recorded in the AIT corresponding to the application, and the reception apparatus performs execution control of the application in accordance with the description of the AIT.

[10-5. Detailed Sequence of Acquisition Process of Application Through Broadcast by Reception Apparatus]

Figure 38:
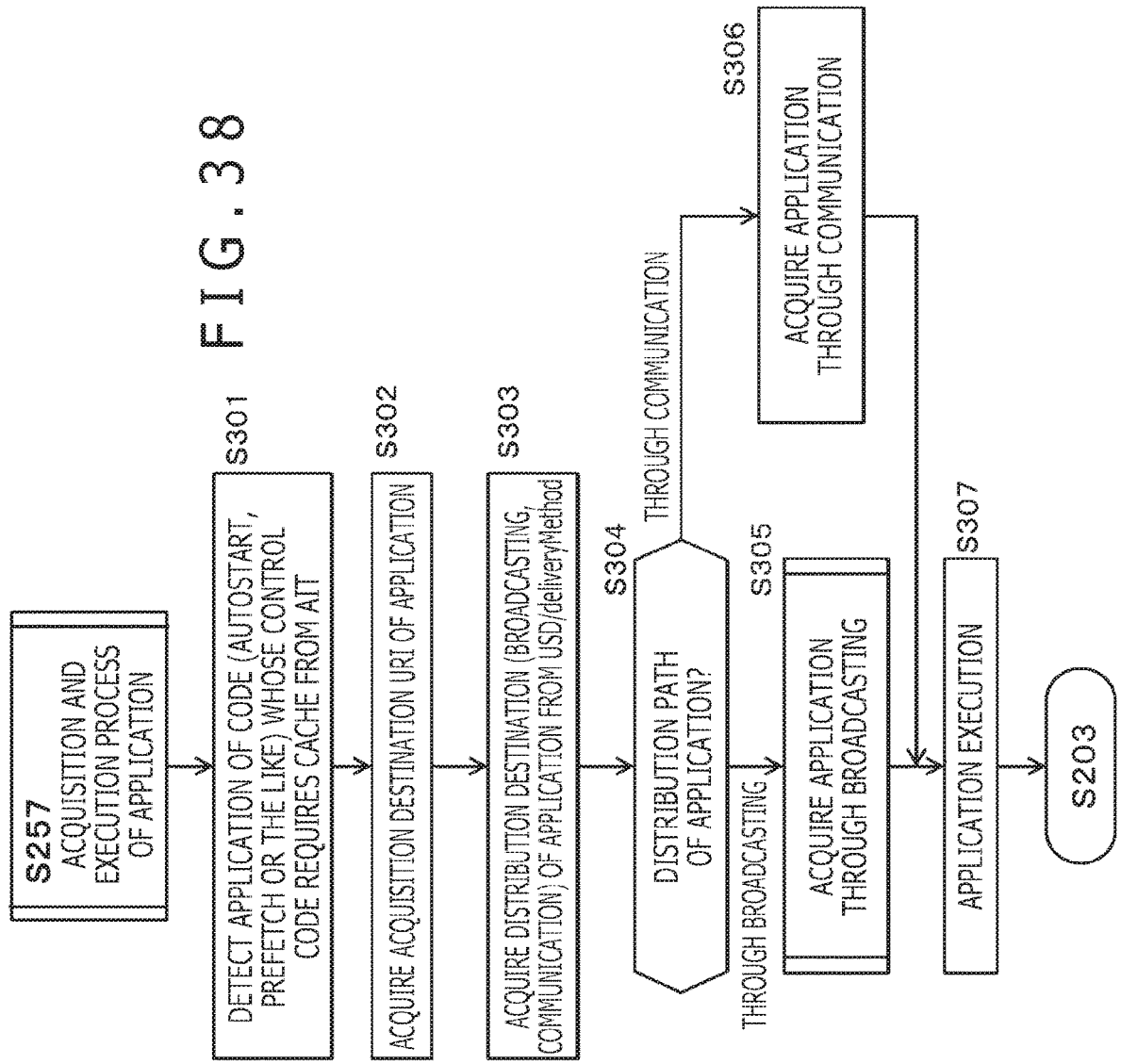
FIG. 38 is a view depicting a flow chart illustrating a process executed by the reception apparatus.

Now, a detailed sequence of an acquisition process of an application through a broadcast executed at step S305 of FIG. 38 is described with reference to a flow depicted in FIG. 39.

In the following, processes at individual steps are described.

(Step S321)

First at step S321, the reception apparatus acquires a cache size that can be utilized by the reception apparatus.

(Step S322)

Then at step S322, the reception apparatus acquires a data size of an application scheduled to be acquired, namely, an application size.

The application size is recorded in the AIT as described hereinabove with reference to FIG. 12. The application size is the application size 253 (@appSize) depicted in FIG. 12.

The reception apparatus refers to the AIT corresponding to the application scheduled to be acquired to read the application size.

(Step S323)

The at step S323, the reception apparatus compares the cache size that can be utilized by the reception apparatus and the application size with each other.

If the cache size is smaller than the application size, then the processing advances to step S324.

On the other hand, if the cache size is equal to or greater than the application size, then the processing advances to step S325.

(Step S324)

If it is decided by the size comparison process at step S323 that the cache size is smaller than the application size, then the processing advances to step S324, at which the reception apparatus executes a cache process in a unit of a presentation unit (PU).

This process is the process described hereinabove with reference to FIGS. 20 to 25, namely, a process corresponding to the process in the case where the cache size is the minimum size (Minimum) or the small size (Small).

(Step S325)

On the other hand, if it is decided by the size comparison process at step S323 that the cache size is equal to or greater than the application size, then the processing advances to step S325, at which the reception apparatus executes a cache process in a unit of an application.

This process is a process described hereinabove with reference to FIGS. 26 to 34, namely, a process corresponding to the process in the case where the cache size is the medium size (Medium) or the large size (Large) or else the maximum size (Maximum).

[10-6. Detailed Sequence of Cache Process in Unit of Presentation Unit (PU) by Reception Apparatus]

Figure 39:
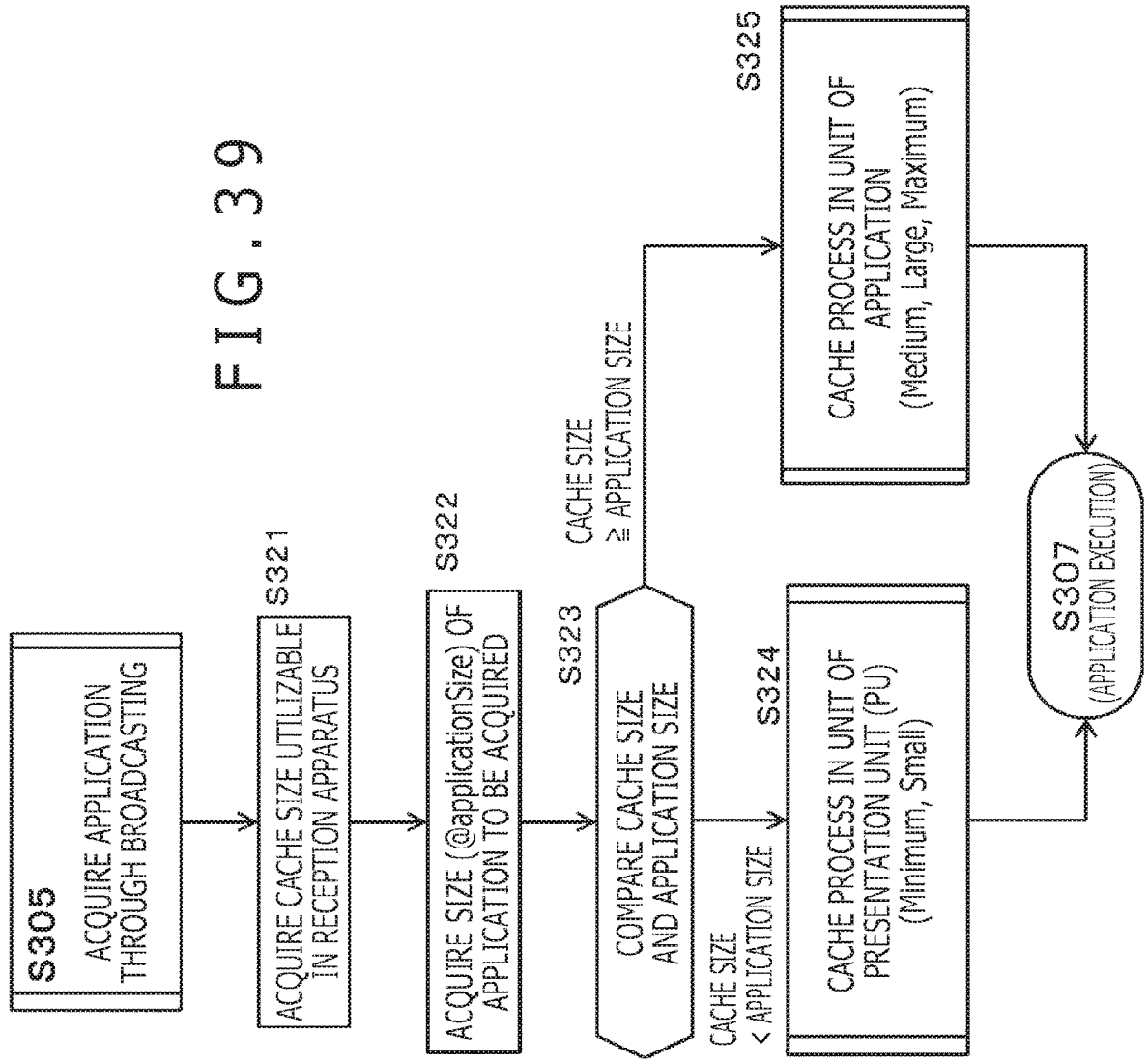
FIG. 39 is a view depicting a flow chart illustrating a process executed by the reception apparatus.

Now, a detailed sequence of a cache process in a unit of a presentation unit (PU) executed at step S324 of FIG. 39 is described with reference to a flow chart of FIG. 40.

In the following, processes at individual steps are described.

(Step S341)

First at step S341, the reception apparatus acquires a presentation unit (PU) including an entry document and an ID (PUID) of a presentation unit (UP) to be linked from this PU from the S-TSID that is signaling data transmitted from the transmission apparatus.

The reception apparatus refers to the inter-presentation unit link information 261 in the S-TSID described hereinabove with reference to FIG. 16 to acquire IDs of PUs having a link relationship therebetween.

(Step S342)

Then, the reception apparatus compares the cache size of the reception apparatus, namely, a cache size that can be utilized by the reception apparatus, and the data size of each presentation unit (PU) to select presentation units to be made a cache target.

It is to be noted that the most preferential cache target PU is a presentation unit having an entry document (for example, PU11).

The second most preferential cache target PU is a link destination PU of PU11 having an entry document, for example, PU12.

Further, the link destination PU13 of PU12 is selected as a next cache target PU, and the cache target PUs are successively selected following the links.

At a point of time at which the cache size is exceeded, selection of a cache target PU is completed.

In particular, for example, in the case of

PU11 size≤cache size<(PU11+PU12) size, only PU11 is selected as a cache target PU.

On the other hand, in the case of (PU11+PU12) size≤cache size<(PU11+PU12+PU13) size,
the reception apparatus selects PU11 and PU12 as the cache target PUs.

In this manner, cache target PUs are successively selected following links within a range within which the total size of the PUs reaches the cache size.

(Step S343)

Then, the reception apparatus acquires the cache target presentation unit (PU) determined at step S342 and caches (stores) the cache target presentation unit (PU) into the cache section (storage section).

Thereafter, the application is executed utilizing the cached presentation unit at step S307 depicted in the flow of FIG. 38.

Figure 40:
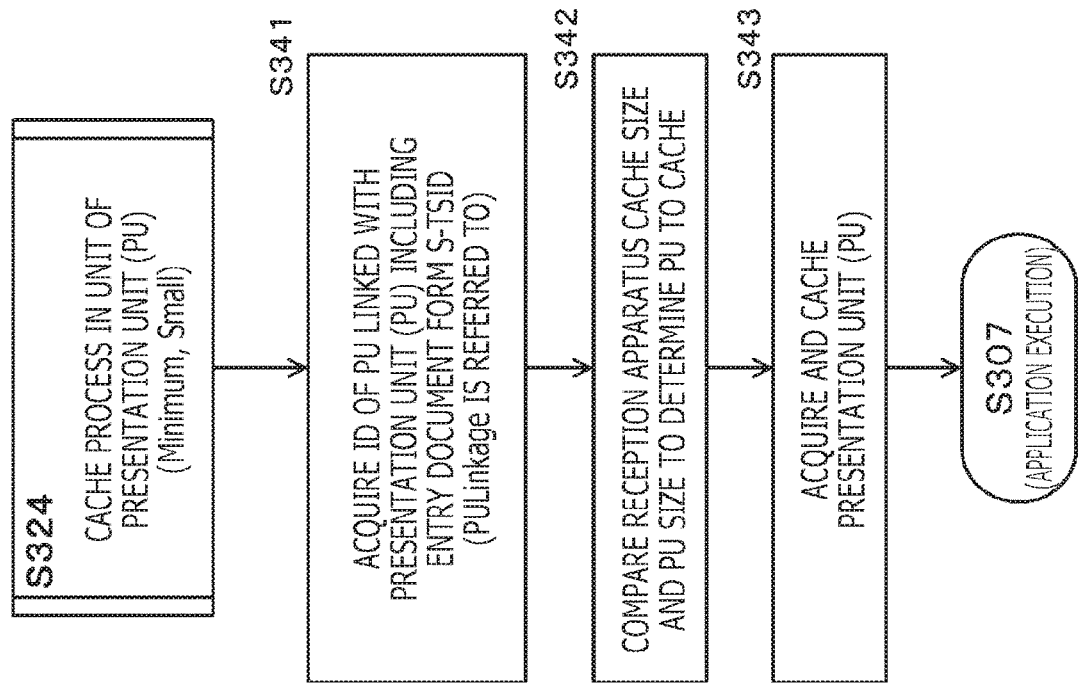
FIG. 40 is a view depicting a flow chart illustrating a process executed by the reception apparatus.

It is to be noted that the process according to the flow depicted in FIG. 40 is a process corresponding to the process described hereinabove with reference to FIGS. 20 to 25, namely, a process corresponding to the process in the case where
the cache size is the minimum size (Minimum) or the small size (Small).

As described hereinabove, one presentation unit (PU: Presentation Unit) is configured from a set of data presented utilizing one or a plurality of HTMLs (HyperText Markup Languages).

In particular, one presentation unit (PU) is a unit configured from the following components:

(1) one or a plurality of HTML files;

(2) an image (moving image, still image) file outputted in accordance with the HTML;

(3) an audio file outputted in accordance with the HTML; and (4) a style sheet storage file that defines a data output style in accordance with the HTML.

For example, one presentation unit (PU) is set from the components described above.

If all of data belonging to one presentation unit (PU) can be acquired, then it is guaranteed that data outputting depending upon an HTML document included in the presentation unit (PU), for example, outputting of a Web page, is executed in a complete form.

[10-7. Detailed Sequence of Cache Process in Unit of Application by Reception Apparatus]

Now, a detailed sequence of a cache process in a unit of an application executed at step S325 of FIG. 39 is described with reference to a flow depicted in FIG. 41.

In the following, processes at individual steps are described.

(Step S361)

First at step S361, the reception apparatus acquires information of an initial execution application and a link destination application of the application from an AIT that is signaling data transmitted from the transmission apparatus.

The reception apparatus refers, for example, to the link destination application information 254 in the AIT described hereinabove with reference to FIG. 15 to acquire information applications having a link relationship to each other.

(Step S362)

Then, the reception apparatus compares the cache size of the reception apparatus, namely, the cache size that can be utilized by the reception apparatus, and the data size of each application to select applications to be made a cache target.

It is to be noted that the most preferential cache target application is an initial activation application (for example, APP1) designated by the AIT.

The second most preferential cache target application is a link destination application of the initial activation application 1 (APP1), for example, APP2.

Further, the link destination application 3 (APPS) of the application 2 (APP2) is selected as a next cache target application, and cache target applications are successively selected following the links.

At a point of time at which the cache size is exceeded, selection of a cache target application is completed.

In particular, for example, in the case of application 1 (APP1) size≤cache size<(application 1 (APP1)+application 2 (APP2)), only the application 1 (APP1) is selected as a cache target PU.

On the other hand, in the case of application 1 (APP1)+application 2 (APP2)) size≤cache size<(application 1 (APP1)+application 2 (APP2)+application 3 (APPS)) size, the reception apparatus selects the application 1 (APP1) and the application 2 (APP2) as the cache target PUs.

In this manner, cache target applications are successively selected following links within a range within which the total size of the applications reaches the cache size.

(Step S363)

Then, the reception apparatus acquires the cache target applications determined at step S362 and caches (stores) the cache target applications into the cache section (storage section).

Thereafter, an application is executed utilizing the applications cached at step S307 depicted in the flow of FIG. 38.

Figure 41:
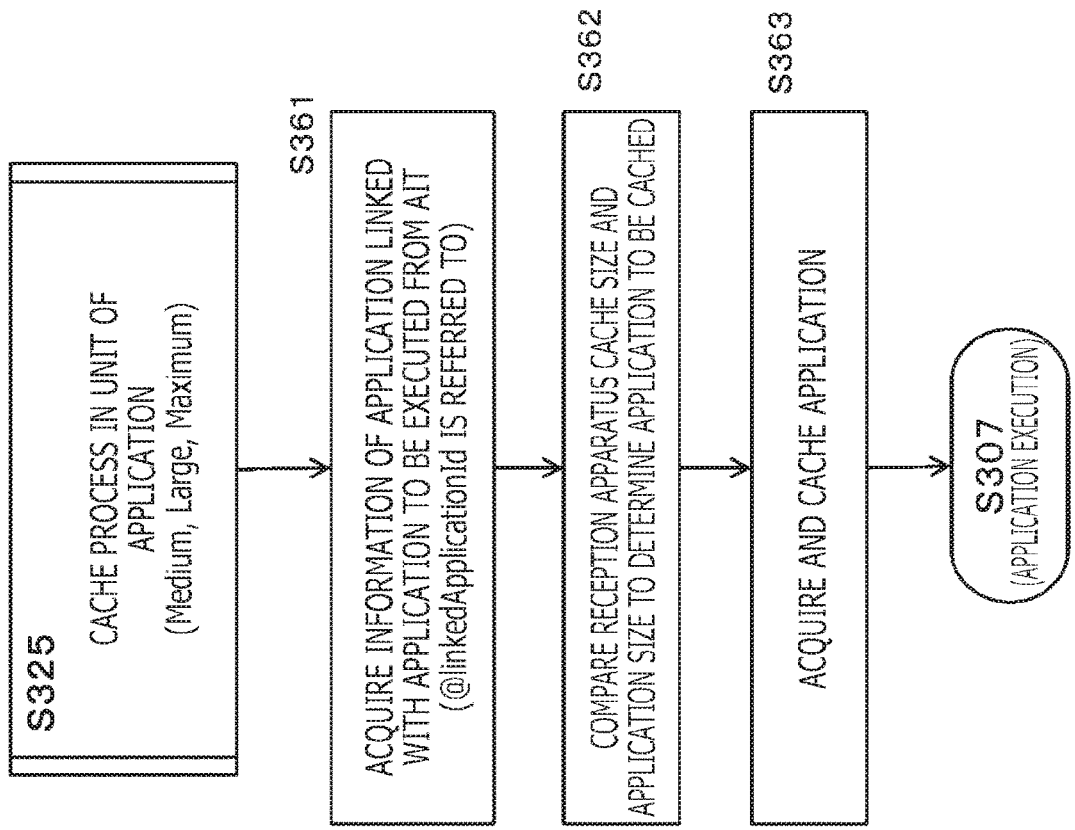
FIG. 41 is a view depicting a flow chart illustrating a process executed by the reception apparatus.

It is to be noted that the processes according to the flow depicted in FIG. 41 are processes described hereinabove with reference to FIGS. 26 to 34, namely, processes corresponding to the processes when the cache size is the minimum size (Minimum), large size (Large) or maximum size (Maximum).

As described hereinabove, one application includes one or more presentation units (PUs: Presentation Units), and each presentation unit (PU) is configured from the following components:

(1) one or a plurality of HTML files;

(2) an image (moving image, still image) file outputted in accordance with the HTML;

(3) an audio file outputted in accordance with the HTML; and (4) a style sheet storage file that defines a data output style in accordance with the HTML.

If all of data belonging to one presentation unit (PU) can be acquired, then it is guaranteed that data outputting depending upon an HTML document included in the presentation unit (PU), for example, outputting of a Web page, is executed in a complete form.

The cache process of the present disclosure is executed in a unit of an application or in a unit of a presentation unit (PU).

In particular, the minimum cache unit is a presentation unit (PU), and such a situation that part of data configuring a PU is not cached does not occur.

Accordingly, data outputting completed by an HTML document included in a presentation unit (PU) is executed.

[10-8. Transition Process Sequence Between Applications or Presentation Units (PUs) by Reception Apparatus]

Now, a transition process sequence between applications or presentation units (PUs) occurring during execution of an application is described with reference to a flow depicted in FIG. 42.

In the following, processes at individual steps are described.

(Steps S501 and S502)

The process described below is a process performed during execution of a predetermined application by the reception apparatus.

The reception apparatus waits a transition event at step S501.

It is to be noted here that the transition is one of an inter-application transition that is a transition from an application being executed to a link destination application and an inter-PU transition that is a transition from a presentation unit (PU) being executed to a presentation unit (PU) of a link destination.

It is to be noted that the transition event is an event indicating a transition to a link destination generated, for example, in accordance with control information of an AIT or, for example, in response to an operation of a user.

If the reception apparatus detects a transition event, then the processing advances to step S503.

(Step S503)

The reception apparatus decides, in response to detection of a transition event, at step S503, whether or not an application or a presentation unit (PU) of a transition destination is cached already.

If an application or a presentation unit (PU) of a transition destination is cached already, then the processing advances to step S504.

On the other hand, if an application or a presentation unit (PU) of a transition destination is not cached as yet, then the processing advances to step S505.

(Step S504)

If it is decided at step S503 that an application or a presentation unit (PU) of a transition destination is cached already, then the reception apparatus acquires and executes the application or presentation unit (PU) of the transition destination from the cache section at step S504.

(Step S505)

On the other hand, if it is decided at step S503 that an application or a presentation unit (PU) of a transition destination is not cached as yet, then the reception apparatus decides which one of the following transitions:

(a) a transition between presentation units (PUs) in an application; and (b) a transition between applications the transition mode is at step S505.

If the transition mode is the (a) transition between presentation units (PUs) in an application, then the processing advances to step S506.

On the other hand, if the transition mode is the (b) transition between applications, then the processing advances to step S507.

(Step S506)

If the transition event is the (a) transition between presentation units (PUs) in an application at step S505, then the reception apparatus executes a cache process of the presentation unit (PU) of the transition destination at step S506.

This process is a process same as the cache process in a unit of a presentation unit (PU) described hereinabove with reference to FIG. 40.

After this cache process is executed, the reception apparatus acquires and executes the cached presentation unit (PU) from the cache unit.

(Step S507)

On the other hand, if the transition event is the (b) transition between applications at step S505, then the reception apparatus acquires an application of the transition destination and executes a cache process and then executes a cache application at step S507.

This process is same as the acquisition and execution processes of an application described hereinabove with reference to FIG. 38.

In this manner, also in the case in which an application or a presentation unit (PU) of a link destination is not cached as yet, a cache process in which the cache target is a unit of an application or of a presentation unit (PU) is executed in response to the link destination.

[11. Particular Example of Application Transition Process]

Figure 42:
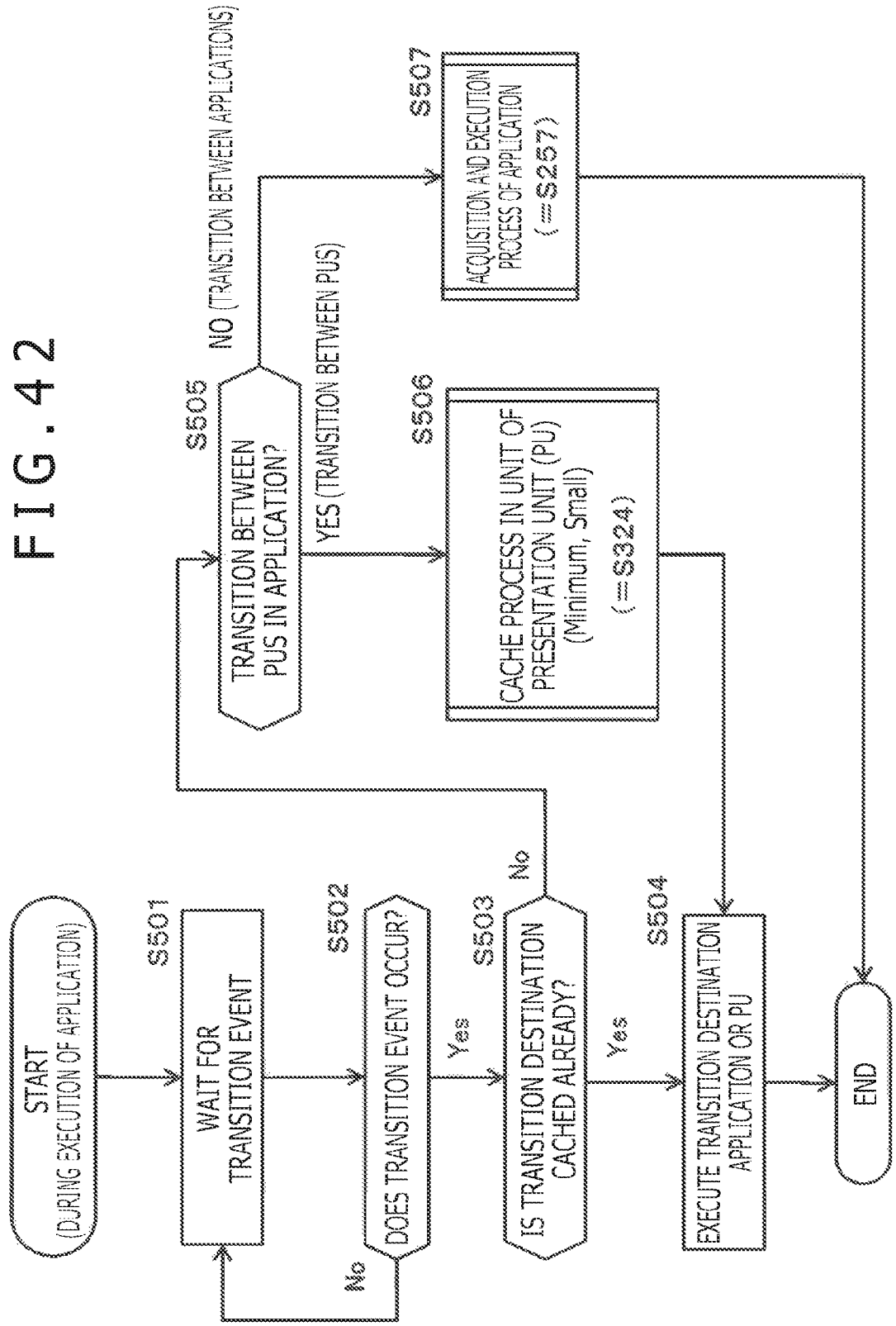
FIG. 42 is a view depicting a flow chart illustrating a process executed by the reception apparatus.

Now, a particular example of the transition process of the application described hereinabove with reference to a flow chart depicted in FIG. 42 is described.

The following two transition process examples are described with reference to FIGS. 43 and 44:

(example 1) transition process example from a broadcasting program interlocking application to a CM application executed together with broadcasting program reproduction; and (example 2) transition process example from a broadcasting program reproduction application to a CM application.

First, the (example 1) transition process example from a broadcasting program interlocking application to a CM application executed together with broadcasting program reproduction
is described with reference to FIG. 43.

Figure 43:
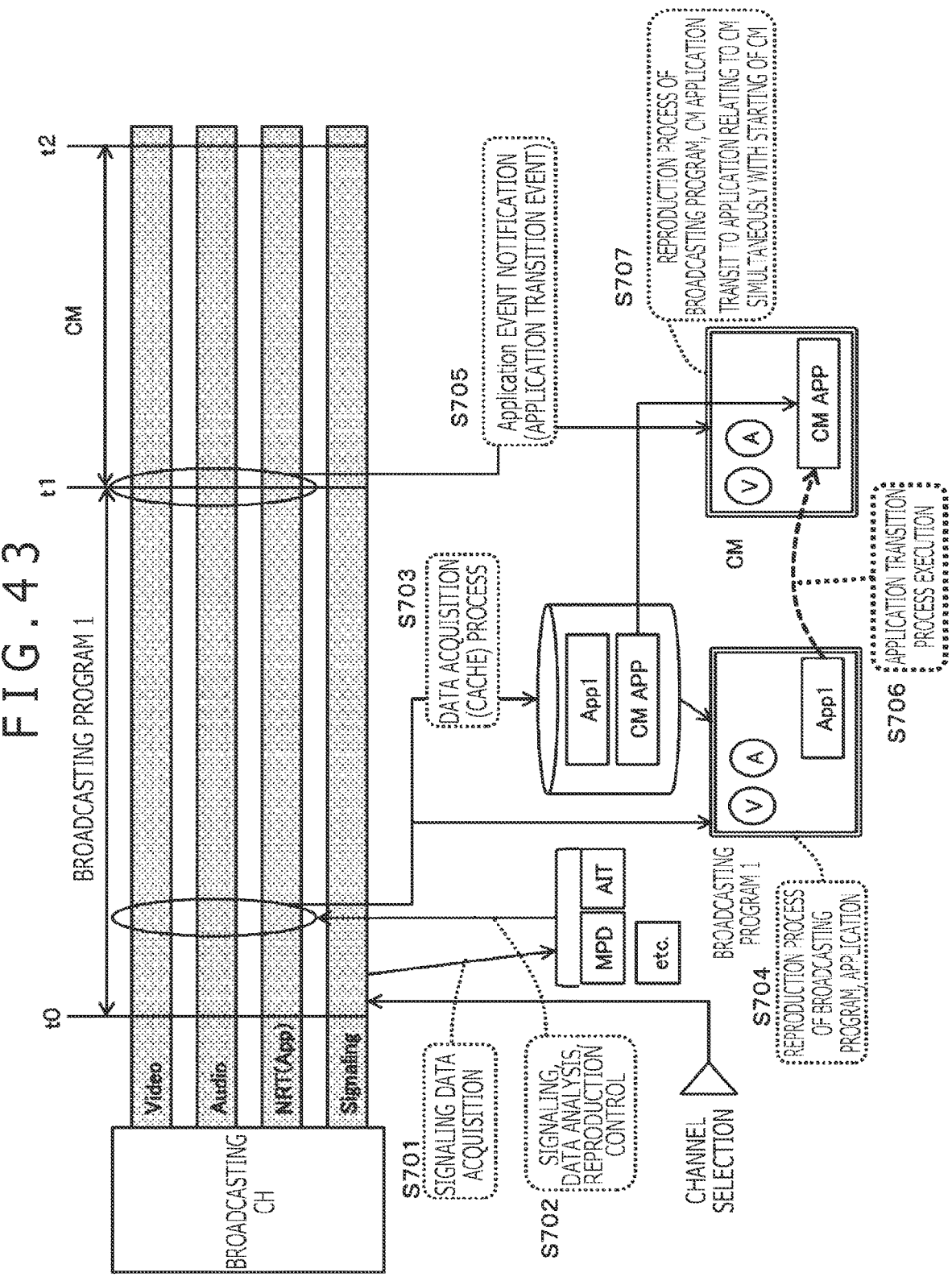
FIG. 43 is a view illustrating an example of an application transition process executed by the reception apparatus.

FIG. 43 depicts the following four data to be provided through a broadcasting wave by the transmission apparatus in accordance with a channel selected by the reception apparatus:
(a) image (Video);
(b) audio (Audi);
(c) NRT (application (APP)); and
(d) signaling data.

The reception apparatus executes processes at steps S701 to S707 depicted in FIG. 43.

Respective processing steps are successively described.
(Step S701)

First at step S701, the reception apparatus receives signaling data transmitted from the transmission apparatus.

For signaling data, various types are available, and a USBD/USD, an AID, an S-TSID, an MPD that is utilized in broadcasting program reproduction and so forth are available.

The reception apparatus receives such various signaling data as just described.
(Step S702)

Then at step S702, the reception apparatus analyzes the received signaling data to acquire information necessary for broadcasting program reproduction or execution of an application such as an AV segment that is broadcasting program configuration data, access information to an application resource or the like and so forth on the basis of a result of the analysis.
(Step S703)

Then at step S703, the reception apparatus executes a data acquisition process and a cache process of an AV segment, an application resource and so forth that configure a broadcasting program on the basis of signaling data analysis information acquired at step S702.

In the present example, the reception apparatus acquires an AV segment required for broadcasting program reproduction and a broadcasting program interlocking application (APP1) for being executed together with broadcasting program reproduction as well as a CM application (CM APP) that is a link destination (transition destination) application of the broadcasting program interlocking application (App1), and stores them into the cache section.
(Step S704)

At step S704, the reception apparatus performs broadcasting program reproduction using the AV segment acquired through a broadcasting wave and executes the application interlocking application (APP1) in parallel to the broadcasting program reproduction.

For example, as an example, such a combination is available in which the broadcasting program is a baseball live broadcast and the broadcasting program interlocking application (APP1) is a player information providing application of players or the like.
(Step S705)

Then, an event notification by signaling data is provided to the reception apparatus.

This event notification is an event notification for requesting for switching of an execution application, namely, an inter-application transition notification event.
(Step S706)

The reception apparatus executes a transition process of an application in response to detection of the application transition event.

A particular processing sequence of the process is a process in accordance with the flow chart of FIG. 42.

Here, it is assumed that the application of the transition destination is a CM application (CM APP).
(Step S707)

At step S707, the reception apparatus starts a reproduction process of a CM utilizing the CM application (CM APP) cached in advance.

For example, the CM application to be reproduced here can be set as a CM according to a viewer as described hereinabove with reference to FIG. 6.

Where the transmission apparatus is configured such that it transmits different CM applications corresponding to various viewers, the reception apparatus side selects and caches a CM application received in response to user information registered in advance.

By executing such an application selective acquisition process, also it becomes possible to display an optimum user-corresponding CM according to an age, a sex, a liking and so forth of a user (viewer).

Now, the (example 2) transition process example from a broadcasting program reproduction application to a CM application
is described with reference to FIG. 44.

Figure 44:
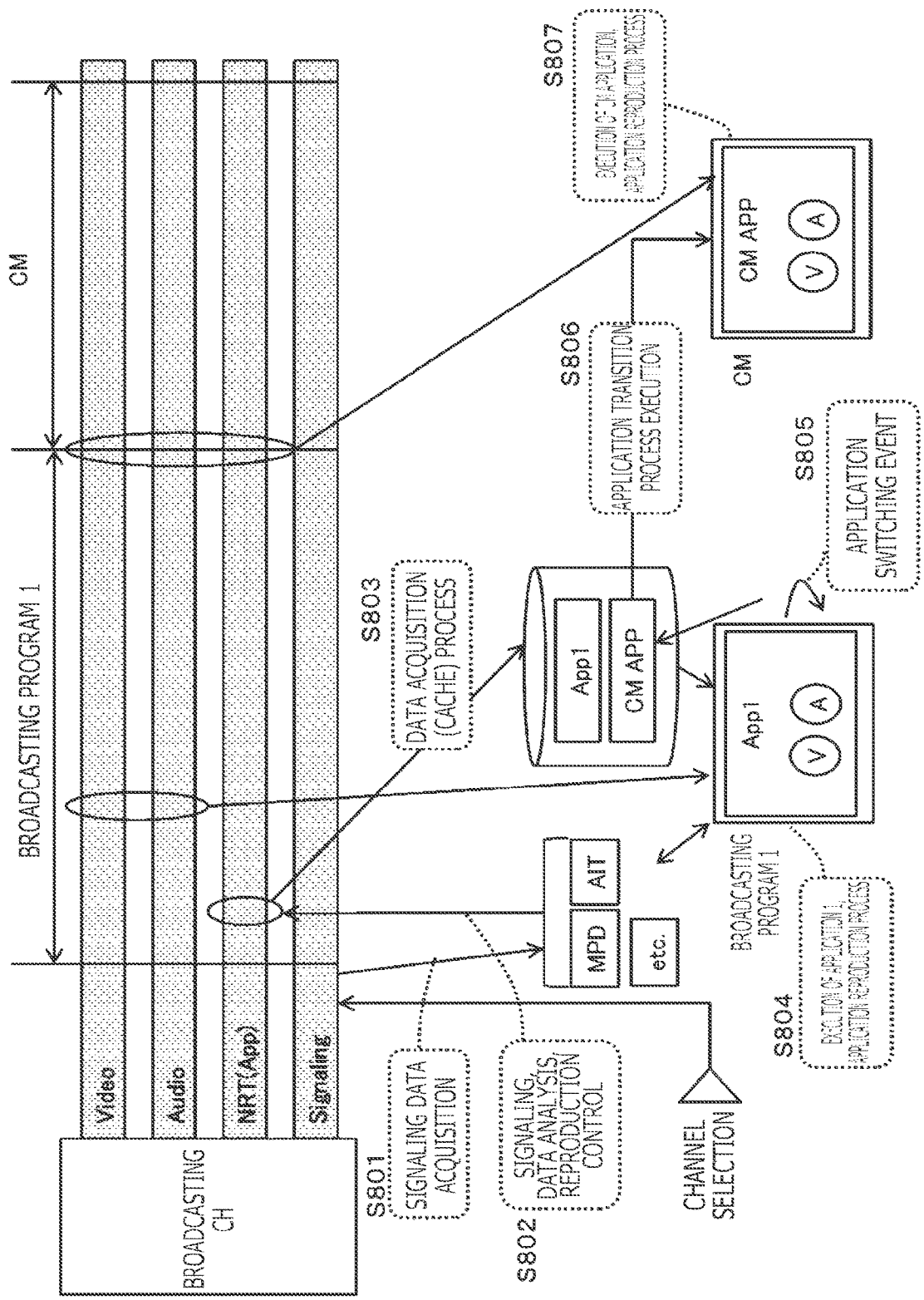
FIG. 44 is a view illustrating an example of an application transition process executed by the reception apparatus.

Also FIG. 44 indicates the following four data provided through a broadcasting wave by the transmission apparatus corresponding to a channel selected by the reception apparatus similarly as in FIG. 43:
(a) image (Video);
(b) audio (Audi);
(c) NRT (application (APP)); and
(d) signaling data.

The reception apparatus executes processes at steps S801 to S807 depicted in FIG. 44.

Individual steps are described successively.
(Step S801)

First at step S801, the reception apparatus receives signaling data transmitted from the transmission apparatus.

For the signaling data, various types are available, and a USBD/USD, an AID, an S-TSID, an MPD that is utilized in broadcasting program reproduction and so forth are available.

The reception apparatus receives such various signaling data as just described.
(Step S802)

Then at step S802, the reception apparatus analyzes the received signaling data to acquire information necessary for broadcasting program reproduction or execution of an application such as an AV segment that is broadcasting program configuration data, access information of an application resource or the like and so forth on the basis of a result of the analysis.
(Step S803)

Then at step S803, the reception apparatus executes a data acquisition process and a cache process of an AV segment, an application resource and so forth that configure a broadcasting program on the basis of the signaling data analysis information acquired at step S702.

In the present example, the reception apparatus acquires an AV segment required for broadcasting program reproduction and a broadcasting program interlocking application (APP1) for executing a broadcasting program reproduction process as well as a CM application (CM APP) that is a link destination (transition destination) application of the broadcasting program interlocking application (App1) and stores them into the cache section.

(Step S804)

At step S804, the reception apparatus performs broadcasting program reproduction using the AV segment acquired through a broadcasting wave and the broadcasting program reproduction application (APP1).

(Step S805)

Then, the reception apparatus detects an event originating from signaling data such as the AIT, an operation of a user (remote controller operation) or the like.

This event is an event for requesting for switching of an execution application. Namely, the event is an inter-application transition notification event.

(Step S806)

The reception apparatus executes a transition process of an application in response to detection of the application transition event.

A particular processing sequence of the process is a process in accordance with the flow chart of FIG. 42.

Here, it is assumed that the application of the transition destination is a CM application (CM APP).

(Step S807)

At step S807, the reception apparatus starts a reproduction process of a CM utilizing the CM application (CM APP) cached in advance.

Also in this example, the CM application can be set as a CM according to a viewer as described hereinabove with reference to FIG. 6.

Where the transmission apparatus is configured such that it transmits different CM applications corresponding to various viewers, the reception apparatus side selects and caches a CM application to be received in response to user information registered in advance.

By executing such an application selection acquisition process, also it becomes possible to display an optimum user-corresponding CM according to an age, a sex, a liking and so forth of a user (viewer).

[12. Example of Cache Control Process Utilizing Service Worker (SW)]

Now, an example of a process for performing cache control of an application utilizing a service worker (SW) is described.

First, an outline of a service worker (SW: Service Worker) is described with reference to FIGS. 45 to 47.

A service worker (SW) is provided from the transmission apparatus 20 such as a broadcasting server or an advertisement server to the reception apparatus 30.

The service worker (SW) is a program for executing an acquisition process of an application to be executed by the reception apparatus (client) 30, a data file to be utilized upon execution of the application and so forth, a storage process into a storage section (cache), an updating process, a deletion process and so forth. In particular, the service worker (SW) is configured, for example, from JavaScript (registered trademark).

The service worker (SW) is set, for example, corresponding to a broadcasting program (broadcasting content) provided by the transmission apparatus 20 and is provided as a control and management program for an application provided from the transmission apparatus 20 to the reception apparatus 30 to the reception apparatus 30.

A service worker (SW), an application and a data file that is utilized upon execution of the application are provided as an NRT content (non-real time content) described hereinabove, for example, with reference to FIGS. 2 and 3 from the transmission apparatus 20 to the reception apparatus 30.

Alternatively, a data providing service separate from a server that distributes a broadcasting program may be configured such that it provides a service worker (SW), an application and a data file that is utilized upon execution of the application to the reception apparatus 30.

The service worker (SW) executes management (acquisition, retention, update, deletion and so forth) processes of an application and so forth for executing information display utilizing a browser that is a program utilized, for example, by the reception apparatus 30 to execute a browsing process of a Web page or the like.

A particular example (use case) of a process that utilizes a service worker (SW) is described with reference to FIGS. 45 and 46.

Figure 45:
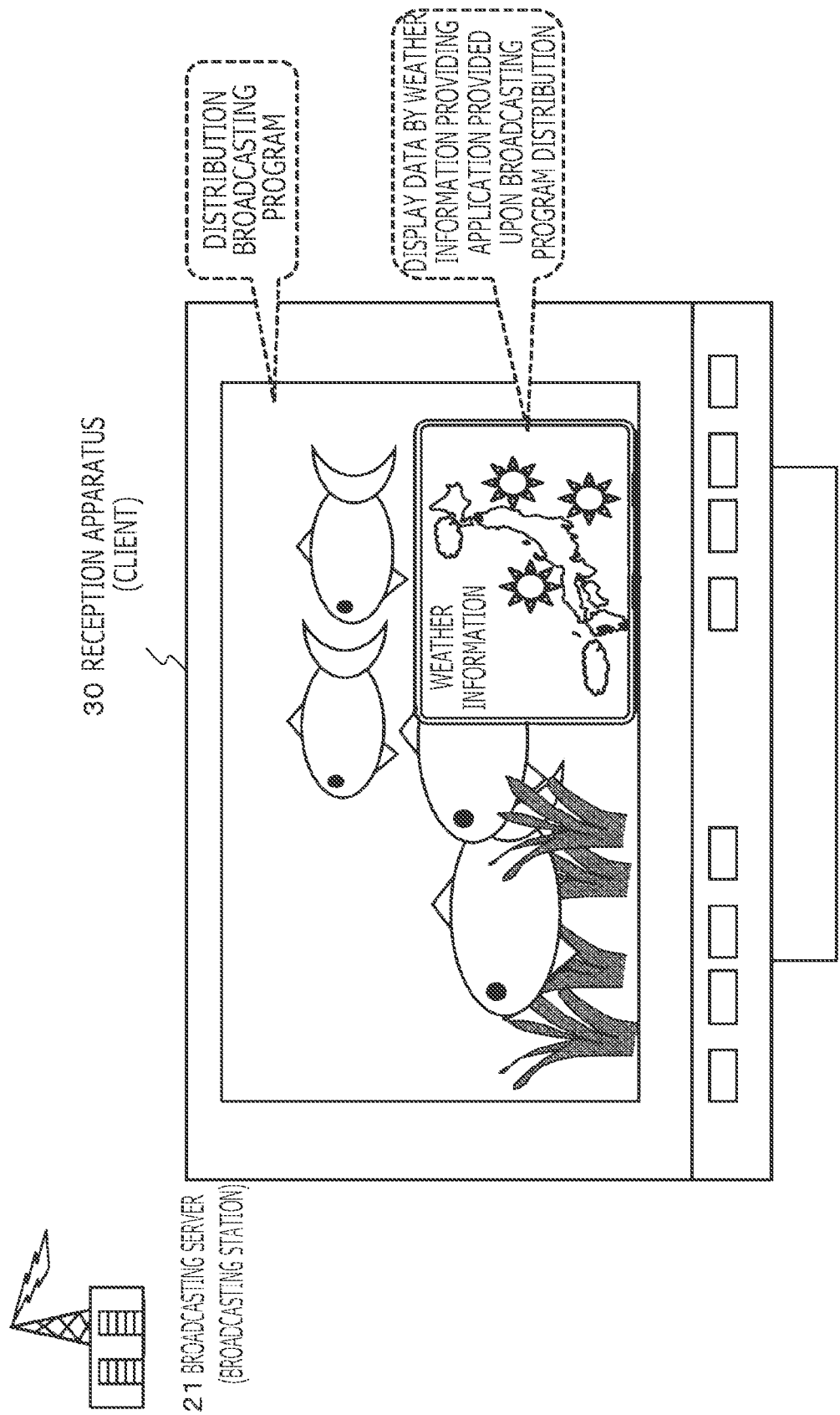
FIG. 45 is a view illustrating a process that utilizes a service worker (SW).

FIG. 45 depicts a state in which the reception apparatus 30 receives a certain broadcasting program content from the transmission apparatus 20 such as the broadcasting server 21 and displays the broadcasting content on the display section of the reception apparatus 30.

The transmission apparatus 20 such as the broadcasting server 21 provides, as an NRT content (non-real time content), together with broadcasting program distribution, an application for displaying weather information and various data files utilized by the weather information display application, for example, data files (resources) including various data of moving images, still images, audio and so forth, to the reception apparatus 30.

The broadcasting server 21 further provides a service worker (SW) as a resource management program for managing those "resources" also as an NRT content (non-real time content) to the reception apparatus 30.

The reception apparatus 30 can perform display of weather information together with broadcasting program display as depicted in FIG. 45 utilizing the "resources" received from the transmission apparatus 20, namely, an application and data files.

In a data distribution configuration so far, such data display utilizing an application as described above is disabled from execution together with an end of the broadcasting program for which the application is provided.

This is because, although a resource of the weather information display application or the like is set for utilization in the reception apparatus 30, for example, is stored into a temporary storage cache and set to a utilizable state, when the broadcasting program comes to an end or when a user switches the channel, then such cache data are erased or set to an inaccessible state.

The service worker (SW) functions as a resource management program for making it possible to utilize such an application or data corresponding to a broadcasting program as described above even after an end of a broadcasting program, after channel switching, or in an offline state such as a broadcasting non-receiving state or a network non-connection state.

Figure 46:
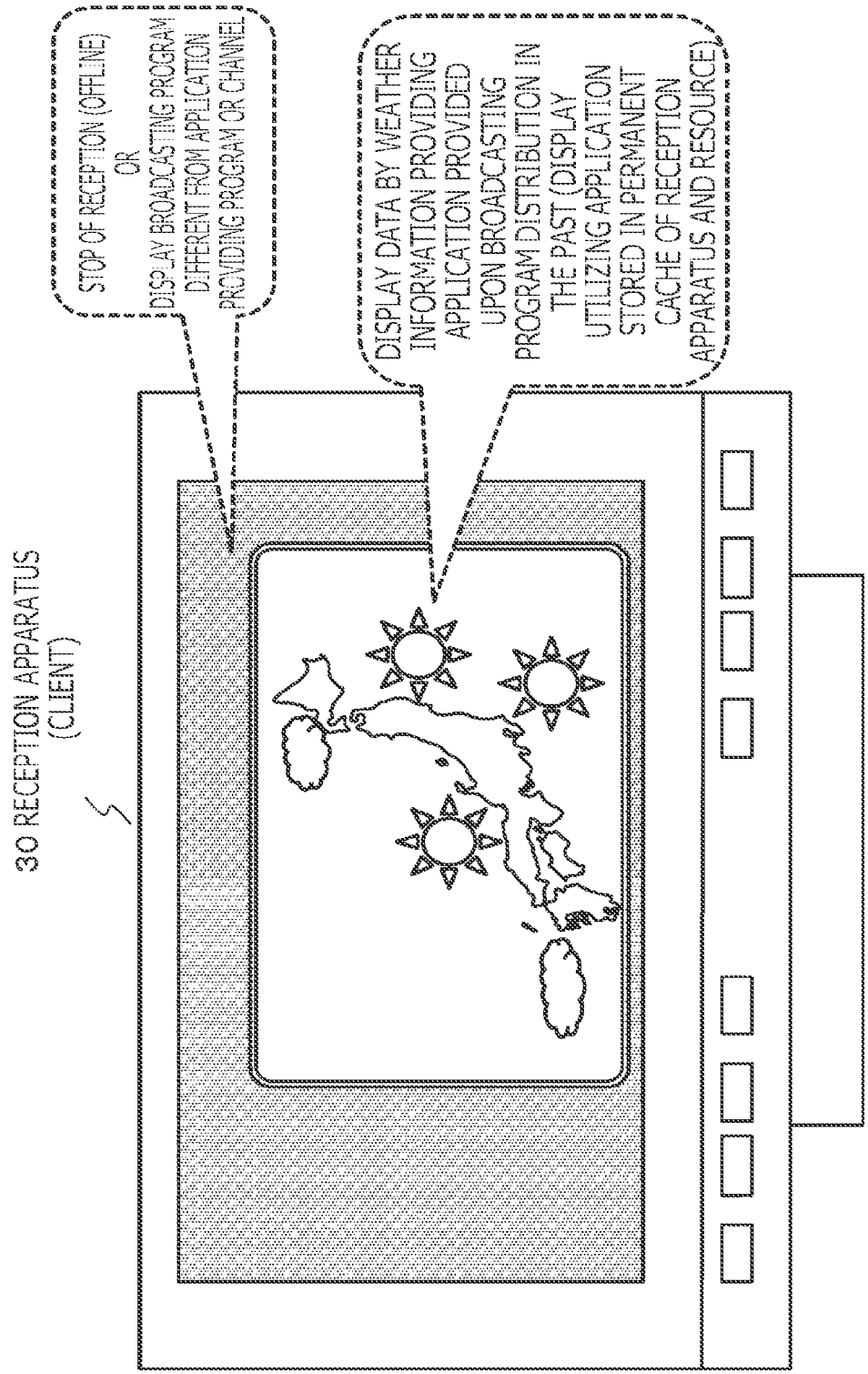
FIG. 46 is a view illustrating a process that utilizes a service worker (SW).

As depicted in FIG. 46, it becomes possible to utilize the weather information display application even after a broadcasting program by which this application is provided comes to an end, after switching to a different channel or in an offline state in which data reception is not executed. In other words, it becomes possible to display and browse weather information on the display section of the reception apparatus 30.

It is to be noted that the weather information display application is a program displayed, for example, on a browser.

This weather information display application is stored into the storage section (cache) of the reception apparatus 30 under the control of the service worker (SW). For example, if a request (event) such as a display request by a user is received, then the weather information display application is read out from the storage section (cache) and displayed on the display section under the control of the service worker (SW).

It is to be noted that the storage section (cache) for storing a resource such as an application is preferably configured as a nonvolatile memory in which storage data is not erased even if the power supply to the reception apparatus 30 is turned off.

In this manner, by utilizing the service worker (SW), it becomes possible to utilize various broadcasting program-corresponding applications independently of display/non-display of a broadcasting program.

It is to be noted that the service worker (SW) is set for each resource (application and application-related data) unit corresponding, for example, to a certain broadcasting program and is provided from the transmission apparatus 20 to the reception apparatus 30 together with the resource or before or after transmission of the resource.

Although the service worker (SW) can be set corresponding to each broadcasting program, also it is possible to set a service worker (SW) such that it can be commonly used for resources corresponding to a specific channel including a plurality of broadcasting programs.

Service workers (SWs) and resources (applications and application-related data) managed by the service worker (SW) are stored into the storage section (cache) of the reception apparatus 30.

The reception apparatus 30 can be configured such that it executes a cache controlling process utilizing the service worker (SW).

In particular, the reception apparatus 30 can be configured such that it can execute a cache process in a unit of a presentation unit (PU) described hereinabove with reference to the flow chart depicted in FIG. 40 or a cache controlling process in a unit of an application described hereinabove with reference to FIG. 41.

Figure 47:
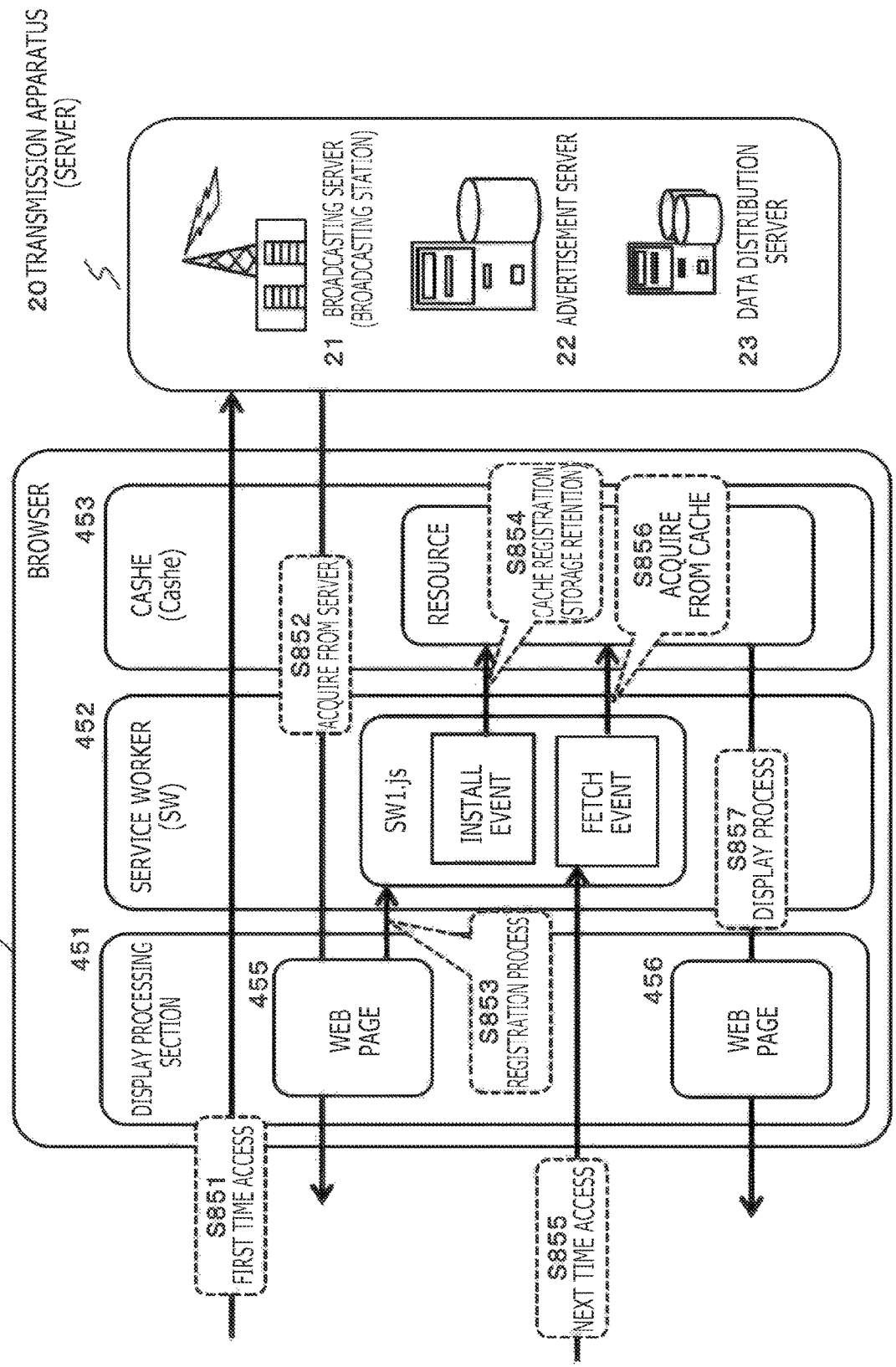
FIG. 47 is a view illustrating a process that utilizes a service worker (SW).

FIG. 47 is a view illustrating an example of a process in which a service worker (SW) is utilized.

FIG. 47 depicts an example of a sequence by which the reception apparatus 30 acquires a Web page (for example, the weather information display page depicted in FIGS. 45 and 46) as a resource from the transmission apparatus 20, stores the Web page into the storage section (cache) of the reception apparatus 30 and utilizes the Web page.

It is to be noted that the Web page is displayed utilizing a predetermined Web page display application and a resource configured from display data.

FIG. 47 depicts, as components of a browser 450 in the reception apparatus, a display processing section 451, a service worker (SW) 452 and a cache (storage section) 453.

Processes at steps S851 to S852 are a resource (Web page) acquisition process by a first time access process to the transmission apparatus 20 by the reception apparatus 30.

This is acquired from an NRT content transmitted, for example, from a broadcasting server or the like.

Upon this resource acquisition process, a service worker (SW) is applied to execute a resource acquisition process in accordance with a cache size and an application size or a presentation unit (PU) size.

In particular, a cache process in which the minimum cache size is the presentation unit (PU) is executed.

After resource acquisition by this cache process, a Web page 455 by application execution is displayed on the display section of the reception apparatus 30 by the display processing section 451. This display corresponds to a state in which it is displayed together with a broadcasting program by which this Web page is provided and to a display state described hereinabove with reference to FIG. 45.

Thereafter, after the broadcasting program comes to an end or after channel switching or else in an offline setting state, the user would issue a browsing request for a Web page at step S855.

The service worker (SW) 452 detects an input of this browsing request as a fetch event and acquires the resource (Web page) from the storage section (cache) in response to detection of the fetch event at step S856.

The display processing section 451 displays a Web page 456 at step S857.

This Web page displaying process is a displaying process after a broadcasting program end, or after channel switching or else in an offline setting state, and corresponds to the display state described hereinabove with reference to FIG. 46.

In this manner, by utilizing the service worker (SW), it becomes possible to utilize programs of various applications and so forth independently of display or non-display of a broadcasting program and, for example, to perform such a process as to display a Web page set as display information attached to a broadcasting program at an arbitrary timing independently of the broadcasting program.

In this manner, the service worker (SW) executes resource management such as acquisition, storage, update, deletion and so forth of resources configured, for example, from a Web page, an HTML page, an application or a program whose component is JavaScript (registered trademark), data utilized by an application and so forth.

Different from an ordinary local/temporary cache, a storage section (cache) in which resources are stored retains data even if an application is not operative.

It is an image that a kind of proxy server is incorporated in a browser that is a Web page displaying program such that a Web page can be acquired and displayed at any time when necessary by accessing the proxy server.

It is to be noted that also the service worker (SW) itself is stored (installed) into the cache. If the service worker (SW) is installed into the reception apparatus, then a resource that is a management target of the service worker (SW) can be controlled in various manners.

For example, in response to an access request to a resource (fetch request for a resource), processing of the service worker (SW) is started and provision of the resource from the cache is performed before processing of the browser side (acquisition of the resource from a local cache or a network) is started.

Further, since the service worker (SW) is provided in JavaScript (registered trademark), it is possible to incorporate various procedures, and flexible process description about cache control such as updating of part of resources of the cache is possible.

It is to be noted that also the service worker (SW) itself can be updated. Although the service worker (SW) is provided from the transmission apparatus 20, various kinds of information required for an update process such as update date information, access information to update data and so forth are recorded in the header information (HTTP Cache- Control) of the service worker (SW), and an update process is executed on the basis of the header information.

For example, if the expiration date comes on the basis of expiration date and so forth set to the header, then the reception apparatus 30 executes an acquisition process of a service worker (SW) of a new version and performs an update process of rewriting the SW of the old version stored in the cache.

The reception apparatus 30 can execute, utilizing the service worker (SW), an application or a program such as, for example, such a weather information display application as described hereinabove with reference to FIGS. 45 and 46, namely, an application or a program that is a management target of the service worker (SW), at an arbitrary timing.

[13. Example of Configuration of Transmission Apparatus and Reception Apparatus]

Now, an example of an apparatus configuration of the transmission apparatus (server) 20 and the reception apparatus (client) 30 that are communication apparatus is described with reference to FIGS. 48 and 49.

Figure 48:
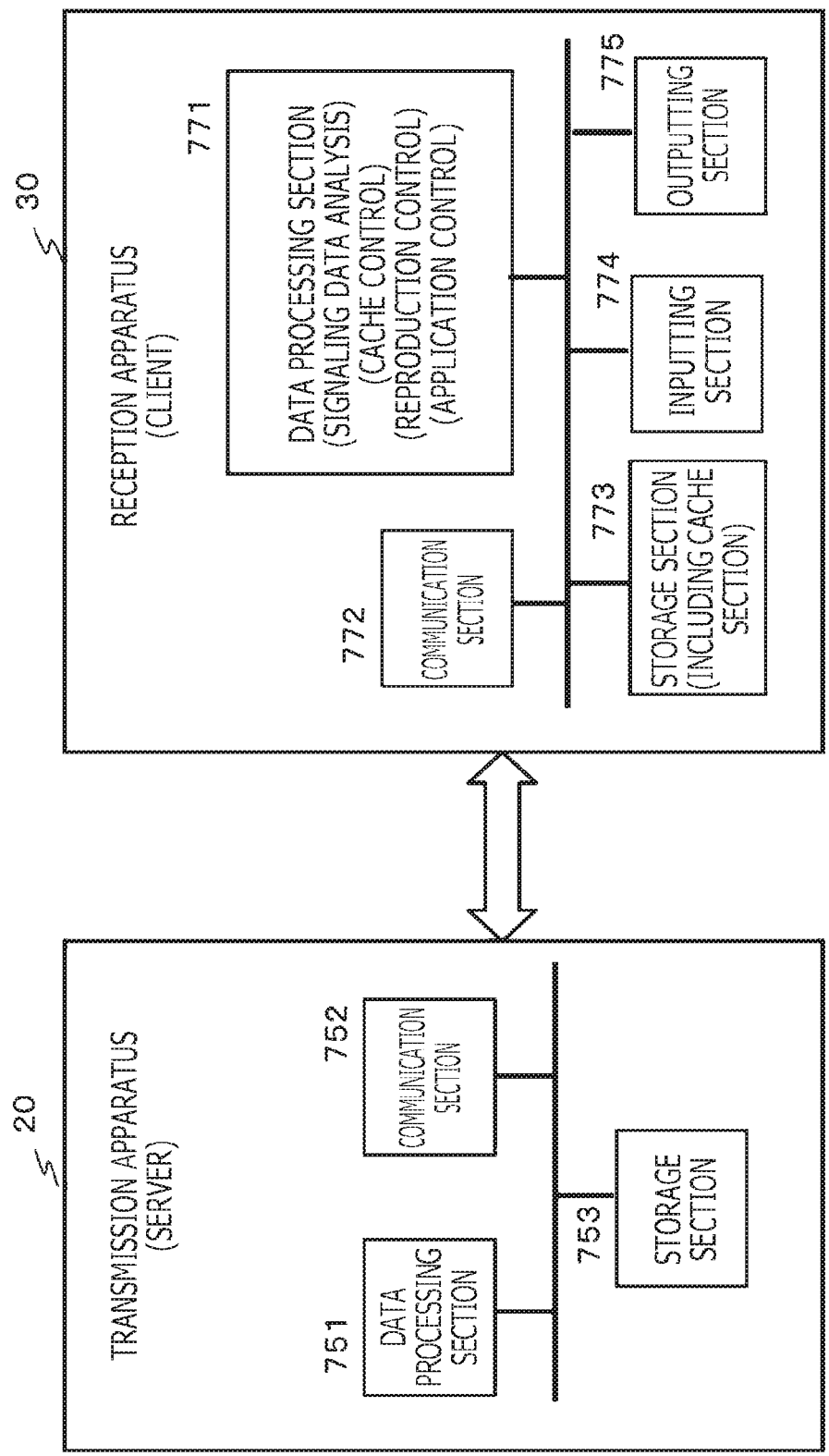
FIG. 48 is a view illustrating an example of a configuration of a transmission apparatus and a reception apparatus that are communication apparatus.

FIG. 48 depicts an example of a configuration of the transmission apparatus (server) 20 and the reception apparatus (client) 30.

The transmission apparatus (server) 20 includes a data processing section 751, a communication section 752 and a storage section 753.

The reception apparatus (client) 30 includes a data processing section 771, a communication section 772, a storage section 773, an inputting section 774 and an outputting section 775.

The data processing section 751 of the transmission apparatus (server) 20 executes various data processes for executing a data distribution service. For example, the data processing section 751 performs creation and transmission control of configuration data of a data distribution service. Further, the data processing section 751 performs creation and transmission processes of an AV segment, an application and other various data as well as signaling data to be provided to the reception apparatus (client) 30.

The communication section 752 performs a communication process such as distribution of an application, other various data, signaling data and so forth in addition to an AV segment.

The storage section 753 stores AV segments, applications, data to be utilized by the applications, signaling data and so forth that are made a distribution target.

Further, the storage section 753 is utilized as a work area of data processing executed by the data processing section 751 and is utilized also as a storage region for various parameters.

Particular processes executed by the transmission apparatus 20 are, for example, such processes as described below.

The data processing section 751 creates a packet in which application configuration data are stored, a packet in which first signaling data (AIT) in which application sizes that are data size of applications and application link information that is link information between the applications are recorded is stored, a packet in which second signaling data (S-TSID) in which data sizes of presentation units that are components of the applications and link information between the presentation units are recorded is stored, and a like packet.

The communication section 752 executes a process for transmitting the packets created by the data processing section 751 and so forth.

On the other hand, the reception apparatus (client) 30 includes a data processing section 771, a communication section 772, a storage section 773, an inputting section 774 and an outputting section 775.

The communication section 772 receives data distributed from the transmission apparatus (server) 20, for example, AV segments, applications, data utilized by the applications, signaling data and so forth.

The data processing section 771 executes processes, for example, in accordance with the embodiment described hereinabove and so forth such as a communication data process, a signaling data analysis process, a data cache controlling process, a reproduction controlling process, an application controlling process and so forth.

In particular, the data processing section 771 executes cache control in a unit of an application or a presentation unit (PU), application execution control and so forth.

Instruction commands of a user, for example, various commands for channel selection, application activation, application transition and so forth are inputted through the inputting section 774.

Reproduction data is outputted to the outputting section 775 such as a display section, a speaker or the like.

The storage section 773 stores AV segments, applications, data utilized by the applications, signaling data and so forth.

Further, the storage section 773 is utilized as a work area for data processing executed by the data processing section 771 and is utilized also as a storage region for various parameters.

Particular processes executed by the reception apparatus 30 are, for example, such processes as described below.

The communication section 772 receives first signaling data (AIT) in which application sizes that are data sizes of applications and application link information that is link information between the applications are recorded, second signaling data (S-TSID) in which data sizes of presentation units that are components of the applications are recorded, and so forth.

Meanwhile, the data processing section 771 compares the cache size that is a data size capable of being stored into the storage section 773 of the own apparatus and the data size, acquired from the first signaling data (AIR), of each of applications having a link relationship to each other with each other to determine one or more cacheable applications as cache target applications and executes a cache process in a unit of an application.

Further, when the cache size is smaller than the data size of one application, the data processing section 771 refers to the second signaling data (S-TSID) to compare the data size of the presentation unit and the cache size with each other, determines one or more presentation units of a data size equal to or smaller than the cache size as cache target, and executes a cache process in a unit of a presentation unit.

Figure 49:
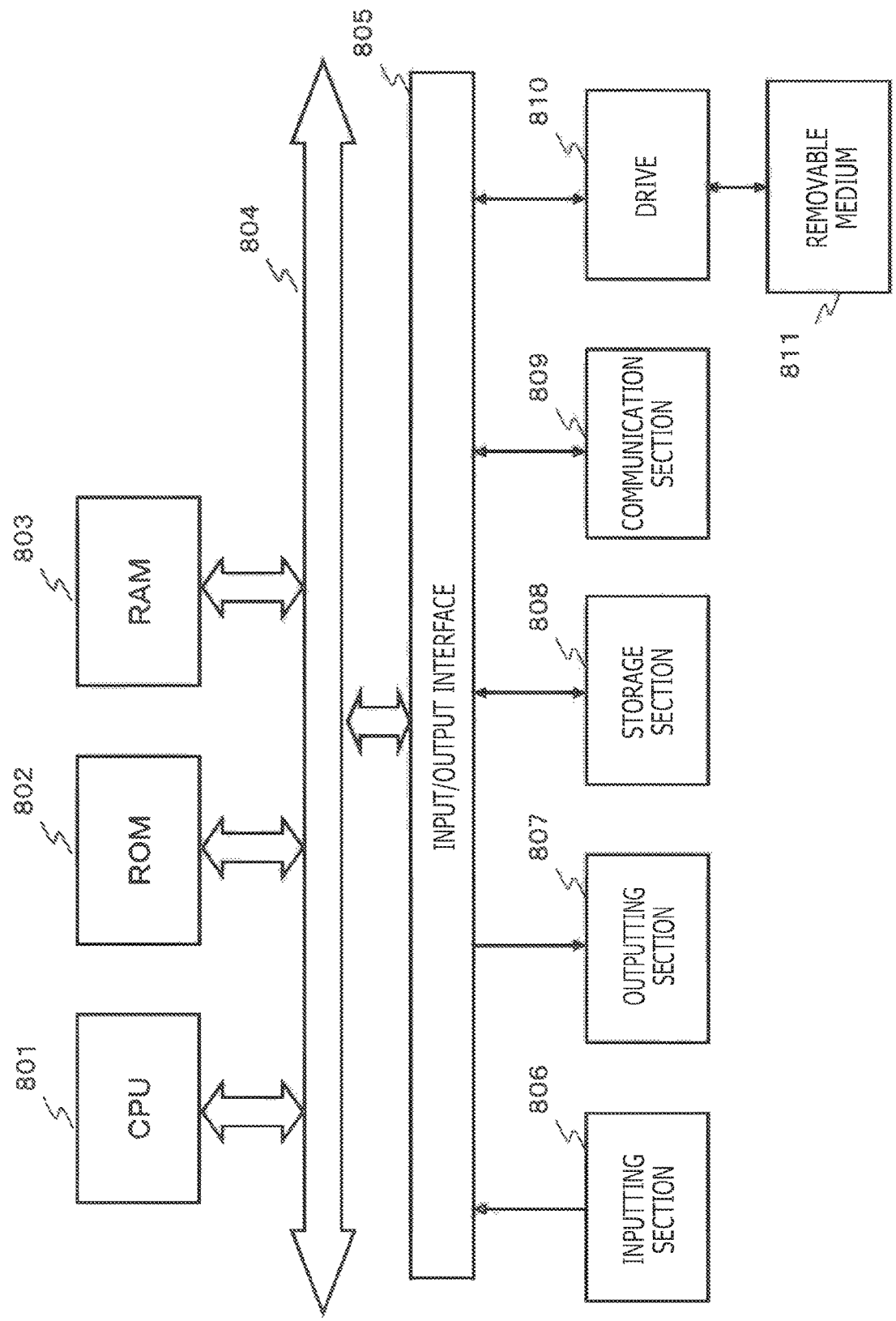
FIG. 49 is a view illustrating an example of a hardware configuration of the transmission apparatus and the reception apparatus that are communication apparatus.

FIG. 49 depicts an example of a hardware configuration of a communication apparatus that can be applied as the transmission apparatus 20 and the reception apparatus 30.

A CPU (Central Processing Unit) 801 functions as a data processing section that executes various processes in accordance with a program stored in a ROM (Read Only Memory) 802 or a storage section 808. For example, the CPU 801 executes, for example, the processes in accordance with the sequence described hereinabove in connection with the embodiment described above. Into a RAM (Random Access Memory) 803, a program to be executed by the CPU 801, data and so forth are stored. The CPU 801, ROM 802 and RAM 803 are connected to each other by a bus 804.

The CPU 801 is connected to an input/output interface 805 through the bus 804, an inputting section 806 configured from various switches, a keyboard, a mouse, a microphone and so forth, and an outputting section 807 configured from a display device, a speaker and so forth are connected to the input/output interface 805. The CPU 801 executes various processes in accordance with an instruction inputted from the inputting section 806 and outputs a result of the processes, for example, to the outputting section 807.

The storage section 808 connected to the input/output interface 805 is configured, for example, from a hard disk and stores a program to be executed by the CPU 801 and various data. A communication section 809 functions as a transmission and reception section of data communication through a network such as the Internet or a local area network and further functions as a transmission and reception section of a broadcasting wave, and communicates with an external apparatus.

A drive 810 connected to the input/output interface 805 drives a removable medium 811 such as a magnetic disk, an optical disk, a magneto-optical disk, a semiconductor memory such as a memory card or the like to execute recording or reading of data.

It is to be noted that, although encoding or decoding of data can be executed as a process of the CPU 801 as a data processing section, an alternate configuration that includes a codec as hardware for exclusive use for executing an encoding processing or a decoding process may be applied.

[14. Summary of Configuration of Present Disclosure]

The embodiment of the present disclosure has been described in detail with reference to the embodiment of the present disclosure. However, it is self-evident that those skilled in the art can implement modification or substitution without departing from the scope of the present disclosure. In particular, the present invention has been disclosed in the form of illustration and is not to be construed as restrictive. In order to decide the subject matter of the present disclosure, the claims should be referred to.

It is to be noted that the technology disclosed in the present specification can take such a configuration as described below.

(1) A reception apparatus, including:
a communication section configured to receive first signaling data in which an application size that is a data size of each application and application link information that is link information between the applications are recorded; and
a data processing section configured to compare a cache size that is a data size capable of being stored in a storage section of the own apparatus and a data size, acquired from the first signaling data, of each of the applications that have a link relationship with each other to determine one or more cacheable applications as cache target applications and executes a cache process in a unit of an application.

(2) The reception apparatus according to (1), in which the first signaling data is configured such that
correspondence data of a link source application ID and a link destination application ID is recorded as application link information and
an application size is recorded in an associated relationship with each application ID; and
the data processing section
acquires the link source application ID and the link destination application ID from the application link information of the first signaling data, and
acquires application size information recorded corresponding to each acquired application ID and determines one or more cacheable applications as cache target applications.

(3) The reception apparatus according to (1) or (2), in which,
where a plurality of applications having a link relationship to each other exist,
the data processing section selects an initial execution application as the most preferential cache target application and then successively selects cache target applications in accordance with a link order from the initial execution application.

(4) The reception apparatus according to (2) or (3), in which the application ID is an identifier including an organization ID and an application main body ID.

(5) The reception apparatus according to any one of (1) to (4), in which the first signaling data is an application information table (AIT: Application Information Table) in which information of application units is recorded.

(6) The reception apparatus according to any one of (1) to (5), in which the communication section
receives the first signaling data through a broadcasting wave.

(7) The reception apparatus according to any one of (1) to (6), in which the application is an application that executes an advertisement outputting process.

(8) The reception apparatus according to any one of (1) to (7), in which the reception unit
receives second signaling data in which a data size of a presentation unit that is a component of an application is recorded, and
where the cache size is smaller than the data size of one application,
the data processing section
refers to the second signaling data and compares the data size of the presentation unit and the cache size with each other, and
determines one or more presentation units having a data size equal to or smaller than the cache size as a cache target and executes a cache process in a unit of a presentation unit.

(9) The reception apparatus according to (8), in which the presentation unit
is a set of data configured from one or a plurality of HTML (HyperText Markup Language) documents and a data file to be outputted by applying the HTML documents.

(10) The reception apparatus according to (8) or (9), in which the second signaling data is configured such that
correspondence data of a link source presentation unit ID and a link destination presentation unit ID is recorded as presentation unit link information, and
a presentation unit size is recorded in an associated relationship with each presentation unit ID, and
the data processing section
acquires a link source presentation unit ID and a link destination presentation unit ID from the presentation unit link information of the second signaling data, and
acquires the presentation unit size information recorded corresponding to each acquired presentation unit ID and determines one or more cacheable presentation units as a cache target application.

(11) The reception apparatus according to any one of (8) to (10), in which,
where a plurality of presentation units having a link relationship to each other exist,
the data processing section
selects a presentation unit including an entry document as the most preferential cache target presentation unit and then successively selects cache target presentation units in accordance with a link order from the presentation unit including the entry document.

(12) The reception apparatus according to (10) or (11), in which the presentation unit ID includes an application main body ID by which an application belonging to the presentation unit can be identified and a group ID by which presentation units in the belonging application can be identified individually.

(13) The reception apparatus according to any one of (8) to (11), in which the second signaling data is an S-TSID (Service based Transport Session Description) in which information of file units included in the presentation unit configuring the application is recorded.

(14) The reception apparatus according to any one of (8) to (13), in which information of file units included in the presentation unit is recorded in the second signaling data;

each piece of file unit information has recorded in an associated relationship therein a group ID that is set to presentation units to which the file belongs; and the data processing section executes a selection process of a cache target file based on the group ID.

(15) The reception apparatus according to any one of (8) to (14), in which the communication section receives the second signaling data through a broadcasting wave.

(16) A transmission apparatus, including:

a packet in which application configuration data is stored;

a data processing section configured to create a packet in which first signaling data in which an application size that is a data size of the application and application link information that is link information between applications are recorded is stored; and a communication section configured to transmit the packet created by the data processing section.

(17) The transmission apparatus according to (16), in which the data processing section further creates a packet in which second signaling data in which a data size of each presentation unit that is a component of an application and link information between the presentation units are recorded is stored; and the communication section transmits the packet in which the second signaling data is stored.

(18) The transmission apparatus according to (17), in which the presentation unit is a set of data configured from one or a plurality of HTML (HyperText Markup Language) documents and a data file to be outputted by applying the HTML documents.

(19) A data processing method executed by a reception apparatus, including:

receiving, by a communication section, first signaling data in which an application size that is a data size of each of applications and application link information that is link information between the applications are recorded; and comparing, by a data processing section, a cache size that is a data size capable of being stored in a storage section of the own apparatus and a data size, acquired from the first signaling data, of each of the applications that have a link relationship with each other to determine one or more cacheable applications as cache target applications and executing a cache process in a unit of an application.

(20) A data processing method executed by a transmission apparatus, including:

creating, by a data processing section, a packet in which application configuration data is stored, and a packet in which first signaling data in which an application size that is a data size of each of the applications and application link information that is link information between the applications are recorded is stored; and transmitting, by a communication section, the packets created by the data processing section.

Further, the series of processes described in the specification can be executed by hardware, software or a composite configuration of the hardware and software. Where the processes are executed by software, a program in which the processing sequence is recorded can be installed into a memory in a computer incorporated in hardware for exclusive user and executed or the program can be installed and executed into and by a general purpose computer that can execute various processes. For example, the program can recorded in advance in a recording medium. The program can be not only installed from a recording medium into a computer but also can be received through a network such as a LAN (Local Area Network) or the Internet and installed into a recording medium such as a built-in hard disk.

It is to be noted that the various processes described in the specification can be not only executed in a time series in accordance with the description but also executed in parallel or individually in response to a processing capacity of an apparatus that performs the processes or as occasion demands. Further, the term system in the present specification signifies a logical aggregation configuration of a plurality of apparatus and is limited to a system in which apparatus of the components are provided in the same housing.

INDUSTRIAL APPLICABILITY

As described above, with the configuration of the embodiment of the present disclosure, an apparatus and a method are implemented which make it possible to allow a reception apparatus to execute a cache process in a unit of an application or in a unit of a presentation unit thereby to make it possible to achieve an application execution process of high completeness.

In particular, the reception apparatus receives, from a transmission apparatus, signaling data in which an application size that is a data size of each application, application link information, and a data size of each of presentation units (PUs) that are application components are recorded. The reception apparatus compares a cache size thereof and a data size of each of the applications or the PUs with each other to determine each cacheable application or PU as cache target data, and executes a cache process in a unit of an application or a PU.

By the present configuration, an apparatus and a method are implemented which make it possible to allow a reception apparatus to execute a cache process in a unit of an application or in a unit of a presentation unit thereby to make it possible to achieve an application execution process of high completeness.

REFERENCE SIGNS LIST

10: Communication system
20: Transmission apparatus
21: Broadcasting server
22: Advertisement server
23: Data distribution server
30: Reception apparatus
31: TV
32: PC
33: Portable terminal
50: Signaling data
60: AV segment
70: Other data 110: Middleware
111: Communication section (PHY/MAC)
112: Signaling acquisition section
113: Signaling analysis section
114: Segment acquisition section
120: HTTP proxy server
121: Cache controlling section
122: Cache section
130: Data reproduction section
131: Reproduction controlling section
132: Application controlling section
133: Output controlling section
200: Application
210: Presentation unit (PU)
211: HTML file
212: Data file
213: Link
221: Entry document
450: Browser
451: Display processing section
452: Service worker (SW)
453: Cache
455, 456: Web page
751: Data processing section
752: Communication section
753: Storage section
771: Data processing section
772: Communication section
773: Storage section
774: Inputting section
775: Outputting section
801: CPU
802: ROM
803: RAM
804: Bus
805: Input/output interface
806: Inputting section
807: Outputting section
808: Storage section
809: Communication section
810: Drive
811: Removable medium

The invention claimed is:

1. A reception apparatus, comprising:
communication circuitry configured to receive first signaling data, the first signaling data including
  link information indicating an order of activating plural applications, and
  application size information indicating, for each one of the applications, a data size of the corresponding application; and
processing circuitry configured to:
  determine one or more cache target applications from the applications according to a cache size that is available in a memory of the reception apparatus, the data size of each one of the applications, and the order of activating the applications; and
  execute a cache process to cache the determined one or more cache target applications in the memory.

2. The reception apparatus according to claim 1, wherein the link information includes a link source application ID recorded in association with a link destination application ID, the link source application ID specifying a first application, the link destination application ID specifying a second application, and activation of the second application is performed during execution of the first application,
a data size of each of the applications is recorded in association with an application ID specifying the corresponding application, and
the processing circuitry is further configured to:
  acquire the link source application ID and the link destination application ID from the link information;
  acquire a first data size of the first application specified by the link source application ID and a second data size of the second application specified by the link destination application ID from the application size information; and
  determine whether to include the first application or the second application in the one or more cache target applications according to the first data size and the second data size.

3. The reception apparatus according to claim 1, wherein the processing circuitry is configured to:
  select an initial execution application from the applications according to the order of activating the applications as a most preferential cache target application; and
  successively determine whether to include one or more subsequent applications after the initial execution application in the one or more cache target applications in accordance with order of activating the applications.

4. The reception apparatus according to claim 2, wherein an application ID of a particular one of the applications is an identifier including an organization ID and an application main body ID.

5. The reception apparatus according to claim 1, wherein the first signaling data is an application information table (AIT) in which information of the applications is recorded.

6. The reception apparatus according to claim 1, wherein the communication circuitry is configured to receive the first signaling data through a broadcasting wave.

7. The reception apparatus according to claim 1, wherein one of the applications is an application that executes an advertisement outputting process.

8. The reception apparatus according to claim 1, wherein the communication circuitry is further configured to receive second signaling data, the second signaling data including presentation unit data size information indicating, for each one of presentation units that is a component of a particular application from the applications, a data size of the corresponding presentation unit, and
the processing circuitry is further configured to, in response to the cache size being insufficient to store the particular application:
  determine one or more cache target presentation units according to the cache size and the data size of each one of the presentation units; and
  execute a cache process to cache the determined one or more cache target presentation units in the memory.

9. The reception apparatus according to claim 8, wherein at least one of the presentation units is a set of data configured from one or a plurality of HTML (HyperText Markup Language) documents and a data file to be outputted by applying the HTML documents.

10. The reception apparatus according to claim 8, wherein the second signaling data includes presentation unit link information indicating a link source presentation unit ID recorded in association with a link destination presentation unit ID,
a data size of each of the presentation units is recorded in association with an presentation unit ID specifying the corresponding presentation unit, and the processing circuitry is further configured to:
acquire the link source presentation unit ID and the link destination presentation unit ID from the presentation unit link information;
acquire a third data size of a first presentation unit specified by the link source presentation unit ID and a fourth data size of a second presentation unit specified by the link destination presentation unit ID from the presentation unit size information; and
determine whether to include the first presentation unit or the second presentation unit in the one or more cache target presentation units according to the third data size and the fourth data size.

11. The reception apparatus according to claim 8, wherein the processing circuitry is further configured to:
select an initial presentation unit including an entry document from the presentation units as a most preferential cache target presentation unit; and
successively determine whether to include one or more subsequent presentation units after the initial presentation unit in the one or more cache target presentation units in accordance with a link order of the presentation units.

12. The reception apparatus according to claim 10, wherein a presentation unit ID of a particular one of the presentation units includes an application main body ID that specifies the particular application and a group ID that specifies the particular one of the presentation units.

13. The reception apparatus according to claim 8, wherein the second signaling data is a Service based Transport Session Description (S-TSID) in which information of file units included in the presentation units corresponding to the particular application is recorded.

14. The reception apparatus according to claim 8, wherein
information of file units included in the presentation units is recorded in the second signaling data,
each piece of the information is recorded in association with a corresponding file and a corresponding group ID that specifies a particular one of the presentation units, and
the processing circuitry is further configured to execute a selection process of a cache target file based on the group ID.

15. The reception apparatus according to claim 8, wherein the communication circuitry is configured to receive the second signaling data through a broadcasting wave.

16. A transmission apparatus, comprising:
processing circuitry configured to create a first packet that includes application configuration data and a second packet that includes first signaling data, the first signaling data including
link information indicating an order of activating plural applications, and
application size information indicating, for each one of the applications, a data size of the corresponding application; and
communication circuitry configured to transmit the first packet and the second packet.

17. The transmission apparatus according to claim 16, wherein
the processing circuitry is further configured to create a third packet that includes second signaling data, the second signaling data including
presentation unit data size information indicating, for each one of presentation units that is a component of a particular application from the applications, a data size of the corresponding presentation unit, and
presentation unit link information indicating an order of accessing the presentation units, and
the communication circuitry is configured to transmit the third packet.

18. The transmission apparatus according to claim 17, wherein at least one of the presentation units is a set of data configured from one or a plurality of HTML (HyperText Markup Language) documents and a data file to be outputted by applying the HTML documents.

19. A data processing method executed by a reception apparatus, comprising:
receiving, by communication circuitry of the reception apparatus, first signaling data, the first signaling data including
link information indicating an order of activating plural applications, and
application size information indicating, for each one of the applications, a data size of the corresponding application;
determining, by processing circuitry of the reception apparatus, one or more cache target applications from the applications according to a cache size that is available in a memory of the reception apparatus, the data size of each one of the applications, and the order of activating the applications; and
executing, by the processing circuitry of the reception apparatus, a cache process to cache the determined one or more he target applications in the memory.

20. A data processing method executed by a transmission apparatus, comprising:
creating, by processing circuitry of the transmission apparatus, a first packet that includes application configuration data, and a second packet that includes first signaling data, the first signaling data including
link information indicating an order of activating plural applications, and
application size information indicating, for each one of the applications, a data size of the corresponding application; and
transmitting, by communication circuitry of the transmission apparatus, the first packet and the second packet.

21. The data processing method according to claim 19, further comprising:
receiving second signaling data, the second signaling data including
presentation unit data size information indicating, for each one of presentation units that is a component of a particular application from the applications, a data size of the corresponding presentation unit, and
presentation unit link information indicating an order of accessing the presentation units; and
in response to the cache size being insufficient to store the particular application:
determining one or more cache target presentation units according to the cache size, the data size of each one of the presentation units, and the order of accessing the presentation units, and
executing a cache process to cache the determined one or more cache target presentation units in the memory.

* * * * *